(12) United States Patent
Flynn et al.

(10) Patent No.: US 8,719,501 B2
(45) Date of Patent: May 6, 2014

(54) APPARATUS, SYSTEM, AND METHOD FOR CACHING DATA ON A SOLID-STATE STORAGE DEVICE

(75) Inventors: David Flynn, Sandy, UT (US); John Strasser, Syracuse, UT (US); Jonathan Thatcher, Liberty Lake, WA (US); David Atkisson, Draper, UT (US); Michael Zappe, Arvada, CO (US); Joshua Aune, South Jordan, UT (US); Kevin B. Vigor, Salt Lake City, UT (US)

(73) Assignee: Fusion-io, Salt Lake City, UT (US)

( * ) Notice: Subject to any disclaimer, the term of this patent is extended or adjusted under 35 U.S.C. 154(b) by 260 days.

(21) Appl. No.: 12/877,971

(22) Filed: Sep. 8, 2010

(65) Prior Publication Data

US 2011/0066808 A1    Mar. 17, 2011

Related U.S. Application Data

(60) Provisional application No. 61/240,573, filed on Sep. 8, 2009, provisional application No. 61/240,966, filed on Sep. 9, 2009, provisional application No. 61/373,271, filed on Aug. 12, 2010.

(51) Int. Cl.
*G06F 12/00* (2006.01)
(52) U.S. Cl.
USPC .......................................... 711/118; 711/103
(58) Field of Classification Search
USPC .................................................. 711/118, 103
See application file for complete search history.

(56) References Cited

U.S. PATENT DOCUMENTS

| 4,571,674 A | 2/1986 | Hartung |
| 5,193,184 A | 3/1993 | Belsan et al. |

(Continued)

FOREIGN PATENT DOCUMENTS

| CN | 1771495 | 5/2006 |
| EP | 1100001 A1 | 5/2001 |

(Continued)

OTHER PUBLICATIONS

EEEL 6892, "Virtual Computers, Lecture 18", http://www.acis.ufl.edu/~ming/lectures/eel6892lec18.pdf, visited Mar. 1, 2010.

(Continued)

*Primary Examiner* — Hashem Farrokh
(74) *Attorney, Agent, or Firm* — Stoel Rives LLP

(57) ABSTRACT

An apparatus, system, and method are disclosed for caching data on a solid-state storage device. The solid-state storage device maintains metadata pertaining to cache operations performed on the solid-state storage device, as well as storage operations of the solid-state storage device. The metadata indicates what data in the cache is valid, as well as information about what data in the nonvolatile cache has been stored in a backing store. A backup engine works through units in the nonvolatile cache device and backs up the valid data to the backing store. During grooming operations, the groomer determines whether the data is valid and whether the data is discardable. Data that is both valid and discardable may be removed during the grooming operation. The groomer may also determine whether the data is cold in determining whether to remove the data from the cache device. The cache device may present to clients a logical space that is the same size as the backing store. The cache device may be transparent to the clients.

33 Claims, 16 Drawing Sheets

(56) References Cited

U.S. PATENT DOCUMENTS

| | | |
|---|---|---|
| 5,261,068 A | 11/1993 | Gaskins et al. |
| 5,291,496 A | 3/1994 | Andaleon et al. |
| 5,307,497 A | 4/1994 | Feigenbaum et al. |
| 5,313,475 A | 5/1994 | Cromer et al. |
| 5,325,509 A | 6/1994 | Lautzenheiser |
| 5,392,427 A | 2/1995 | Barrett et al. |
| 5,404,485 A | 4/1995 | Ban |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai et al. |
| 5,535,399 A | 7/1996 | Blitz et al. |
| 5,551,003 A | 8/1996 | Mattson et al. |
| 5,553,261 A | 9/1996 | Hasbun et al. |
| 5,559,988 A | 9/1996 | Durante et al. |
| 5,586,291 A | 12/1996 | Lasker et al. |
| 5,594,883 A | 1/1997 | Pricer |
| 5,596,736 A | 1/1997 | Kerns |
| 5,598,370 A | 1/1997 | Nijima et al. |
| 5,603,001 A | 2/1997 | Sukegawa et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,734,861 A | 3/1998 | Cohn et al. |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,802,602 A | 9/1998 | Rahman et al. |
| 5,809,527 A | 9/1998 | Cooper et al. |
| 5,809,543 A | 9/1998 | Byers et al. |
| 5,845,313 A | 12/1998 | Estakhri et al. |
| 5,845,329 A | 12/1998 | Onishi et al. |
| 5,860,083 A | 1/1999 | Sukegawa |
| 5,907,856 A | 5/1999 | Estakhri et al. |
| 5,924,113 A | 7/1999 | Estakhri et al. |
| 5,930,815 A | 7/1999 | Estakhri et al. |
| 5,957,158 A | 9/1999 | Volz et al. |
| 5,960,462 A | 9/1999 | Solomon et al. |
| 5,961,660 A | 10/1999 | Capps, Jr. et al. |
| 6,000,019 A | 12/1999 | Dykstal et al. |
| 6,014,724 A | 1/2000 | Jenett |
| 6,073,232 A | 6/2000 | Kroeker et al. |
| 6,101,601 A | 8/2000 | Matthews et al. |
| 6,128,695 A | 10/2000 | Estakhri et al. |
| 6,141,249 A | 10/2000 | Estakhri et al. |
| 6,145,051 A | 11/2000 | Estakhri et al. |
| 6,170,039 B1 | 1/2001 | Kishida |
| 6,170,047 B1 | 1/2001 | Dye |
| 6,172,906 B1 | 1/2001 | Estakhri et al. |
| 6,173,381 B1 | 1/2001 | Dye |
| 6,185,654 B1 | 2/2001 | Van Doren |
| 6,209,088 B1 | 3/2001 | Reneris |
| 6,223,308 B1 | 4/2001 | Estakhri et al. |
| 6,230,234 B1 | 5/2001 | Estakhri et al. |
| 6,236,593 B1 | 5/2001 | Hong et al. |
| 6,240,040 B1 | 5/2001 | Akaogi et al. |
| 6,256,642 B1 | 7/2001 | Krueger et al. |
| 6,279,069 B1 | 8/2001 | Robinson et al. |
| 6,289,413 B1 | 9/2001 | Rogers et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,393,513 B2 | 5/2002 | Estakhri et al. |
| 6,404,647 B1 | 6/2002 | Minne' |
| 6,412,080 B1 | 6/2002 | Fleming et al. |
| 6,418,478 B1 | 7/2002 | Ignatius et al. |
| 6,507,911 B1 | 1/2003 | Langford |
| 6,516,380 B2 | 2/2003 | Kenchammana-Hoskote et al. |
| 6,523,102 B1 | 2/2003 | Dye et al. |
| 6,564,285 B1 | 5/2003 | Mills et al. |
| 6,567,889 B1 | 5/2003 | DeKoning et al. |
| 6,587,915 B1 | 7/2003 | Kim |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,675,349 B1 | 1/2004 | Chen |
| 6,715,027 B2 | 3/2004 | Kim et al. |
| 6,715,046 B1 | 3/2004 | Shoham et al. |
| 6,728,851 B1 | 4/2004 | Estakhri et al. |
| 6,751,155 B2 | 6/2004 | Gorobets |
| 6,754,774 B2 | 6/2004 | Gruner et al. |
| 6,757,800 B1 | 6/2004 | Estakhri et al. |
| 6,775,185 B2 | 8/2004 | Fujisawa et al. |
| 6,779,088 B1 | 8/2004 | Benveniste et al. |
| 6,779,094 B2 | 8/2004 | Selkirk et al. |
| 6,785,776 B2 | 8/2004 | Arimilli et al. |
| 6,785,785 B2 | 8/2004 | Piccirillo et al. |
| 6,801,979 B1 | 10/2004 | Estakhri et al. |
| 6,804,755 B2 | 10/2004 | Selkirk et al. |
| 6,871,257 B2 | 3/2005 | Conley |
| 6,877,076 B1 | 4/2005 | Cho et al. |
| 6,880,049 B2 | 4/2005 | Gruner et al. |
| 6,883,069 B2 | 4/2005 | Yoshida |
| 6,883,079 B1 | 4/2005 | Priborsky |
| 6,910,170 B2 | 6/2005 | Choi et al. |
| 6,912,537 B2 | 6/2005 | Selkirk et al. |
| 6,912,618 B2 | 6/2005 | Estakhri et al. |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,977,599 B2 | 12/2005 | Widmer |
| 6,978,342 B1 | 12/2005 | Estakhri et al. |
| 6,981,070 B1 | 12/2005 | Luk et al. |
| 6,996,676 B2 | 2/2006 | Megiddo et al. |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,035,974 B2 | 4/2006 | Shang |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,076,599 B2 | 7/2006 | Aasheim et al. |
| 7,076,723 B2 | 7/2006 | Saliba |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,111,140 B2 | 9/2006 | Estakhri et al. |
| 7,130,956 B2 | 10/2006 | Rao |
| 7,130,957 B2 | 10/2006 | Rao |
| 7,143,228 B2 | 11/2006 | Iida et al. |
| 7,149,947 B1 | 12/2006 | MacLellan et al. |
| 7,167,953 B2 | 1/2007 | Megiddo |
| 7,171,536 B2 | 1/2007 | Chang et al. |
| 7,173,852 B2 | 2/2007 | Gorobets et al. |
| 7,178,081 B2 | 2/2007 | Lee et al. |
| 7,181,572 B2 | 2/2007 | Walmsley |
| 7,194,577 B2 | 3/2007 | Johnson et al. |
| 7,194,740 B1 | 3/2007 | Frank et al. |
| 7,197,657 B1 | 3/2007 | Tobias |
| 7,203,815 B2 | 4/2007 | Haswell |
| 7,215,580 B2 | 5/2007 | Gorobets |
| 7,219,238 B2 | 5/2007 | Saito et al. |
| 7,234,082 B2 | 6/2007 | Lai et al. |
| 7,243,203 B2 | 7/2007 | Scheuerlein |
| 7,246,179 B2 | 7/2007 | Camara et al. |
| 7,254,686 B2 | 8/2007 | Islam |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voigt et al. |
| 7,310,711 B2 | 12/2007 | New et al. |
| 7,328,307 B2 | 2/2008 | Hoogterp |

(56) References Cited

U.S. PATENT DOCUMENTS

| | | | |
|---|---|---|---|
| 7,337,201 | B1 | 2/2008 | Yellin et al. |
| 7,340,558 | B2 | 3/2008 | Lee et al. |
| 7,340,566 | B2 | 3/2008 | Voth et al. |
| 7,356,651 | B2 | 4/2008 | Liu et al. |
| 7,360,015 | B2 | 4/2008 | Matthews et al. |
| 7,360,037 | B2 | 4/2008 | Higaki et al. |
| 7,366,808 | B2 | 4/2008 | Kano et al. |
| 7,392,365 | B2 | 6/2008 | Selkirk et al. |
| 7,395,384 | B2 | 7/2008 | Sinclair et al. |
| 7,398,348 | B2 | 7/2008 | Moore et al. |
| 7,424,593 | B2 | 9/2008 | Estakhri et al. |
| 7,437,510 | B2 | 10/2008 | Rosenbluth et al. |
| 7,441,090 | B2 | 10/2008 | Estakhri et al. |
| 7,447,847 | B2 | 11/2008 | Louie et al. |
| 7,450,420 | B2 | 11/2008 | Sinclair et al. |
| 7,464,221 | B2 | 12/2008 | Nakamura et al. |
| 7,480,766 | B2 | 1/2009 | Gorobets |
| 7,487,235 | B2 | 2/2009 | Andrews et al. |
| 7,487,320 | B2 | 2/2009 | Bansal et al. |
| 7,500,000 | B2 | 3/2009 | Groves et al. |
| 7,516,267 | B2 | 4/2009 | Coulson et al. |
| 7,523,249 | B1 | 4/2009 | Estakhri et al. |
| 7,526,614 | B2 | 4/2009 | van Riel |
| 7,529,905 | B2 | 5/2009 | Sinclair |
| 7,536,491 | B2 | 5/2009 | Kano et al. |
| 7,549,013 | B2 | 6/2009 | Estakhri et al. |
| 7,552,271 | B2 | 6/2009 | Sinclair et al. |
| 7,580,287 | B2 | 8/2009 | Aritome |
| 7,603,532 | B2 | 10/2009 | Rajan et al. |
| 7,610,348 | B2 | 10/2009 | Kisley et al. |
| 7,620,773 | B2 | 11/2009 | Nicholson et al. |
| 7,631,138 | B2 | 12/2009 | Gonzales et al. |
| 7,640,390 | B2 | 12/2009 | Iwamura et al. |
| 7,644,239 | B2 | 1/2010 | Ergan et al. |
| 7,660,911 | B2 | 2/2010 | McDaniel |
| 7,660,941 | B2 | 2/2010 | Lee et al. |
| 7,664,239 | B2 | 2/2010 | Groff et al. |
| 7,669,019 | B2 | 2/2010 | Fujibayashi et al. |
| 7,676,625 | B2 | 3/2010 | Cassiday et al. |
| 7,721,059 | B2 | 5/2010 | Milly et al. |
| 7,725,628 | B1 | 5/2010 | Phan et al. |
| 7,831,783 | B2 | 11/2010 | Pandit et al. |
| 7,853,772 | B2 | 12/2010 | Chang et al. |
| 7,856,528 | B1 | 12/2010 | Frost et al. |
| 7,873,782 | B2 | 1/2011 | Terry |
| 7,873,803 | B2 | 1/2011 | Cheng |
| 7,882,305 | B2 | 2/2011 | Moritoki |
| 7,904,647 | B2 | 3/2011 | El-Batal et al. |
| 7,913,051 | B1 | 3/2011 | Todd et al. |
| 7,917,803 | B2 | 3/2011 | Stefanus et al. |
| 7,941,591 | B2 | 5/2011 | Aviles |
| 7,984,230 | B2 | 7/2011 | Nasu et al. |
| 8,019,938 | B2 * | 9/2011 | Flynn et al. ............... 711/113 |
| 8,046,526 | B2 | 10/2011 | Yeh |
| 8,055,820 | B2 | 11/2011 | Sebire |
| 8,127,103 | B2 | 2/2012 | Kano et al. |
| 8,135,900 | B2 | 3/2012 | Kunimatsu et al. |
| 8,151,082 | B2 | 4/2012 | Flynn et al. |
| 8,171,204 | B2 | 5/2012 | Chow et al. |
| 2002/0053009 | A1 | 5/2002 | Selkirk et al. |
| 2002/0069317 | A1 | 6/2002 | Chow |
| 2002/0069318 | A1 | 6/2002 | Chow |
| 2002/0103819 | A1 | 8/2002 | Duvillier |
| 2002/0161855 | A1 | 10/2002 | Manczak et al. |
| 2002/0181134 | A1 | 12/2002 | Bunker et al. |
| 2002/0194451 | A1 | 12/2002 | Mukaida et al. |
| 2003/0061296 | A1 | 3/2003 | Craddock et al. |
| 2003/0093741 | A1 | 5/2003 | Argon et al. |
| 2003/0140051 | A1 | 7/2003 | Fujiwara et al. |
| 2003/0145230 | A1 | 7/2003 | Chiu et al. |
| 2003/0149753 | A1 | 8/2003 | Lamb |
| 2003/0163630 | A1 | 8/2003 | Aasheim et al. |
| 2003/0198084 | A1 | 10/2003 | Fujisawa |
| 2004/0003002 | A1 | 1/2004 | Adelmann |
| 2004/0093463 | A1 | 5/2004 | Shang |
| 2004/0117586 | A1 | 6/2004 | Estakhri et al. |
| 2004/0148360 | A1 | 7/2004 | Mehra et al. |
| 2004/0186946 | A1 | 9/2004 | Lee |
| 2004/0268359 | A1 | 12/2004 | Hanes |
| 2005/0002263 | A1 | 1/2005 | Iwase |
| 2005/0015539 | A1 | 1/2005 | Horii |
| 2005/0027951 | A1 | 2/2005 | Piccirillo et al. |
| 2005/0055497 | A1 | 3/2005 | Estakhri et al. |
| 2005/0076107 | A1 | 4/2005 | Goud et al. |
| 2005/0120177 | A1 | 6/2005 | Black |
| 2005/0132259 | A1 | 6/2005 | Emmot et al. |
| 2005/0141313 | A1 | 6/2005 | Gorobets et al. |
| 2005/0144361 | A1 | 6/2005 | Gonzales et al. |
| 2005/0149618 | A1 | 7/2005 | Cheng |
| 2005/0149819 | A1 | 7/2005 | Hwang |
| 2005/0177672 | A1 | 8/2005 | Rao |
| 2005/0177687 | A1 * | 8/2005 | Rao ............................ 711/118 |
| 2005/0193166 | A1 | 9/2005 | Johnson et al. |
| 2005/0216653 | A1 | 9/2005 | Aasheim et al. |
| 2005/0229090 | A1 | 10/2005 | Shen et al. |
| 2005/0240713 | A1 | 10/2005 | Wu et al. |
| 2005/0246510 | A1 | 11/2005 | Retnamma et al. |
| 2005/0257017 | A1 | 11/2005 | Yagi |
| 2005/0257213 | A1 | 11/2005 | Chu et al. |
| 2005/0273476 | A1 | 12/2005 | Wertheimer et al. |
| 2005/0276092 | A1 | 12/2005 | Hansen et al. |
| 2006/0004955 | A1 | 1/2006 | Ware et al. |
| 2006/0020744 | A1 | 1/2006 | Sinclair et al. |
| 2006/0026339 | A1 | 2/2006 | Rostampour |
| 2006/0059326 | A1 | 3/2006 | Aasheim et al. |
| 2006/0075057 | A1 | 4/2006 | Gildea et al. |
| 2006/0085626 | A1 | 4/2006 | Roberson et al. |
| 2006/0090048 | A1 | 4/2006 | Okumoto et al. |
| 2006/0106968 | A1 | 5/2006 | Wooi Teoh |
| 2006/0129778 | A1 | 6/2006 | Clark et al. |
| 2006/0136657 | A1 | 6/2006 | Rudelic et al. |
| 2006/0143396 | A1 | 6/2006 | Cabot |
| 2006/0149893 | A1 | 7/2006 | Barfuss et al. |
| 2006/0152981 | A1 | 7/2006 | Ryu |
| 2006/0179263 | A1 | 8/2006 | Song et al. |
| 2006/0184722 | A1 | 8/2006 | Sinclair |
| 2006/0190552 | A1 | 8/2006 | Henze et al. |
| 2006/0224849 | A1 | 10/2006 | Rezaul Islam et al. |
| 2006/0236061 | A1 | 10/2006 | Koclaines |
| 2006/0248387 | A1 | 11/2006 | Nicholson |
| 2006/0265636 | A1 | 11/2006 | Hummler |
| 2007/0016699 | A1 | 1/2007 | Minami |
| 2007/0033325 | A1 | 2/2007 | Sinclair |
| 2007/0033326 | A1 | 2/2007 | Sinclair |
| 2007/0033327 | A1 | 2/2007 | Sinclair |
| 2007/0033362 | A1 | 2/2007 | Sinclair |
| 2007/0043900 | A1 | 2/2007 | Yun |
| 2007/0050571 | A1 | 3/2007 | Nakamura et al. |
| 2007/0061508 | A1 | 3/2007 | Zweighaft |
| 2007/0086260 | A1 | 4/2007 | Sinclair |
| 2007/0088666 | A1 | 4/2007 | Saito |
| 2007/0118676 | A1 | 5/2007 | Kano et al. |
| 2007/0118713 | A1 | 5/2007 | Guterman et al. |
| 2007/0124474 | A1 | 5/2007 | Margulis |
| 2007/0124540 | A1 | 5/2007 | van Riel |
| 2007/0136555 | A1 | 6/2007 | Sinclair |
| 2007/0143532 | A1 | 6/2007 | Gorobets et al. |
| 2007/0143560 | A1 | 6/2007 | Gorobets |
| 2007/0143566 | A1 | 6/2007 | Gorobets |
| 2007/0143567 | A1 | 6/2007 | Gorobets et al. |
| 2007/0150689 | A1 | 6/2007 | Pandit et al. |
| 2007/0156998 | A1 | 7/2007 | Gorobets |
| 2007/0162830 | A1 | 7/2007 | Stek et al. |
| 2007/0168698 | A1 | 7/2007 | Coulson et al. |
| 2007/0198770 | A1 | 8/2007 | Horii et al. |
| 2007/0204128 | A1 | 8/2007 | Lee et al. |
| 2007/0204197 | A1 | 8/2007 | Yokokawa |
| 2007/0208790 | A1 | 9/2007 | Reuter et al. |
| 2007/0233455 | A1 | 10/2007 | Zimmer et al. |
| 2007/0233937 | A1 | 10/2007 | Coulson et al. |
| 2007/0245217 | A1 | 10/2007 | Valle |
| 2007/0250660 | A1 | 10/2007 | Gill et al. |
| 2007/0260608 | A1 | 11/2007 | Hertzberg et al. |
| 2007/0261030 | A1 | 11/2007 | Wadhwa |

(56) References Cited

U.S. PATENT DOCUMENTS

| | | |
|---|---|---|
| 2007/0263514 A1 | 11/2007 | Iwata et al. |
| 2007/0266037 A1 | 11/2007 | Terry et al. |
| 2007/0271468 A1 | 11/2007 | McKenney et al. |
| 2007/0271572 A1 | 11/2007 | Gupta et al. |
| 2007/0274150 A1 | 11/2007 | Gorobets |
| 2007/0276897 A1 | 11/2007 | Tameshige et al. |
| 2007/0300008 A1 | 12/2007 | Rogers et al. |
| 2008/0005465 A1* | 1/2008 | Matthews ............... 711/113 |
| 2008/0005748 A1 | 1/2008 | Mathew et al. |
| 2008/0010395 A1 | 1/2008 | Mylly et al. |
| 2008/0034153 A1 | 2/2008 | Lee et al. |
| 2008/0043769 A1 | 2/2008 | Hirai |
| 2008/0052377 A1 | 2/2008 | Light |
| 2008/0059752 A1 | 3/2008 | Serizawa |
| 2008/0091876 A1 | 4/2008 | Fujibayashi et al. |
| 2008/0098159 A1 | 4/2008 | Song et al. |
| 2008/0120469 A1 | 5/2008 | Kornegay et al. |
| 2008/0126507 A1 | 5/2008 | Wilkinson |
| 2008/0126700 A1 | 5/2008 | El-Batal et al. |
| 2008/0126852 A1 | 5/2008 | Brandyberry et al. |
| 2008/0133963 A1 | 6/2008 | Katano et al. |
| 2008/0137658 A1 | 6/2008 | Wang |
| 2008/0140737 A1 | 6/2008 | Garst et al. |
| 2008/0140819 A1 | 6/2008 | Bailey et al. |
| 2008/0183965 A1 | 7/2008 | Shiga et al. |
| 2008/0201535 A1 | 8/2008 | Hara |
| 2008/0205286 A1 | 8/2008 | Li et al. |
| 2008/0209090 A1 | 8/2008 | Kano et al. |
| 2008/0229045 A1 | 9/2008 | Qi |
| 2008/0235443 A1 | 9/2008 | Chow et al. |
| 2008/0243966 A1 | 10/2008 | Croisettier et al. |
| 2008/0263259 A1 | 10/2008 | Sadovsky et al. |
| 2008/0263305 A1 | 10/2008 | Shu et al. |
| 2008/0263569 A1 | 10/2008 | Shu et al. |
| 2008/0276040 A1 | 11/2008 | Moritoki |
| 2008/0294847 A1 | 11/2008 | Maruyama et al. |
| 2009/0043952 A1 | 2/2009 | Estakhri et al. |
| 2009/0070526 A1 | 3/2009 | Tetrick |
| 2009/0070541 A1 | 3/2009 | Yochai |
| 2009/0083478 A1 | 3/2009 | Kunimatsu et al. |
| 2009/0083485 A1 | 3/2009 | Cheng |
| 2009/0089485 A1 | 4/2009 | Yeh |
| 2009/0125650 A1 | 5/2009 | Sebire |
| 2009/0144496 A1 | 6/2009 | Kawaguchi |
| 2009/0150605 A1 | 6/2009 | Flynn et al. |
| 2009/0150641 A1 | 6/2009 | Flynn et al. |
| 2009/0157956 A1 | 6/2009 | Kano |
| 2009/0172250 A1* | 7/2009 | Allen et al. ............. 711/103 |
| 2009/0204750 A1 | 8/2009 | Estakhri et al. |
| 2009/0228637 A1 | 9/2009 | Moon et al. |
| 2009/0235017 A1 | 9/2009 | Estakhri et al. |
| 2009/0248763 A1 | 10/2009 | Rajan et al. |
| 2009/0276588 A1 | 11/2009 | Murase |
| 2009/0276654 A1 | 11/2009 | Butterworth et al. |
| 2009/0287887 A1 | 11/2009 | Matsuki et al. |
| 2009/0292861 A1 | 11/2009 | Kanevsky et al. |
| 2009/0300277 A1 | 12/2009 | Jeddeloh |
| 2009/0307424 A1 | 12/2009 | Galloway et al. |
| 2009/0313453 A1 | 12/2009 | Stefanus et al. |
| 2009/0327602 A1 | 12/2009 | Moore et al. |
| 2009/0327804 A1 | 12/2009 | Moshayedi |
| 2010/0005228 A1 | 1/2010 | Fukutomi et al. |
| 2010/0017556 A1 | 1/2010 | Chin et al. |
| 2010/0023674 A1 | 1/2010 | Aviles |
| 2010/0023676 A1 | 1/2010 | Moon et al. |
| 2010/0023682 A1 | 1/2010 | Lee et al. |
| 2010/0030946 A1 | 2/2010 | Kano et al. |
| 2010/0076936 A1 | 3/2010 | Rajan |
| 2010/0077194 A1 | 3/2010 | Zhao et al. |
| 2010/0095059 A1 | 4/2010 | Kisley et al. |
| 2010/0169542 A1 | 7/2010 | Sinclair |
| 2010/0174870 A1* | 7/2010 | Banerjee ............... 711/143 |
| 2010/0205231 A1 | 8/2010 | Cousins |
| 2010/0205335 A1 | 8/2010 | Phan et al. |
| 2010/0211737 A1 | 8/2010 | Flynn et al. |
| 2010/0235597 A1 | 9/2010 | Arakawa |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2011/0016260 A1* | 1/2011 | Lomelino et al. ......... 711/103 |
| 2011/0022819 A1 | 1/2011 | Post et al. |
| 2011/0055458 A1* | 3/2011 | Kuehne ............... 711/103 |
| 2011/0258391 A1 | 10/2011 | Atkisson et al. |
| 2011/0258512 A1 | 10/2011 | Flynn et al. |

FOREIGN PATENT DOCUMENTS

| | | |
|---|---|---|
| EP | 1418502 | 5/2004 |
| EP | 1418502 A2 | 5/2004 |
| EP | 1814039 A2 | 8/2007 |
| EP | 1814039 | 3/2009 |
| GB | 0123416 | 9/2001 |
| JP | 8153014 | 6/1996 |
| JP | 2000259525 | 9/2000 |
| JP | 4242848 | 1/2009 |
| JP | 2009122850 | 6/2009 |
| WO | WO94/19746 | 9/1994 |
| WO | WO9419746 | 9/1994 |
| WO | WO95/18407 | 7/1995 |
| WO | WO9518407 | 7/1995 |
| WO | WO96/12225 | 4/1996 |
| WO | WO9612225 | 4/1996 |
| WO | WO0131512 A2 | 5/2001 |
| WO | WO0201365 | 1/2002 |
| WO | WO0201365 A2 | 1/2002 |
| WO | WO2004/099989 | 11/2004 |
| WO | WO2005/103878 | 11/2005 |
| WO | WO2006/062511 | 6/2006 |
| WO | WO2006/065626 | 6/2006 |
| WO | WO2008/130799 | 3/2008 |
| WO | WO2008070173 | 6/2008 |
| WO | WO2008073421 | 6/2008 |
| WO | WO2011/106394 | 9/2011 |

OTHER PUBLICATIONS

Chen, "Hystor: Making SSDs the Survival of the Fittest in High Performance Storage Systems", Proceedings of 25th ACM International Conference on Supercomputing (ICS 2011), Tucson, Arizona, May 31-Jun. 4, 2011.

Cambridge Computer Services, Inc., 2008 ©, http://www.clusteredstorage.com/clustered_storage_solutions.html, visited Feb. 16, 2010.

Annonymous, "Method to Improve Reliability to SSD Arrays", http://ip.com, IP.com No. IPCOM000189338D, Nov. 5, 2009.

Stow: Spatially and Temporally Optimized Write Caching Algorithm, Gill, Ko, Debnath, Belluomini, http://www.usenix.org/event/usenix09/tech/slides/gill.pdf. Presented Usenix Nov. 2009. Accessed Apr. 2010.

Leventhal, "Flash Storage Memory, Communications of the ACM", http://arstechnica.com/hardware/news/2009/09/intels-new-flash-tech-to-bring-back-turbo-memory-for-real, ACM, vol. 51, No. 7, p. 47-51, Jul. 2008.

Stokes, Intel's New Flash Tech to Bring Back Turbo Memory, for Real, Sep. 2009, http://arstechnica.com/hardware/news/2009/09/intels-new-flash-tech-to-bring-back-turbo-memory-for-real.ars.

Wikipedia, "Adaptive Replacement Cache", last modified Jun. 25, 2012, http://en.wikipedia.org/wiki/Adaptive_replacement_cache.

Coburn, "NV-Heaps: Making Persistent Objects Fast and Safe with Next-Generation, Non-Volatile Memories", ACM 978-1-4503-0266-1/11/0, published Mar. 5, 2011.

(56) References Cited

OTHER PUBLICATIONS

Volos, "Mnemosyne: Lightweight Persistent Memory", ACM 978-1-4503-0266-1/11/03, published Mar. 5, 2011.
CIPO, "Office Action for CN Application No. 200780050973.4", issued Jan. 26, 2011.
EPO, "Office Action for EP Application No. 07867661.6", issued Oct. 6, 2011.
Kawaguchi, "A Flash-Memory Based File System", Advanced Research Laboratory, Hitachi, Ltd. (1995).
Plank, A Tutorial on Reed-Solomon Coding for Fault Tolerance in RAID-like System, Department of Computer Science, University of Tennessee, 1999.
Johnson, "An Introduction to Block Device Drivers", 1995.
ASINE®, "ASPMC-660 Rugged IDE Flash Drive PMC Module", http://www.asinegroup.com/products/aspmc660.html, copyright 2002.
AGIGATECH, "Bulletproof Memory for RAID Servers, Parts 1-3", http://agigatech.com/blog/bulletproof-memory-for-raid-servers-part-1/, 2009.
Casey, "Disk I/O Performance Scaling: the File Caching Solution", Solid Data Systems, Inc., Paper #528, Mar. 2001, pp. 1-8.
Casey, Solid State File-Caching for Performance and Scalability, SolidData, Quarter 1 2000, http://www.storagesearch.com/3dram.html, accessed May 15, 2012.
Bandulet, "Object-Based Storage Devices", Oracle®, http://developers.sun.com/solaris/articles/osd.html, Jul. 2007.
Van Hensbergen, "Dynamic Policy Disk Caching for Storage Networking", IBM Research Division, RC24123 (W0611-189), Nov. 2006.
Wu, "eNVy: A Non-Volatile, Main Memory Storage System", ACM 0-89791-660-3/94/0010, 1994.
Novell, "File System Primer", http://wiki.novell.com/index.php/File_System_Primer, 2006, visited Oct. 18, 2006.
Gill, "WOW: Wise Ordering for Writes—Combining Spatial and Temporal Locality in Non-Volatile Caches", IBM, Fast '05: 4th USENIX Conference on File and Storage Technologies, 2005.
Microsoft, "How NTFS Works", http://technet.microsoft.com/en-us/library/cc781134(WS.10).aspx , 2003.
Slashdot, "Slashdot Hynix 48-GB Flash MCP", "News for Nerds, stuff that matters", http://hardware.slashdot.org/article.pl?sid=07/09/06/146218&from=rss, Jul. 9, 2006.
Dan, "Implementing MLC NAND Flash for Cost-Effective, High-Capacity Memory", M-Systems, White Paper, 91-SR-014-02-8L, Rev 1.1, Sep. 2003.
INCITS, Information Technology—SCSI Object-Based Storage Device Commands (OSD), Reference No. ISO/IEC 14776-391:200x, Revision 10, 2004.
Samsung Electronics, "Introduction to Samsungs Linux Flash File System—RFS Application Note", Nov. 2006, Version 1.0.
Morgenstern, David, "Is There a Flash Memory RAID in your Future?", http://www.eweek.com—eWeek, Ziff Davis enterprise Holdings Inc., Nov. 8, 2006.
Woodhouse, "JFFS: The Journaling Flash File System", Ottawa Linux Symposium, http://sources.redhat.com/jffs2/jffs2.pdf, Jul. 2001, visited May 15, 2012.
SOLIDATA, Best Practices Guide, Sybase: Maximizing Performance through Solid State File-Caching, May 2000.
Anonymous, "Method for Fault Tolerance in Nonvolatile Storage", ip.com, IP.com No. IPCOM000042269D, 2005.
MICRON Technology, Inc., "NAND Flash 101: An Introduction to NAND Flash and How to Design It In to Your Next Product", TN-29-19, 2006.
Mesnier, "Object-Based Storage", IEEE Communications Magazine, Aug. 2003.
PCT, "International Preliminary Report on Patentability for PCT/US2007/025049", mailed Mar. 11, 2009.
PCT, "International Search Report and Written Opinion for PCT/US2007/025049", mailed May 14, 2008.
ARI, Performance Boosting and Workload Isolation in Storage Area Networks with SanCache, Hewlett Packard Laboratories, Proceedings of the 23rd IEEE / 14th NASA Goddard Conference on Mass Storage Systems and Technologies (MSST 2006), May 2006, pp. 263-273.
Pivot 3, "Pivot3 RAIGE Storage Cluster", Technology Overview, White Paper, Jun. 2007.
Casey, "San Cache: SSD In the San", Storage Inc., 2000.
MICRON Technology, Inc., "Technical Note: Design and Use Considerations for NAND Flash Memory" (TN-29-17), 2006.
MICRON Technology, Inc., "Technical Note: Hamming Codes for NAND Flash Memory Devices" (TN-29-08), 2005.
Seagate, "The Advantages of Object-Based Storage—Secure, Scalable, Dynamic Storage Devices", Seagate Research Technology Paper TP-536, Apr. 2005.
Rosenblum, "The Design and Implementation of a Log-Structured File System," 1992.
WACHA, "Improving RAID-Based Storage Systems with Flash Memory", First Annual ISSDM/SRL Research Symposium, Oct. 2009.
Wang, "OGFS: A File System for Object-based Storage Devices", 21st IEEE/12th NASA Goddard Conference on Mass Storage Systems and Technologies, Apr. 2004.
DataDirect Networks, White Paper: S2A9550 Overview, © 2007.
Microsoft Corporation, Windows PC Accelerators, XP-002476842, Nov. 2006.
Yerrick, "Block Device", http://www.pineight.com/ds/block/, 2005-2006, visited Mar. 1, 2010.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Barrall et al., U.S. Appl. No. 60/625,495, "Dynamically EXpandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
Bitmicro, "BiTMICRO Introduces E-Disk PMC Flash Disk Module at Military & Aerospace Electronics East 2004," http://www.bitmicro.com/press.sub, published May 18, 2004, visited Mar. 8, 2011.
Brandon, Jr., "Sparse Matrices in CS Education," Journal of Computing Sciences in Colleges, vol. 24 Issue 5, May 2009, pp. 93-98.
ELNEC, "NAND Flash Memories and Programming NAND Flash Memories Using ELNEC Device Programmers, Application Note," published Mar. 1, 2007.
European Patent Office, Office Action, EP Application No. 07865345.8, issued Nov. 17, 2010.
Gal, "A Transactional Flash File System for Microcontrollers," 2005 USENIX Annual Technical Conference, published Apr. 10, 2009.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Gutmann, "Secure Deletion of Data from Magnetic and Solid-State Memory", UseniX, 14 pages, San Jose, CA, published Jul. 1, 1996.
Huffman, "Non-Volatile Memory Host Controller Interface," Apr. 14, 2008, 65 pgs.
Hynix Semiconductor, Intel Corporation, Micron Technology, Inc. Phison Electronics Corp., Sony Corporation, Spansion, STMicroelectronics, "Open NAND Flash Interface Specification," Revision 2.0, Feb. 27, 2008.
Information Technology, "SCSI Object-Based Storage Device Commands," 2 (OSD-2), Project T10/1729-D, Revision 4, published Jul. 30, 2004, printed Jul. 24, 2008.
Intel, "Non-Volatile Memory Host Controller Interface (NVMHCI) 1.0," Apr. 14, 2008.
Johnson, "An Introduction to Block Device Drivers," Jan. 1, 1995.
Porter, "Operating System Transactions," ACM 978-1-60558-752-3/09/10, published Oct. 1, 2009.
Probert, "Windows Kernel Internals Cache Manager," Microsoft Corporation, http://www.i.u.-tokyo.co.jp/edu/training/ss/lecture/new-documents/Lectures/15- CacheManager/CacheManager.pdf, printed May 15, 2010.

(56) References Cited

OTHER PUBLICATIONS

Ranaweera, 05-270RO, SAT: Write Same (10) command (41h), T10/ 05, Jul. 7, 2005, www.t10.org/ftp/t10/document.05/05-270r0.pdf, last visited Apr. 11, 2013.
Sears, "Stasis: FleXible Transactional Storage," OSDI '06: 7th USENIX Symposium on Operating Systems Design and Implementation, published Nov. 6, 2006.
Seltzer, "File System Performance and Transaction Support", University of California at Berkeley, published Jan. 1, 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/UploadedDocuments/docs2008/e07154r6-Data_Set_Management_Proposal_for_ATA-ACS2.pdf, printed Apr. 5, 2010.
Spansion, "Data Management Software (DMS) for AMD Simultaneous Read/Write Flash Memory Devices", published Jul. 7, 2003.
Spillane "Enabling Transactional File Access via Lightweight Kernel EXtensions", Stony Brook University, IBM T. J. Watson Research Center, published Feb. 25, 2009.
State Intellectual Property Office, Office Action, CN Application No. 200780050970.0, issued Oct. 28, 2010.
State Intellectual Property Office, Office Action, CN Application No. 200780051020.X, issued Nov. 11, 2010.
State Intellectual Property Office, Office Action, CN Application No. 200780050983.8, issued May 18, 2011.
State Intellectual Property Office, Office Action, CN Application No. 200780051020.X, issued Jul. 6, 2011.
State Intellectual Property Office, Office Action, CN Application No. 200780051020.X, issued Nov. 7, 2011.
State Intellectual Property Office, Office Action, CN Application No. 200780050970.0, issued Jan. 5, 2012.
Terry et al., U.S. Appl. No. 60/797,127, "Filesystem-aware Block Storage System, Apparatus, and Method," filed May 3, 2006.
USPTO, Notice of Allowance for U.S. Appl. No. 12/986,117, Mailed Apr. 4, 2013.
USPTO, Notice of Allowance for U.S. Appl. No. 12/986,117 Mailed Jun. 5, 2013.
USPTO, Office Action for U.S. Appl. No. 12/879,004 mailed Feb. 25, 2013.
USPTO, Office Action for U.S. Appl. No. 13/607,486 mailed Jan. 10, 2013.
USPTO, Office Action for U.S. Appl. No. 11/952,113, mailed Dec. 15, 2010.
USPTO, Office Action for U.S. Appl. No. 12/711,113, mailed Jun. 6, 2012.
USPTO, Office Action for U.S. Appl. No. 12/711,113, mailed Nov. 23, 2012.
USPTO, Office Action for U.S. Appl. No. 13,607,486 mailed May 2, 2013.
USPTO, Office Action for U.S. Appl. No. 13/118,237 mailed Apr. 22, 2013.
USPTO, Notice of Allowance, U.S. Appl. No. 11/952,109, issued May 1, 2013.
USPTO, Office Action, U.S. Appl. No. 11/952,109, mailed Nov. 29, 2011.
WIPO, International Preliminary Report of Patentability for PCT/US2007/086691, mailed Feb. 16, 2009.
WIPO, International Preliminary Report on Patentability for PCT/US2007/086688, mailed Mar. 16, 2009.
WIPO, International Preliminary Report on Patentability for PCT/US2007/086701, mailed Mar. 16, 2009.
WIPO, International Preliminary Report on Patentability for PCT/US2007/086687, mailed Mar. 18, 2009.
WIPO, International Preliminary Report on Patentability for PCT/US2007/025048, mailed Jun. 10, 2009.
WIPO, International Preliminary Report on Patentability for PCT/US2010/048325, mailed Mar. 13, 2012.
WIPO, International Search Report and Written Opinion for PCT/US2007/025048, mailed May 27, 2008.
WIPO, International Search Report and Written Opinion for PCT/US2007/086701, mailed Jun. 5, 2008.
WIPO, International Search Report and Written Opinion for PCT/US2007/086687, mailed Sep. 5, 2008.
WIPO, International Search Report and Written Opinion for PCT/US2010/048325, mailed Jun. 1, 2011.
WIPO, International Search Report and Written Opinion for PCT/US2011/025885, mailed Sep. 28, 2011.
Wright, "EXtending ACID Semantics to the File System", ACM Transactions on Storage, vol. 3, No. 2, published May 1, 2011, pp. 1-40.
Zhang et al., "De-indirection for Flash-Based SSDs with Nameless Writes," UseniX InFast 2012 (Feb. 14, 2012).

\* cited by examiner

APPARATUS, SYSTEM, AND METHOD FOR CACHING DATA ON A SOLID-STATE STORAGE DEVICE

CROSS-REFERENCE TO RELATED APPLICATIONS

This application claims priority to U.S. Provisional Application No. 61/240,573, entitled "Apparatus, System, and Method for an Improved Nonvolatile Caching Device," filed on Sep. 8, 2009, to U.S. Provisional Application No. 61/240, 966, entitled, "Apparatus, System, and Method for Allocating Solid-State Storage," filed on Sep. 9, 2009, and to U.S. Provisional Application No. 61/373,271, entitled "Apparatus, System, and Method for Caching Data," filed on Aug. 12, 2010, each of which is incorporated by reference in its entirety.

FIELD OF THE INVENTION

This invention relates to caching data on a solid-state storage device and, in particular, to maintaining metadata pertaining to the cache and the solid-state storage device for use in managing the cache and performing grooming operations.

DESCRIPTION OF THE RELATED ART

Cache devices are storage devices that are used to allow data to be accessed more quickly in a system. Caches can significantly improve performance in systems by reducing the input/output (I/O) time for operations that use the data in the cache. Generally, the cache is implemented in front of another storage device which has greater storage capacity, but slower I/O times, than the cache device. The benefits of caches are well understood and caches have been implemented advantageously in a variety of contexts and scales ranging from the caches in CPUs to caches in storage area networks (SANs).

The nature of the cache may also vary based on the context; for example, in a single computer (such as a desktop or a laptop) the cache may be implemented in volatile memory, such as static random access memory (SRAM), dynamic random access memory (DRAM), or others. Currently, cache grooming is inefficient because it is separate from other memory management operations.

SUMMARY

A solid-state storage device may operate as a nonvolatile cache device for a nonvolatile backing store. The solid-state storage device may be transparent to the clients using the logical space presented by the solid-state storage device. In some embodiments, the solid-state storage device may be configured to present a logical size to the client that is the same as the physical size of the backing store, such that the solid-state storage device presents to clients a logical storage space that is the same size as the backing store, regardless of the physical storage size of the solid-state storage device. Alternatively, or in addition, the solid-state storage device may present a logical address space to the client that exceeds a physical storage capacity of both the solid-state storage device and the backing store.

The solid-state storage device may maintain metadata pertaining to cache operations and storage operations performed on the solid-state storage device. The storage metadata may include, but is not limited to metadata pertaining to sequential storage operations performed on the solid-state storage device (e.g., associations between client logical addresses and storage units on the device, storage log metadata, etc.), maintenance operations pertaining to the sequential storage operations (e.g., storage recovery, garbage collection, error correction, etc.), the status of the storage media (e.g., wear levels, reliability, integrity, etc.), and so on. The storage metadata may comprise validity indicators to distinguish between storage units comprising valid data from those comprising invalid data. A storage unit may refer to any addressable storage location on the solid-state storage device.

The solid-state storage device may cache data in storage units of the solid-state storage device. The cache metadata may comprise metadata pertaining to the cache stored on the solid-state storage device, cache operations performed on the solid-state storage device (e.g., access patterns, etc.), cache management (e.g., cache eviction and/or retention policy, cache attributes, cache directives, etc.), and so on. The cache metadata may comprise discardability indicators to identify data that can be discarded. Discardable data may be cache data that has been backed up (e.g., stored) on a backing store.

The metadata maintained by the solid-state storage device may comprise cache entries, which may represent data cached on the device (e.g., data cached in the storage units of the solid-state storage device). A cache entry may associate a logical address (of a storage client) with one or more storage locations (e.g., storage units) on identifying where the data is stored on the solid-state storage device; a cache entry may provide an index or mapping between client logical addresses, and solid-state storage device storage locations (e.g., storage units). In some embodiments, a cache entry may have a variable size, and as such, may reference a portion of a storage unit, a single storage unit, and/or multiple storage units on the solid-state storage device. For instance, a first cache entry may comprise a first amount of data on a single storage unit (e.g., 256 bytes on a portion of a single storage unit), whereas a second cache entry may comprise a second, different amount of data on multiple storage units (e.g., 4 kilobytes on a plurality of storage units, or virtual storage unit).

The cache entries may be indexed by logical address, which may enable fast and efficient access to the cache entries responsive to client storage requests. The cache entries may be used to store (and/or reference) shared metadata, including metadata related to sequential storage operations of the solid-state storage device, as well as the cache. For example, a groomer (described below) of the solid-state storage device may access the metadata pertaining to the cache to efficiently perform storage recovery and/or maintenance operations. Similarly, a cache manager (described below) operating on and/or in conjunction with the solid-state storage device may access the metadata to efficiently manage the cache (e.g., make cache policy decisions pertaining to cache eviction and/or retention, and so on). In some embodiments, the solid-state storage device may provide a storage interface (or "interface" generally), which may expose portions of the metadata to a storage client. Using the interface, a storage client may configure the solid-state storage device (e.g., set cache attributes, cache directives, issue TRIM commands, and so on). In addition, the interface may expose a "sparse" or "thinly provisioned" logical address space through the interface, which may allow the storage client to interact with the solid-state storage device without a redundant address translation layer (e.g., within a full 64 bit address space).

In some embodiments, a backup engine may be configured to backup data cached on the solid-state storage device to a backing store. When stored on the backing store, metadata associated with the data (e.g., associated with the cache entry and/or corresponding storage units) may be updated to indicate that the data is discardable. The backup engine may iterate through the storage units of the solid-state storage device chronologically (from oldest to newest). The traversal may be enabled by the shared metadata maintained by the solid-state storage device (e.g., the reverse index and/or sequence indicators of the storage units). The operation of the backup engine may be informed by the storage metadata; for example, the backup engine may ignore data associated with cache entries (and/or in associated storage units) that the metadata indicates are invalid (e.g., data has been moved to a different storage location due to a recovery operation, a sequential write, modification, or the like).

In some embodiments, the backup engine operates at a relatively low priority (e.g., as a background process or operation). The backup engine may be configured to operate at a higher priority when needed. For example, the metadata may indicate a physical storage capacity, a target occupancy, a maximum occupancy, and/or a current occupancy of the solid-state storage device. When the current occupancy exceeds a threshold (e.g., exceeds the target occupancy, the maximum occupancy, or some other threshold), the background engine may be configured to operate at a higher priority.

Storage recovery and maintenance operations may be similarly informed by the metadata. For example, a groomer process configured to recover storage divisions of the solid-state storage device may be prioritized using the metadata (e.g., priority increased when the current occupancy exceeds a threshold). The groomer may access metadata related to the cache in performing its data recovery operations. For example, the groomer may select storage divisions for recovery based on the metadata, may select storage units in a storage division to be retained (e.g., moved to a different storage division) using the metadata, and so on.

Accordingly, in some embodiments, a method for caching data on a solid-state storage device may comprise: maintaining metadata pertaining to cache operations performed on a solid-state storage device and to storage operations of the solid-state storage device; accessing the metadata to manage storage operations of the solid-state storage device; and accessing the metadata to manage a cache stored on the solid-state storage device. The metadata pertaining to cache operations and the metadata pertaining to storage operations may be stored in a shared datastructure.

The metadata may comprise discardability indicators identifying storage units that have been stored on a backing store, and the indicators may be used to select storage divisions for recovery. Cache eviction metadata (e.g., cold, hot, warm, etc.) may be used to select storage divisions for recovery and/or to determine whether storage units in a storage division selected for recovery should be retained. The metadata may be associated with a logical address of the cache entry and, as such, may remain associated with the cache entry when the storage location of the corresponding data changes on the solid-state storage device.

The metadata pertaining to the cache (e.g., shared cache metadata) may be used to manage sequential storage operations of the solid-state storage device, such as storage division recovery, garbage collection, error management, sequential storage (e.g., log-based storage operations), and so on. Metadata pertaining to sequential storage operations (e.g., shared storage metadata) may be used to manage the cache. For example, cache operations such as backup, cache eviction, occupancy, cache data movement, and the like may be informed by the shared, storage metadata.

The metadata may comprise a plurality of cache entries, each associating a logical address with storage units on the solid-state storage device comprising the data of the cache entry. Client storage requests may be serviced using the cache entries. If a cache entry for a particular logical address exists in the metadata, the corresponding data may be available on the solid-state storage device; otherwise, the data may not be available (and a cache miss may occur). Client storage requests may be serviced quickly and efficiently, since the cache entries are indexed by logical address (e.g., in a B-Tree datastructure). The metadata may be used to determine a current occupancy of the solid-state storage device. The client entries may be modified responsive to cache and/or storage operations. When proximate logical addresses are stored, the corresponding cache entries may be merged, which may reduce the number of entries that must be searched to find a particular logical address. Similarly, when logical addresses are removed, the corresponding cache entries may (or may not) be split. The cache entries may be of variable size and, as such, may comprise a single logical address, a range of logical addresses, a set of logical addresses, or the like.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least some embodiments of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in some embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
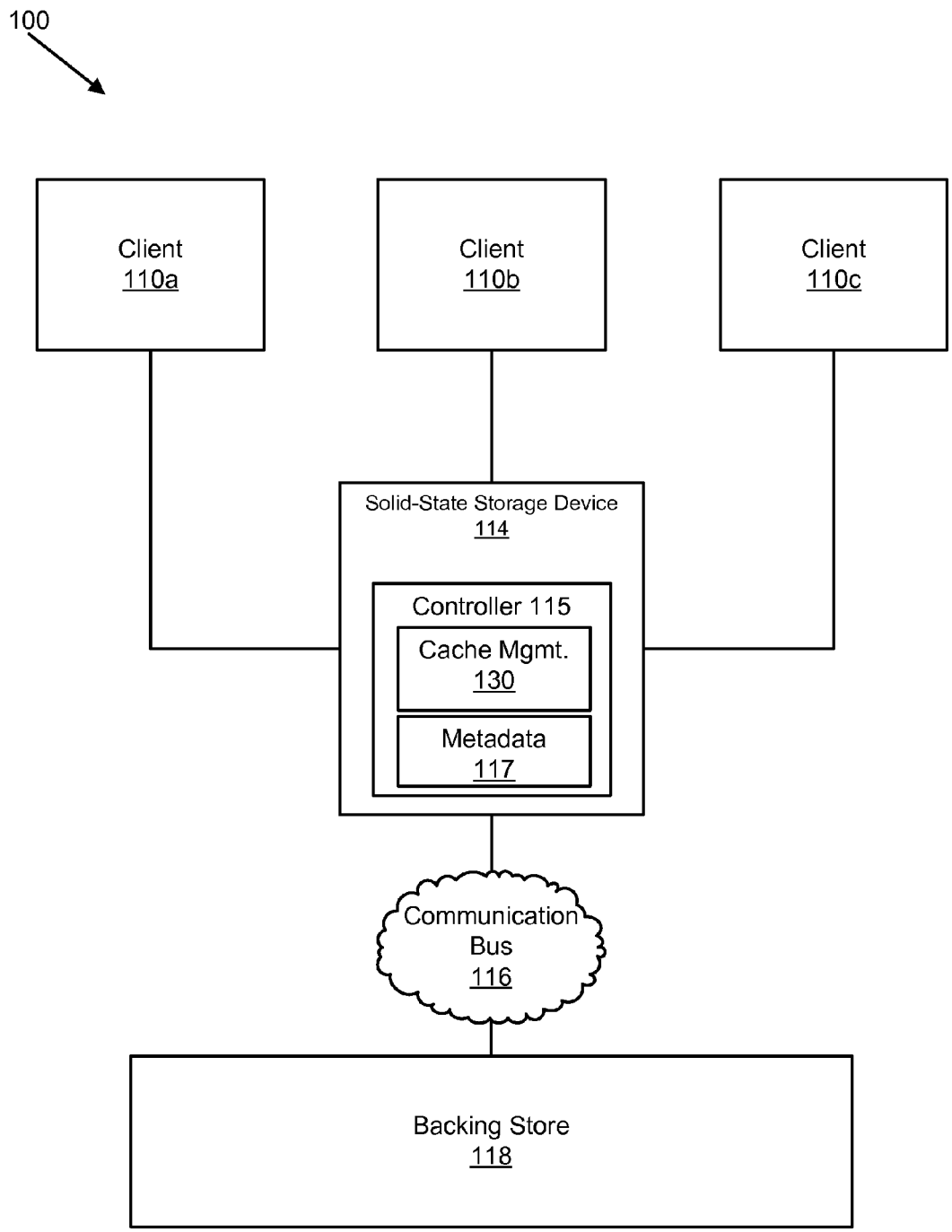
FIG. 1 is a schematic block diagram illustrating an exemplary embodiment of a system a solid-state storage device configured to cache data.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

As used herein, metadata may refer to any data pertaining to the operation of the solid-state storage device. Accordingly, metadata may refer to cache metadata and/or storage metadata. In some embodiments, the solid-state storage device may be configured to maintain a shared datastructure comprising cache and/or storage metadata. The datastructure may be accessible by a cache manager, a groomer, and/or other management modules, which may use the metadata to efficiently manage caching, storage, and/or maintenance operations (e.g., grooming) of the solid-state storage device.

As used herein, cache metadata may refer to any data pertaining to a cache stored on the solid-state storage device and/or to cache operations performed on the solid-state storage device. Cache metadata may include, but is not limited to: discardability indicators to identify cache entry storage units that have been backed up to a backing store, cache eviction metadata, cache attributes (e.g., PIN, BLACKLIST), cache directives (e.g., Flush), and so on. For example, cache eviction metadata may comprise data access patterns, such as least recently used patterns, access frequency, and so on. The cache eviction metadata may be used to make cache eviction decisions regarding particular cache entries. For example, the cache eviction metadata may be used to identify a cache entry that is "hot," "warm," and/or cold, or the like. Cold cache entries may be candidates for eviction, whereas "hot" entries may be retained. The cache eviction metadata may also include cache attributes, such as PIN, BLACKLIST, or the like, which may be used to manage cache operations (e.g., a PIN directive may prevent data from being evicted from the solid-state storage device). Similarly, the cache eviction metadata may respond to cache directives, such as a "FLUSH" directive to flush or evict a cache entry from the cache.

As used herein, storage metadata may refer to any data pertaining to solid-state storage media of the solid-state storage device and/or storage operations performed on the solid-state storage device. Storage metadata may include, but is not limited to: validity indicators to identify valid and/or invalid data on the solid-state storage device, forward indexing metadata to provide efficient logical address to storage unit lookups, reverse indexing metadata to provide efficient storage unit to logical address lookups, occupancy metadata (e.g., data stored on the solid-state storage device, occupancy threshold, etc.), storage media status (e.g., wear level, reliability, error rate, etc.), sequential storage metadata (e.g., logging, etc.), and so on.

As used herein, a storage unit may refer to any location for storing data on the solid-state storage device. Therefore, a storage unit may comprise a block of a solid-state storage element, a virtual block comprising blocks, or portions thereof, on a plurality of solid-state storage elements, a page, a virtual page comprising pages, or portions thereof of a plurality of solid-state storage elements, an storage division, a virtual storage division, an erase block, a virtual erase block, or the like.

A storage unit may be part of a storage division. As used herein, a storage division may refer to an erasable division of the solid-state storage device. Accordingly, a storage division may refer to an erase block of a solid-state storage element, a virtual erase block comprising storage divisions, or portions thereof, on a plurality of solid-state storage elements, or the like.

In some embodiments, a cache may comprise a plurality of "cache entries." A cache entry may comprise a logical address (or range of logical addresses, the range of logical addresses may include ordered addresses, unordered addresses, contiguous addresses, and noncontiguous addresses) and one or more storage units on which data corresponding to the logical addresses is stored on the solid-state storage device. The data of a cache entry may be stored on a portion of a storage unit, a single storage unit, and/or multiple storage units. A cache entry may have a variable size. As discussed above, a cache entry may be associated with a logical address of a client. The associations between logical addresses and respective cache entries may be maintained by the solid-state storage device 114 (e.g., in metadata 117). The data of a cache entry may be stored within a storage unit of the solid-state storage device (e.g., a page, a virtual page, an erase block, and/or erase block). Alternatively, the data of a cache entry may cross storage boundaries (e.g., be stored on a plurality of pages, virtual pages, erase blocks, and/or virtual erase blocks).

The metadata maintained by solid-state storage device may comprise a plurality of cache entries, each associating a logical address with corresponding storage units on the solid-state storage device. These associations may be maintained in a map or index (referred to as a "forward map" or "forward index"). As used herein, a forward map or forward index (or index generally) may refer to any datastructure capable of associating cache entry logical addresses (e.g., logical block addresses from a client) with storage units of the solid-state storage device. In some embodiments, the index may comprise a tree datastructure structure, such as a B-tree or the like. The tree datastructure may comprise cache entries indexed by logical address, or set of logical addresses (e.g., as a range and/or length). Accordingly, the index may be referred to as a Range B-Tree or (B-Tree generally). Examples of datastructures comprising a plurality of cache entries are described below in conjunction with FIG. 11.

The forward index may be used to determine whether data corresponding to a logical address is stored on the solid-state storage device. For example, if a node associated with the address is in the index, then valid data for the address is available on the solid-state storage device; otherwise, if no node exists in the index, data corresponding to the logical address is not stored on the solid-state storage device).

The metadata may further comprise a reverse index, which may index storage units by their physical address (as opposed to indexing by logical address as in the forward map). Accordingly, the reverse index may provide fast and efficient lookups of particular storage units and/or provide for a sequential traversal through a physical address space of the solid-state storage device. In some embodiments, a reverse index may link to the same nodes (leaf nodes) as the forward index (e.g., the reverse index may mirror the forward index, differing in that leaf nodes are indexed by physical as opposed to logical addresses). Alternatively, the reverse index may comprise a separate datastructure, such as a tree, map, array, table, bitmap, or the like. In some embodiments, the reverse index may provide associations between storage units and storage unit metadata, such as a validity indicator, discardability indicator (e.g., whether the data of the storage unit has been stored on a backing store), storage unit wear level, error rate, access patterns, and the like.

As used herein, cache eviction metadata, may refer to metadata used to make cache eviction (or retention) decisions. Cache eviction metadata may be associated with a cache entry, and as such, may be indexed by logical address, as opposed to a particular storage location on the solid-state storage device. This may allow the cache eviction metadata to be maintained despite changes to the physical storage location of the data (e.g., due to sequential storage operations). Cache eviction metadata may identify cache entries that are "hot," "warm" and/or "cold." As used herein, "hot," "warm," and/or "cold" data may refer to data having a particular access and/or use pattern, physical spatial relationship to other data (in other words the "temperature" of a set of data may be determined or influenced by closely the data is physically on the media or logically in the logical address space to other data used in the cache). For instance, "hot" or "warm" data may refer to data that has been recently accessed and/or has been accessed at a particular frequency (as indicated by the cache eviction metadata). On the other hand, "cold" data may refer to data that has not been accessed within a particular time threshold, at a particular frequency, or the like (also as indicated by the cache eviction metadata). Various different techniques and/or data access patterns known in the art may be used to identify "hot," "warm," and/or "cold" data, any of which may be implemented under the teachings of this disclosure. In addition, cache eviction metadata may comprise cache attributes and/or directives. The cache attributes may inform cache management; for example, a "PIN" cache directive may prevent a particular cache entry from being evicted from the solid-state storage device, and a "BLACKLIST" attribute and/or "FLUSH" directive may prevent data from being retained in the cache.

In some embodiments, the solid-state storage device may store data sequentially. As used herein, sequential storage may refer to an out-of-place storage scheme in which data is stored at one or more append points. Accordingly, when data stored on the solid-state storage device is modified (or restored for some other reason), the data may be stored at different storage units of the solid-state storage device (e.g., as opposed to be re-written to the same storage unit where the data was originally stored).

Sequential storage may also refer to a mechanism for maintaining storage metadata (e.g., log-based storage) by the solid-state storage device. The storage metadata may allow the sequence of storage operations performed on the solid-state storage device to be reconstructed or replayed. The storage metadata may include storage division timestamps, sequence indicators, packets headers, forward and/or reverse indexes and so on. For example, when data corresponding to a first logical address is stored on the solid-state storage device, logging data may be maintained. The metadata may comprise indexing the data in the forward index (e.g., B-Tree) disclosed above. For example, a cache entry corresponding to the logical address may be added to the index, which may be configured to reference storage units on the solid-state storage device comprising data corresponding to the logical address. As discussed above, the logical address may comprise an address and length or range, and/or may comprise a set of logical address. When the data is modified by a client (or other entity), the modified data may be stored sequentially (e.g., "out-of-place") on the solid-state storage device. Accordingly, the storage units comprising the valid data associated with the logical addresses may change. The cache entry may be updated to reflect the new storage unit(s), and the old storage units may be invalidated (e.g., in a reverse index, or other data structure). This sequence of storage operations may be replayed using the forward map, sequence indicators stored on the solid-state storage device, and/or other storage metadata (e.g., a reverse index, or the like). Other sequential storage operations may include, but are not limited to: storage division recovery, garbage collection, error management, virtual storage management, sequential storage (e.g., log-based storage operations), and so on. As used herein, a sequential storage operation may refer to any storage operation described above.

FIG. 1 shows one embodiment of a system 100 comprising clients 110a-c, a solid-state storage device 114 configured to operate as a cache, a communication bus 116, and backing store 118. The system 100 may be a storage attached network ("SAN"), network attached storage ("NAS"), or other configuration of clients 110a-c and backing store 118 with a solid-state storage device 114. The clients 110a-c are computing devices that access data stored in the backing store 110. The clients 110a-c may be personal computers, such as desktops, workstations, servers, or other particular types of computing devices. Alternatively, or in addition, the clients 110a-c may comprise processes or services operating on a computing device, such as an operating system (OS), file system (FS), web server, database server, or the like.

The solid-state storage device 114 may be configured to provide caching services to the clients 110a-c and/or the backing store 118. Using the solid-state storage device 114 as a cache may provide a number of different benefits. For example, the access time for clients 110a-c reading from the solid-state storage device 114 and writing to the solid-state storage device 114 may be less than the access times for clients 110a-c reading and writing data directly from/to the backing store 118, the solid-state storage device 114 allows the clients 110a-c to access data more quickly. In some embodiments, the solid-state storage device 114 may present a logical interface to the clients 110a-c, which may comprise a logical address space that exceeds a physical storage capacity of the solid-state storage device 114. The logical address space may correspond to the physical storage capacity of the backing store 118, which may allow the clients to interact with the solid-state storage device 114 transparently (e.g., as if they were accessing the backing store 118 directly). Alternatively, or in addition, the solid-state storage device 114 may present a logical address space that exceeds the physical storage capacity of both the solid-state storage device 114, and the backing store 118 (e.g., a "sparse" or "thin" logical address space). The logical address space may comprise a 64 bit address space, a 32 bit address space, or another addressing scheme used by the clients 110a-c.

The solid-state storage device 114 may implement a logical to physical index to map logical addresses of the clients 110a-c to storage units on the solid-state storage device 114, which may remove a redundant translation layer implemented by the clients 110a-c, simplify client 110a-c access to the storage devices 114 and 118, and/or provide a flexible storage infrastructure for the clients 110a-c (e.g., a "sparse" or "thinly provisioned" storage services).

The solid-state storage device 114 may comprise a solid-state storage controller 115, which may be configured to maintain metadata 117 pertaining to a cache stored on the solid-state storage device 114 (and/or pertaining to a cache operations performed on the device 114), as well as storage metadata pertaining to storage operations performed on the solid-state storage device 114, the status of storage units on the solid-state storage device 114, and so on. The metadata may comprise a validity map and a discardability map. The validity map may identify storage units of the solid-state storage device 114 that comprise valid data (data that is up-to-date and is associated with a logical address of a client 110a-c). Accordingly, the validity map may comprise the forward index discussed above. An invalidity map may be derived from the validity map (e.g., all storage units not in the validity map may be identified as comprising invalid data) and/or may be maintained in a separate datastructure, such as a reverse index, or the like. The discardability map may identify cache entry storage units that have been stored on the backing store 118.

The solid-state storage device 114 and/or controller 115 may comprise a cache management apparatus 130, which may use the metadata to identify cache entries in response to clients storage requests. In some embodiments, the cache management apparatus 130 may be implemented using a device driver (e.g., a Linux device driver).

While FIG. 1 shows one solid-state storage device 114, other embodiments of the system 100 may include multiple solid-state storage devices 114 that act as a cache for clients 110a-c. In some embodiments, the cache management apparatus 130 may be implemented on each solid-state storage device 114 in the system. In other embodiments, the cache management apparatus 130 may be distributed across the solid-state storage devices 114 in the system 100.

The solid-state storage device 114 functions as a cache for the backing store 118. In some embodiments, the solid-state storage device 114 and the backing store 118 are connected by a communication bus 116. The communication bus 116 may be a local communication bus (e.g., a communication bus of a computer system), a distributed bus, a, local area network ("LAN"), a wide area network ("WAN"), or other type of communication network, and may be implemented using various protocols. In some embodiments, the solid-state storage device 114 is directly attached to the backing store 118. The solid-state storage device 114 and the backing store 118 may also be connected by a bus.

The solid-state storage device 114 may be configured to act as a look aside cache that sees data access requests substantially simultaneously with the backing store 118. In other embodiments, the solid-state storage device 114 is configured to act as a look through cache that sees the data access requests before the backing store 118. In some embodiments, where the solid-state storage device 114 is a look through cache, the solid-state storage device 114 passes the data access request to the backing store 118 if the attempted access on the solid-state storage device 114 is a miss. The solid-state storage device 114 may also be implemented as a write-back cache. In some embodiments, the current caching mode may be available in the metadata maintained by the solid-state storage device 114. The caching mode may be modifiable by the clients 110a-c via a storage interface, an enhanced storage interface, or the like. The metadata may further indicate cache attributes such as PIN, BLACKLIST, or the like and/or cache directives (e.g., FLUSH). The cache attributes and/or directives may be stored in the metadata maintained by the solid-state storage device 114 for access by the cache management apparatus 130 and/or solid-state storage controller 115.

The backing store 118 may provide storage for the clients 110a-c, which read and write data from/to the backing store 118. The backing store 118 may include one or more non-volatile storage devices such as solid state storage, hard disk drives, tape, some other nonvolatile data storage medium, or a combination of the preceding examples. In some embodiments, the backing store 118, or at least certain storage mediums in the backing store 118, may have access and/or throughput performance that is lower than that of the solid-state storage device 114.

In some embodiments, the system 100 is implemented within a computing device. For example, the solid-state storage device 114 may be attached to a motherboard of a computing device, such as a desktop and act as a cache for backing store 118 that is a hard disk drive. The CPU of the computing device may use the solid-state storage device 114 to read and write data and take advantage of the faster read/write times of the solid-state storage device 114 in comparison to the backing store 118. The system 100, in some embodiments, also includes additional solid-state storage devices 114. For example, the system 100 may implement a multi-tiered cache with multiple solid-state storage devices 114 organized in a cache hierarchy.

Figure 2:
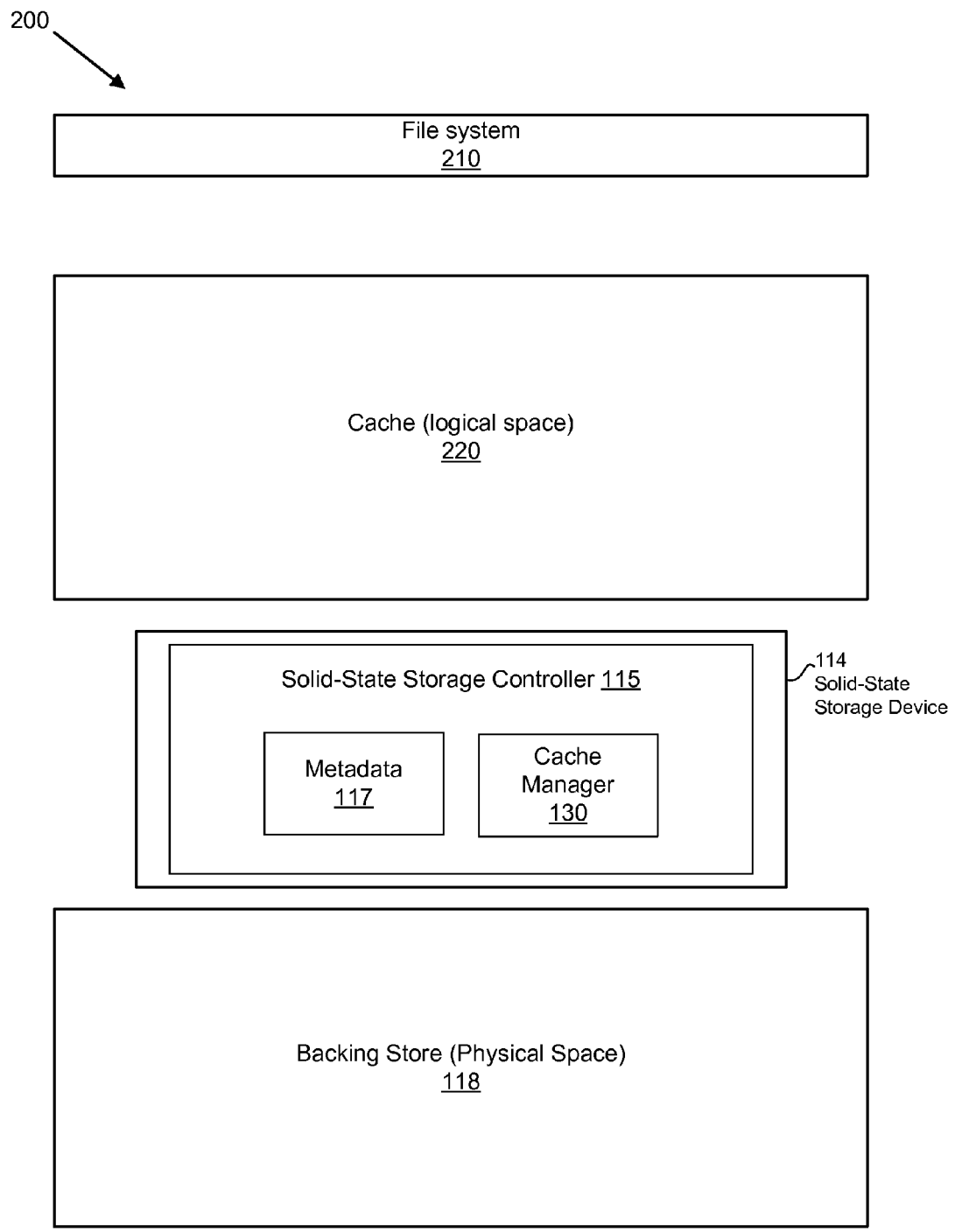
FIG. 2 is a schematic block diagram illustrating an exemplary embodiment of a system that includes a solid-state storage device that presents a logical storage space that is the same size as the physical space provided by the backing store.

FIG. 2 shows one embodiment of a system 200 illustrating the logical and physical storage space presented by the solid-state storage device 114. The system 200 illustrates the file system 210 as a component of the system 200. The file system 210 is a logical entity operating on a physical computing device. In some embodiments, the file system 210 may be implemented on one of the clients 110a-c of FIG. 1. The file system 210 stores and organizes computer files and the data in the system 200. In many embodiments, the file system 210 organizes blocks of storage into files and directories and tracks which blocks belong to which files. Although FIG. 2 depicts a file system 210, the disclosure is not limited in this regard and could be used in conjunction with any storage client known in the art including, but not limited to: a database, a server (e.g., web server, storage server, or the like), an application, a user, and so on.

In some embodiments, the backing store 118 provides physical storage space on which the data is actually stored by the file system 210. The amount of space made available by the backing store 118 can vary widely depending on the system 200; 500 GB may be typical for a desktop computer, while Terabytes ("TB") or Petabytes ("PB") of backing store 118 may be provided in a distributed storage system, such as a Storage Area Network (SAN). Typically, the backing store 118 is made up of storage devices that are block storage devices; however, other types of backing storage devices may be used in the backing store 118.

The solid-state storage device 114 may have a pre-determined physical storage capacity. In some embodiments, the solid-state storage device 114 may be logically and/or physically partitioned, such that a portion of the physical space of the solid-state storage device 114 is dedicated to act as a cache for the backing store 118, and a part of the solid-state storage device 114 is configured to operate as storage (e.g., part of the backing store 118, or other storage service). For example, a solid-state storage device 114 may be formatted such that 200 GB of physical space is dedicated to act as a cache, while the remaining 120 GB is treated as part of the backing store 118.

In some embodiments, the solid-state storage device 114 presents a cache logical space 220 to the file system 210 that is the same size as the physical space of the backing store 118 regardless of the physical size of the solid-state storage device 114. For example, the solid-state storage device 114 may be formatted to be the same size as the backing store 118. In typical embodiments, the physical storage capacity of the backing store 118 (e.g., 1 PB) is larger than the physical storage capacity of the solid-state storage device 114 (e.g., 80 GB).

In some embodiments, the solid-state storage device 114 may present a logical address space 220 to the file system 210 that is larger than the physical space of the backing store 118 (as well as the solid-state storage device 114 itself). A user may be able to add physical space to the backing store 118 without changing the size of the cache logical space 220. The solid-state storage device 114 may maintain associations between logical addresses and the "sparse" or "thinly provisioned" storage units in the device 114 and/or backing store 118 using a forward map as described above. In some embodiments, the solid-state storage device 114 may be configured to request additional storage space (e.g., addition backing store 118) when an occupancy of the solid-state storage device 114 and/or backing store 118 exceeds a threshold. The solid-state storage device 114 may present an interface by which a client (e.g., file system 210) may issue queries to determine the actual physical capacity of the solid-state storage device 114, the backing store 118, the remaining storage capacity, current occupancy levels (e.g., the amount of valid data currently stored on the solid-state storage device), and so on. The interface may further provide calls for the client (e.g., file system 210) to request storage capacity, reserve storage capacity, and so on.

In some embodiments, the solid-state storage device 114 may dynamically adjust the size of the cache logical space 220 based on the changing physical storage of the backing store 118. For example, in the event that a new storage device is added to the backing store 118, the solid-state storage device 114 may dynamically increase the size of the cache logical space 220 presented to the file system 210.

In some embodiments, the solid-state storage device 114 may be transparent to the file system 210. The file system 210 may only see the cache logical space 220 presented to it by the solid-state storage device 114. In some embodiments, the solid-state storage device 114 acts as a controller for the backing store 118. Thus, the file system 210 directs data access events (such as read and write requests) to the cache logical space 220 that it is presented with by the solid-state storage device 114. The file system 210 may be unaware that the solid-state storage device 114, which it is dealing with does not have a physical storage space that is as large as the cache logical space 220. In some embodiments, the solid-state storage device 114 stripes data to the backing store 118 in a RAID configuration. In some embodiments, the solid-state storage device 114 may be configured with other solid-state storage devices in a RAID configuration.

Thus, the solid-state storage device 114 may implement a sparsely-mapped 64-bit address space. In some embodiments, when the file system 210 requests data (for example, a read request) and provides an address for the requested data (such as a logical block address, or LBA), the solid-state storage device 114 (and/or controller 115) may look up the address in the metadata 117 (an index, such as the forward index described above) maintained by the solid-state storage device 114 and, if data associated with the logical address is available on the solid-state storage device 114, initiate a read at the corresponding storage units. The solid-state storage device 114 may generate an error if the data is not at the specified address and/or the logical address is not in the index. The error may be interpreted as a cache miss, which may be handled by the solid-state storage device 114 reading requested data from the backing store 118 and caching the data in one or more storage units. The cache miss may further comprise updating the metadata to reference the logical address (e.g., add a leaf node to index), and so on.

In embodiments where the solid-state storage device 114 presents a cache logical space 220 that is larger than the physical space of the solid-state storage device 114, the cache management apparatus 130 manages the solid-state storage device 114 to ensure that the solid-state storage device 114 does not exceed its physical storage capacity. Exemplary approaches for managing the physical storage capacity of the solid-state storage device 114 while it presents a larger logical space 220 are described below.

In such embodiments, the solid-state storage device 114 may be transparent to the file system 210 and other entities seeking access to the backing store 118. The complexities of managing the solid-state storage device 114 and looking for data may be hidden from the file system 210. Thus, the file system 210 may not need to check in the solid-state storage device 114 for data to read, or write to the solid-state storage device 114 instead of writing to the backing store 118. Instead, the file system 210 simply accesses data in the cache logical space 220 that is presented by the solid-state storage device 114 and allows the solid-state storage device 114 to transparently determine the most efficient way to handle the data. The physical storage arrangement underlying the cache logical space 220 (i.e., the solid-state storage device 114 and its relationship with the backing store 118) is hidden from the file system 210. In addition, by allowing the solid-state storage device 114 to manage the caching of data, the cache management apparatus 130 may make intelligent choices about cache maintenance using the metadata 117 maintained by the solid-state storage device 114 that is normally not available to the file system 210.

Figure 3:
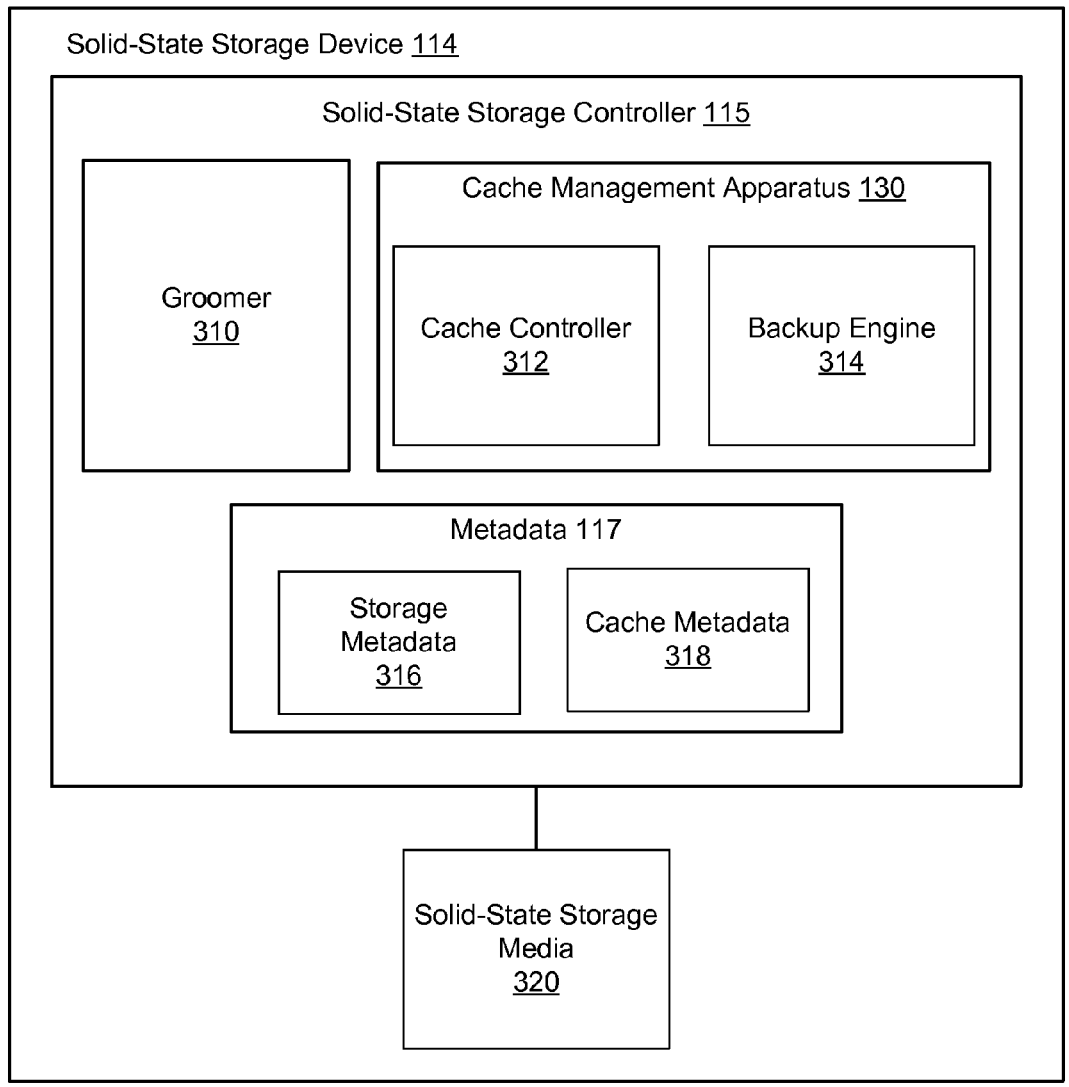
FIG. 3 is a schematic block diagram illustrating an embodiment of a cache management apparatus.

FIG. 3 shows an exemplary embodiment of a solid-state storage controller 115 comprising a groomer 310 and a cache management apparatus 130. The solid-state storage controller 115 may be coupled (e.g., directly via a bus or other communication conduit) to solid-state storage media 320. The solid-state storage media 320 may be coupled to the controller 115 via a local communication bus, a networked bus, a network connection, or the like. In some embodiments, the solid-state storage device 114 and/or controller 115 may be communicatively coupled to a plurality of solid-state storage media 320. The solid-state storage media 320 may comprise one or more solid-state storage elements (not shown), which may be arranged in banks. The solid-state storage controller 115 may be capable of accessing one or more of the banks in parallel and/or the solid-state storage device 114 may comprise a plurality of solid-state storage controllers 115.

In the depicted embodiment, the cache management apparatus 130 comprises a cache controller 312, and a backup engine 314. The groomer 310 and cache management apparatus 130 may have access to metadata 117, which may comprise, inter alia, storage metadata 316, which may comprise a validity map, and storage metadata 318, which may comprise a discardability map. The groomer 310 and/or cache management apparatus 130 may be implemented as firmware, software, hardware, or some combination thereof. As illustrated in FIG. 3, the groomer 310 and cache management apparatus 130 may be implemented on a solid-state storage controller 115. The disclosure, however, is not limited in this regard. For example, in some embodiments, the groomer 310 and/or cache management apparatus 130 may be implemented using separate controllers, processors, FPGAs, or the like. Alternatively, or in addition, the solid-state storage controller 115, groomer 310, and/or cache management apparatus 130 may be implemented as one or more drivers operating on the solid-state storage device 114.

The groomer 310 moves data stored on the solid-state storage media 320 as part of maintenance operations, such as storage division recovery (e.g., erase block recovery), data refresh operations, data error correction, error handling, and so on. The groomer 310 may move data between storage units in the solid-state storage media 320 in a manner that is transparent to the file system 210 and the backing store 118. For example, the groomer 310 may perform garbage collection operations on the data in a solid state storage device that is operating as a solid-state storage device 114 in order to reclaim storage space on the solid-state storage device 114. The groomer 310 may also defragment files that are heavily fragmented in the solid-state storage device 114. Exemplary grooming operations are described in U.S. patent application Ser. No. 11/952,101 for David Flynn, et al., filed Dec. 6, 2007, entitled "Apparatus, System, and Method for Storage Space Recovery in Solid-state Storage," which is hereby incorporated by reference in its entirety. Similarly, the groomer 310 may move data in order to protect the data from read disturbs and/or as part of wear leveling operations. Those skilled in the art will appreciate other grooming operations which may require moving data within a storage device for data maintenance and space maintenance purposes. Metadata pertaining to the groomer's operation, such as the storage divisions selected for recovery, a validity map, storage division error rates, storage division wear levels, access patterns, and so on, may be maintained in the metadata 117 (e.g., in the storage metadata 316). The metadata 117 (e.g., storage metadata 316) may further comprise an index comprising associations between logical addresses provided by storage clients to storage units on the solid-state storage media 320 where valid data pertaining to the logical addresses is stored. As described above, the index may comprise a B-Tree comprising length and/or range encoded nodes indexed by logical address.

The cache controller 312 coordinates the exchange of data between storage clients (such as the clients 110a-c, the file system 210, or others) and the backing store 118 in relation to the solid-state storage device 114. In some embodiments, the cache controller 312 is responsible for maintaining an eviction policy that specifies when and how data is evicted from the solid-state storage device 114. In some embodiments, the eviction policy may be based, inter alia, upon cache eviction metadata, which may comprise data access patterns (e.g., whether the data is "hot," "warm," "cold" or the like). The eviction metadata may correspond to a last access time (least recently used), access frequency, a ratio of cache entry size to access time and/or access frequency, and so on.

In some embodiments, cache eviction metadata may comprise cache attributes and/or directives, which may be used to make eviction decisions. For example, a PIN cache attribute may cause the associated data to be retained in the cache, even if the data is "cold." Cache directives (e.g., a FLUSH directive) may cause specified cache entries to be flushed from the solid-state storage device 114. Cache attributes and/or directives may be provided by a storage client (e.g., client 110a-c) via an interface. For example, the solid-state storage device 114 may provide an interface by which a client may specify data to retain in a cache (e.g., PIN attribute), to remove from the cache (e.g., BLACKLIST or FLUSH), or the like. In some embodiments, cache eviction decisions may be based on the storage metadata 316. As discussed above, the storage metadata 316 may comprise a forward map associating cache entries, each comprising a respective logical addresses (or logical address set or range) with respective storage units on the solid-state storage device 114. The index may be used maintain associations between access pattern metadata and a corresponding logical addresses (e.g. counts in a tree index may track how often certain nodes, edges, or leaves are visited and for which types of operations (read, write, trim)). These associations may be retained even when the underlying data is moved on the solid-state storage device (e.g., moved from a first storage unit to a second storage unit in response to a modification, during a storage division recovery operation, or the like). Accordingly, when making an eviction decisions, the cache controller 312 (or other entity) may access the storage metadata 316 to obtain relevant access pattern metadata.

In some embodiments, cache eviction policy may be based upon spatial and/or temporal proximity. Spatial proximity assumes that if a logical address is "hot," spatially proximate logical addresses are likely to be "hot" as well (even if they haven't been accessed yet). The "spatial locality" between cache entries may be maintained in the storage metadata 316 (e.g., using the index or forward map). As discussed above, a forward index of the storage metadata 316 may associate logical addresses to physical storage units of the solid-state storage device 114. The logical addresses may be arbitrarily mapped to the storage units and, due to out-of-place writing and other sequential storage operations, the physical location of data may change over time. Therefore, it may be impractical to determine logical proximity using storage unit addressing along. The cache controller 312 (or other entity) may access the storage metadata 316 to identify spatial proximity for use in making eviction decisions (e.g., data that is spatially proximate to "hot" data in the logical address space may be less preferred for eviction, while data that is not spatially proximate to the "hot" data may be more preferred for eviction).

In some embodiments, the solid-state storage controller 115 is configured with a maximum amount of physical storage space available on the solid-state storage device 114 for use in support of caching. An administrator (or other entity) may provide this information when configuring the solid-state storage device 114. In other embodiments, the cache controller 312 discovers the maximum amount of storage space for itself (e.g., by identifying a physical storage capacity of the solid-state storage device 114). The maximum occupancy (and the thresholds derived therefore), may change over time. For example, certain storage locations of the solid-state storage device 114 may become unreliable and/or fail, which may reduce the physical storage capacity of the device 114. The maximum occupancy may, therefore, be reduced. In some embodiments, the reductions may occur transparently to the clients (e.g., the solid-state storage device 114 may continue operation and/or present the same logical address space to the clients). Alternatively, issue a notification informing the clients (e.g., clients 110a-c) of the reduction in storage capacity. Similarly, the physical storage capacity of the solid-state storage device 114 may increase (e.g., when additional solid-state storage media is added). The occupancy thresholds may be adjusted in accordance with the additional storage capacity.

Using the maximum occupancy information, the cache controller 312 may derive a maximum occupancy threshold that specifies the maximum amount of data that the cache management apparatus 130 may allow to be cached in the solid-state storage device 114. In some embodiments, the maximum occupancy threshold does not use all the useable physical capacity and instead may reserve a portion of the physical capacity for the solid-state storage device 114 to perform maintenance operations such as storage space recovery and/or replacement of worn out or unreliable storage units. In some embodiments, the cache controller 312 (or other entity) may dynamically determine a maximum occupancy threshold. The maximum occupancy threshold may be based upon the metadata 117, such as data access patterns, and the like. For example, if the solid-state storage device 114 comprises a large amount of "hot" data, which is likely to cause a subsequent cache miss if evicted, the occupancy threshold may be dynamically reduced. Conversely, if the solid-state storage device 114 comprises a large amount "cold" data that could be evicted with a low chance of a subsequent cache miss, the maximum occupancy threshold may be increased. Alternatively, or in addition, the solid-state storage device 114 may be configured to track cache performance in the metadata 117 to heuristically determine ideal thresholds. For example, a high cache miss rate for recently evicted cache entries may indicate that additional cache storage space is required (or that the cache eviction policy should be adjusted), and so on. Alternatively, if the cache miss rate is low, the thresholds may be reduced, and excess storage space of the solid-state storage device may be used for other purposes (e.g., as a cache for another backing store, as storage space, or the like).

The maximum occupancy threshold may be, for example, the amount of storage provided by the solid-state storage device 114 minus the amount of storage occupied by software or other data used by the solid-state storage device 114 and stored thereon. In other embodiments, the maximum occupancy threshold may be some percentage of the amount of storage available in the solid-state storage device 114. In some embodiments, the maximum occupancy threshold is determined by the solid-state storage device 114 based on performance criteria, such as a quality of service (QOS) attribute, or the like. The maximum occupancy threshold may be changed dynamically based on demand, job priorities, or administrative control. Other criteria may also be used to adjust, tune, or otherwise change the maximum occupancy threshold. In some embodiments, the solid-state storage device 114 may provide an interface whereby an occupancy threshold may be set. Alternatively, or in addition, the interface may allow a client to set one or more cache attributes and/or directives (e.g., a QOS, PIN, BLACKLIST, or the like), from which a maximum occupancy threshold may be determined.

In some embodiments, the cache controller 312 queries the metadata 117 to determine the amount of remaining physical storage capacity available on the solid-state storage device 114 to ensure that the solid-state storage device 114 does not exceed the maximum occupancy threshold. The cache controller 312 (or other module) may determine the remaining physical capacity using the metadata 117 prior to each insertion of data into the solid-state storage device 114. In other embodiments, the cache controller 312 may make this determination at varying frequencies depending on the amount of physical storage capacity that remains in the solid-state storage device 114. For example, if the solid-state storage device 114 has over half of its physical storage capacity available, the cache controller 312 may not query remaining physical storage capacity prior to each insertion; the cache controller 312 may instead wait until a certain number of cache insertions have occurred before making the determination. As the solid-state storage device 114 becomes increasingly full, the frequency of the queries to determine the remaining physical storage capacity may increase to the point where the cache controller 312 queries prior to each insertion into the solid-state storage device 114.

In some embodiments, once the solid-state storage device 114 reaches maximum occupancy as defined by the maximum occupancy threshold the cache controller 312 prevents any cache insertions into the solid-state storage device 114 until additional storage capacity becomes available. The cache controller 312 may allow reads to occur on data in the solid-state storage device 114 even when the solid-state storage device 114 reaches maximum occupancy. The solid-state storage device 114 may thus ensure that the solid-state storage device 114 does not overfill and provide protection for data stored within the solid-state storage device 114.

In some embodiments, the cache controller 312 also defines a target occupancy threshold that defines an amount of physical storage capacity used on the solid-state storage device 114. In some embodiments, the cache controller 312 may take actions to increase the rate at which data is evicted from the solid-state storage device 114 once the solid-state storage device 114 has reached the target occupancy threshold. In some embodiments, the cache management apparatus 130 only begins evicting data from the solid-state storage device 114 once the target occupancy threshold is reached. In other embodiments, the cache controller 312 may increase a priority of the backup engine 314 (e.g., configure the backup engine 314 to operate as a foreground process or otherwise increase the priority and/or the relative bandwidth allocated to the backup engine 314) when the target occupancy threshold is reached. In such embodiments, the backup engine 314 operates as a background process (for example, by giving the backup engine 314 a lower priority or a lower bandwidth allocation) until the target occupancy threshold is reached. The current physical storage capacity, thresholds, or the like may be maintained in the metadata 117 for access by the cache controller 312 and/or groomer 310.

As discussed above, the metadata 117 may comprise storage metadata 316, which may include a validity map. As used herein, a map may refer to any associative datastructure associating of a collection of unique keys with respective values. Looking up a unique key in the map returns the associated value. The validity map may associate storage units of the solid-state storage device 114 with a validity indicator that specifies that the data associated with the unit is either valid or invalid. The validity indicator may be a bit in the validity map, with one state representing valid data and the other state representing invalid data. The validity map 316 may be a bit map, a table, a list, or other data structure known in the art. For example, the validity map may be a data structure suited for managing a very large and potentially sparsely populated domain such as an address space, comprising representations of only valid or invalid storage units (and/or storage unit sets or ranges). For example, a validity map may comprise a sparse array of entries of each storage unit comprising valid data. An invalidity may be derived from the validity map (if a location is not in the validity map, then the location is invalid) or vice versa.

The unit or storage unit of the solid-state storage device 114 may refer to an addressable, physical storage unit on the solid-state storage media 320. In some embodiments, the metadata 117 may maintain a one to one ratio of logical block addresses (LBAs) to storage units; that is, one LBA may be associated with one storage unit or unit. Alternatively, or in addition, an LBA (or index node) may be associated with a length or range of storage units. In some embodiments, the storage units are physical blocks addressed by a physical block address ("PBA") in the solid state storage media 320, which may comprise Flash memory or other non-volatile storage media. In another embodiment, the storage units may refer to cylinder head sector ("CHS") locations on a hard disk drive. The nature of the storage unit may vary depending on the particular storage medium used by the solid-state storage device 114. The solid-state storage device 114 may simultaneously support multiple types of storage units.

Data associated with the storage units of the solid-state storage device 114 that are marked valid in the validity map 316 may be retained on the solid-state storage device 114, while data associated with invalid units (either marked and/or inferred) may be removed from the solid-state storage device 114. Invalid storage units may be candidates for removal in a storage division reclamation process (e.g., garbage collection). Valid data in a storage division to be recovered may be retained on the solid-state storage device 114 by writing the valid data to other storage divisions of the solid-state storage device 114.

The cache metadata 316 may comprise a discardability map, which may comprise a bit map, a table, a list, or other data structure known in the art. The discardability map may associate a storage unit of the solid-state storage device 114 with a discardability indicator that specifies whether the data associated with the unit is discardable or nondiscardable. The data associated with the unit is discardable if it has been stored in the backing store 118. If the data associated with the unit has not been stored in the backing store 118, it is typically nondiscardable.

In the FIG. 3 example, the storage metadata 316 and the cache metadata 318 are implemented in the same datastructure (metadata 117). For example, the validity map and the discardability map may be implemented in a single map wherein one bit represents validity and a second bit represents discardability. In some embodiments, however, the storage and cache metadata 316 and 318 may be implemented as separate data structures. In such embodiments, a single read of one data structure can determine both the validity status and the discardability status of a particular storage unit. For example, validity indicators may be a column of the combined map and discardability indicators may be another column of the combined map.

The cache management apparatus 130 may comprise a backup engine 314, which may be configured to identify cache entries to backup on the backing store 118 using the metadata 117. The backup engine 314 may cause storage units that are marked as valid in the storage metadata 316 and nondiscardable in the cache metadata 318 to be stored on the backing store 118. The backing store 118 stores the data such that it can be properly retrieved out of backing store 118. For example, the backup engine 314 may identify, using the metadata 117, a storage unit that is marked as valid and nondiscardable. The data associated with the unit may comprise the LBA and the data that corresponds to that LBA (as stored on the solid-state storage media 320). The backup engine 314 may read the data and cause the data to be stored at the backing store 118. As a result, future read requests for the LBA that are directed to the backing store 118 properly receive the data associated with the LBA. After determining that the data has been successfully stored on the backing store 118, the backup engine 314 may mark the storage unit as discardable.

In some embodiments, the backup engine 314 operates as a background process on the solid-state storage device 114. As such, the backup engine 314 may run with a low priority and only consume spare cycles and bandwidth on the solid-state storage device 114. In some embodiments, the cache controller 312 may increase the priority of the backup engine 314 or otherwise move the backup engine 314 into the foreground. In some embodiments, the cache controller 312 increases the priority of the backup engine 314 when the solid-state storage device 114 reaches the target occupancy threshold. The cache controller 312 may further increase the priority of the cache controller 312 as the solid-state storage device 114 approaches the maximum occupation threshold. In some embodiments, the cache controller 312 gives the backup engine 314 the highest priority once the solid-state storage device 114 reaches the maximum occupation threshold if there are no units marked as discardable in the solid-state storage device 114, or where there are insufficient units marked discardable in the solid-state storage device 114.

In some embodiments, the backup engine 314 begins with the units in the solid-state storage device 114 associated with the oldest data and proceeds chronologically through the units in the solid-state storage device 114 performing backup operations, as discussed in greater detail in connection with FIG. 9. As noted above, the backup engine 314 may not backup the data associated with storage units that are marked invalid in the metadata 117 regardless of the status of the corresponding discardability indicator. Once the data associated with the storage unit is stored in the backing store 118, the backup engine 314 updates the metadata 117 to change the discardability indicator from nondiscardable to discardable. The backup engine 314 may wait for the backing store 118 to confirm that the data was successfully stored in the backing store 118 before changing the discardability indicator. In some embodiments, the backup engine 314 may indicate to the groomer 310 that a specific storage region of the solid-state storage device 114 has been backed up and is discardable. In a related embodiment, the backup engine 314 may indicate to the groomer 310 the age of the storage region and thereby enable the groomer 310 to reclaim the storage region without any further movement of data.

The metadata 117 may comprise indicators (e.g., a log) to track the age of the data in the storage units of the solid-state storage device 114. The metadata may comprise indicators of when data was written to a particular storage unit and/or when data was read from a particular storage unit. U.S. patent application Ser. No. 11/952,091 to David Flynn, et al., filed Dec. 6, 2007, entitled "Apparatus, System, and Method for Managing Data Using a Data Pipeline," which is hereby incorporated by reference, describes an approach to storing data serially within a solid state storage device. In such a device, the order in which data is stored in the storage units, and thus, the age of the data associated with those storage units, may in most cases, be derived from the sequence of the data in the storage device. In embodiments where the solid-state storage device 114 serially stores data as described in the above application, the cache controller 312 may derive information about the age of the data from the order in which the units are stored in the solid-state storage device 114 and/or sequence indicators associated a storage division of the storage unit. In such an embodiment, the cache management apparatus 130 may derive or estimate the age of data without the associated cost in memory and computation of maintaining a separate log to track when writes occurred.

In some embodiments, the metadata 117 may be used to track the number of reads on the data in a particular unit of the solid-state storage device 114. The metadata 117 may also comprise indicators of when those reads were issued. This metadata 117 may be maintained by the solid-state storage controller 115, the groomer 310, or other processes of the solid-state storage device 114. The cache controller 312 may access the metadata 117 to track when the last read for a particular storage unit was issued (determine the least recently used storage unit). Alternatively, or in addition, the cache controller 312 may use the metadata 117 to track storage unit access patterns and take the frequency or timing of accesses into consideration in determining whether a particular unit contains hot or cold data.

Figure 4:
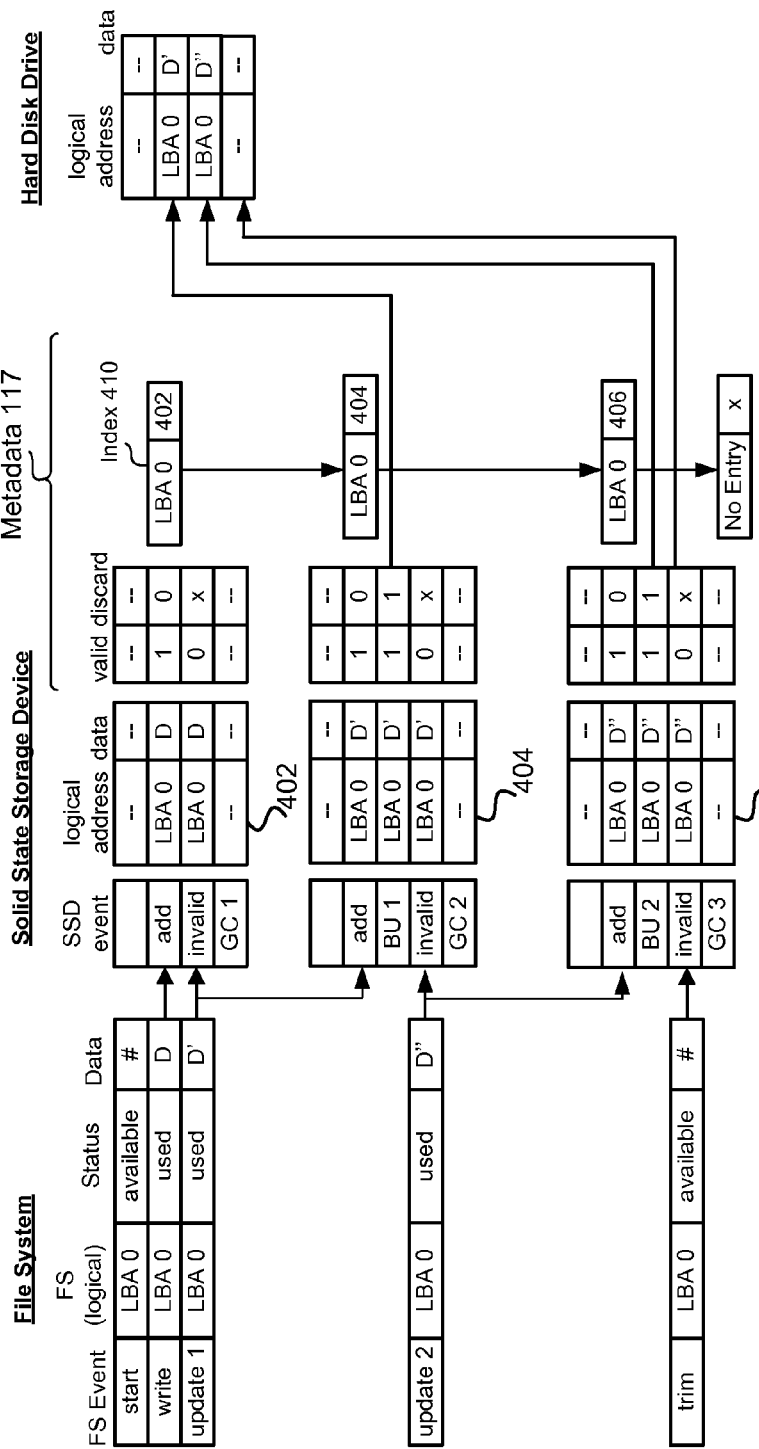
FIG. 4 is a schematic block diagram illustrating an exemplary embodiment of interaction during a write between a file system, a solid state storage device acting as a cache, and a hard disk drive acting as backing storage.

FIG. 4 shows an exemplary embodiment of an interaction between a storage client (e.g., file system 210), a solid state storage device 114 acting as a cache device, and a hard disk drive acting as backing store 118. Other variations on the system, with other media, may also be implemented in alternative embodiments.

When the file system 210 has data to be stored in persistent storage (e.g., as a file), it typically determines one or more appropriate LBAs to use. The file system 210 may choose an LBA from a pool of available LBAs that have no data associated with them. For example, when the file system 210 writes data D, the file system selects an LBA, such as LBA 0 for the data D. The file system writes the data D to the solid state storage device acting as a solid-state storage device 114. In some embodiments, as discussed above, the file system 210 is interacting with the logical space presented by the solid-state storage device 114 and is unaware of the existence of a solid-state storage device 114.

The solid state storage device has a storage unit 402 that is initialized and ready for use. The solid-state storage device 114 may store metadata that associates the LBA with a storage unit on the solid-state storage device 114. The storage unit 402 may be addressable on the solid-state storage device 114; in some embodiments, the address of the storage unit 402 is a physical block address ("PBA"). In particular embodiments, there is a one-to-one mapping of LBAs to PBAs in the solid-state storage device 114.

In the metadata 117, the storage unit 402 may be associated with a validity indicator (represented by the "valid" column) and a discardability indicator (represented by the "discard" column). In some embodiments, the metadata may be "sparse," comprising only entries for which valid data exists. Accordingly, the validity indicator may be inferred from inclusion in the metadata 117 (e.g., if an LBA and/or storage unit is in the metadata, the storage unit comprises valid data; otherwise, the storage unit comprises invalid data). In some embodiments, the storage unit 402 may be mapped to the validity indicator and the discardability indicator using a physical address (e.g., a PBA) for the storage unit 402 as the key (e.g., in a reverse index as described above).

When the solid state solid-state storage device 114 receives the write request from the file system 210, the solid state solid-state storage device 114 selects an initialized unit (such as storage unit 402) where data referenced in the request will be stored. The request may comprise the data, may comprise a portion of the data, and/or may be substantially free of the data. As described above, selection of a storage unit 402 may be made according to a sequential writing mechanism. For example, the metadata 117 may maintain one or more append points (not shown) referencing a "next" available storage unit. As data is written to the solid-state storage device 114, the append point may be sequentially incremented to a next storage unit of the solid-state storage device 114. This sequential writing may provide, inter alia, wear leveling benefits and may reduce write amplification.

The solid-state storage device 114 stores the data of the storage request (for example, logical address LBA 0 and the data D) in the selected storage unit 402 and updates the metadata 117 accordingly. Updating the metadata 117 may comprise updating an index 410 to associate the LBA 0 with a reference (e.g., physical address) of the storage unit 402. The updating may comprise adding a leaf node to an B-Tree, or other forward map datastructure. The entry may be indexed by the LBA (LBA 0) to enable fast and efficient LBA to storage unit associations.

Updating the metadata 117 may further comprise setting a validity and discardability indicators for the storage unit 402. These operations are represented in FIG. 4 in the "add row of the SSD event" column, which shows the logical address LBA 0 being associated with data "D," (in a forward and/or reverse index), and setting a validity indicator of the storage unit 402 to "1" (e.g., valid), and setting a discardability indicator to "0" (nondiscardable). The discardability indicator is set to "0" (nondiscardable) since the data D has not been backed up on to the backing store (e.g., hard disk drive), and removing the data D from the solid-state storage device 114 without backing it up to the hard disk drive would result in data loss and/or corruption.

As shown in FIG. 4, a client (e.g., the file system 210) may modify the data D. The updated data may be represented by D'. The update may comprise the file system 210 (or some other entity) modifying the data D (or performing another operation resulting in a modification to the data D). The file system 210 may issue a storage request to store the modified data D' at the LBA 0. In some embodiments, the file system 210 is aware that the solid-state storage device 114 is present (non-transparent cache); in other embodiments, the file system 210 is unaware of the solid-state storage device 114 and the update request is transparently handled by the solid-state storage device 114.

In response to the storage request, the solid-state storage device 114 may write the modified data D' sequentially to the solid-state storage media. As discussed above, sequential storage may comprise storing the modified data D' "out-of-place" at a different storage unit of the solid-state storage device. Sequential writing may provide, inter alia, wear leveling benefits, and may reduce write amplification (e.g., storing the modified data D' on the same storage unit 402 may require erasing the storage division of the storage unit 402 and writing D' along with other valid data on the storage division).

Storing the modified data D' may comprise the solid-state storage device 114 selecting a "next" storage unit (storage unit 404) to store the modified data D'. The selection may be made according to the sequential storage mechanisms described above (e.g., may be a "next" storage unit at one or more append points). The metadata 117 pertaining to the storage division 402 may be updated to indicate that the data is no longer valid, and is discardable (or is in a do not care state). Metadata 117 associating logical addresses to storage units may be updated to associate the LBA 0 with the selected storage division 404. In addition, metadata pertaining to the selected storage unit 404 may be updated to indicate that the storage unit 404 comprises valid, nondiscardable data. FIG. 4 shows that the data D' of update 1 is written to the storage unit 404 and, as before, the validity indicator is changed to indicate that the data D' in unit 404 is valid and nondiscardable.

A groomer 310 may, at some point, look at the validity indicator for the unit 402, see that it is set to invalid, and perform a garbage collection operation (GC 1) on unit 402. The garbage collection operation may put the storage unit 402 back into an initialized state, at which point the unit 402 may again be used to store data.

FIG. 4 further shows the solid-state storage device 114 performing a backup operation (BU 1) on the data D' in unit 404. In some embodiments, the backup engine 314 performs the backup. The backup engine 314 causes the data D' to be stored in the hard disk drive with a logical address of LBA 0 and a data value D'. The backup engine 314 may send a write request addressed to LBA 0 with data D' to the hard disk drive. In some embodiments, the backup engine 314 awaits confirmation that the hard disk drive has successfully saved D' at LBA 0 before changing the discardability indicator from nondiscardable to discardable (to "1"). The hard disk drive may perform its own internal associations between LBA and physical address (e.g., such as LBA 0 to a particular CHS) for the data D'.

In some embodiments, the backup operation occurs in a manner that is transparent to the file system; that is, the file system is unaware that the data D' is now in both the solid-state storage device 114 and the hard disk drive. Similarly, the grooming operations, such as GC 1, may be performed transparently to the file system.

FIG. 4 shows an additional update 2 generated by the file system 210 (or other entity) for LBA 0 which changes the data to D". As with unit 402, in response, the solid-state storage device 114 marks the unit 404 as invalid in the metadata 117. Since the unit 404 is identified as invalid, the discardability indicator may or may not be changed; the status of the discardability indicator becomes irrelevant as the unit 404 will be garbage collected by the groomer 310 (shown at GC 2) and the unit 404, along with the entries in the validity map and the discardability map, will be initialized such that unit 404 may be used again for storing new data.

The update 2 also causes LBA 0 and the data D" to be sequentially written to a new unit 406, which, as above, has the validity indicator set to valid. Because the data D" has not been moved to the hard disk drive and is not otherwise in the hard disk drive, the discardability indicator is set to nondiscardable. The update 2 may further comprising modifying the index 410 of the metadata 117 to associate the LBA 0 with the storage unit 406. Once the backup engine 314 flushes the data D" to the hard disk drive as shown (BU2), the discardability indicator is changed to discardable.

The file system may also issue a TRIM command to the solid state storage device acting as a solid-state storage device 114. A TRIM command allows a file system to tell a solid state storage device (such as a solid-state storage device 114)

which data storage units (logical block addresses) are no longer in use. This ensures that the solid-state storage device 114 knows which storage units are in use and which are free and ensures that the solid state storage device does not retain data that the file system knows no longer needs and/or is invalid. The TRIM command specification is currently being standardized as part of the AT Attachment ("ATA") interface standard led by Technical Committee T13.

As shown in FIG. 4, in some embodiments, the file system determines that the data D" associated with LBA 0 (such as a text file) is deleted and adds the LBA 0 to the available pool. The file system (or other entity) may send a storage request comprising a TRIM command to the solid-state storage device 114. The solid-state storage device 114 receives the TRIM command and, in some embodiments, responds with an invalidate SSD event that marks the affected units (such as unit 406) holding the data as invalid. The solid-state storage device 114 may then, at a later time, execute a garbage collection operation GC 3 to recover the unit 406 for future use. The TRIM may further comprise updating the index 410 of the metadata 117 to remove the entry for LBA 0 (e.g., remove the leaf node representing LBA 0 from the B-Tree).

In some embodiments, the solid state storage device acting as a solid-state storage device 114 may not support TRIM. In some embodiments, both the solid-state storage device 114 and the backing store 118 may support TRIM. In such embodiments, the solid-state storage device 114 may execute the TRIM command and then pass the TRIM command to the backing store 118 as shown in FIG. 4. In other embodiments, one of the solid-state storage device 114 and the backing store 118 may support TRIM, while the other does not. In such embodiments, the solid-state storage device 114 and the backing store 118 may be configured such that they ignore TRIM commands. In other embodiments, the device that supports TRIM may execute the TRIM command and hide the TRIM command from the other.

In a related embodiment, the solid-state storage device 114 may maintain an indicator that an LBA in the backing store 118 has been trimmed and utilize this information to correctly respond to a client file system even though the HDD does not support TRIM. Thus, for example, an operation that attempts to access data in the trimmed LBA on the hard disk drive is blocked by the solid-state storage device 114 even though the data for the trimmed LBA still exists on the hard disk drive. The solid-state storage device 114 may also overwrite or otherwise sanitize the data related to the LBA on the HDD to ensure that the data is not recoverable. The solid-state storage device 114 may perform these operations transparently from the perspective of the file system and the HDD.

Figure 5:
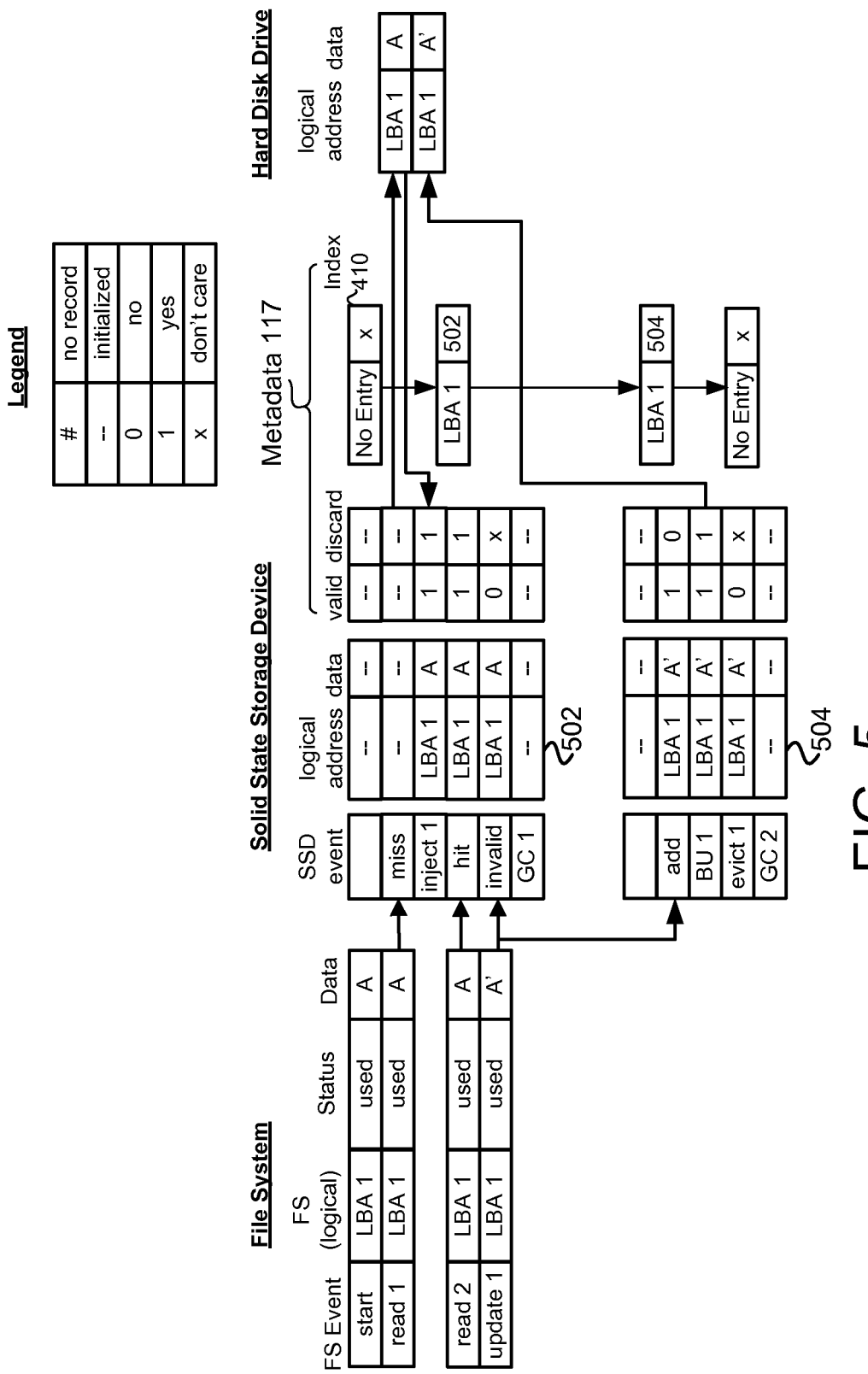
FIG. 5 is a schematic block diagram illustrating an exemplary embodiment of interaction during a read between a file system, a solid state storage device acting as a cache, and a hard disk drive acting as backing storage.

FIG. 5 shows one example of the system processing read access requests. As shown in FIG. 5, the file system may have allocated an LBA 1 to hold data A and caused this data to be stored. FIG. 5 shows that the data A is associated with LBA 1 in the hard disk drive, but is absent from the solid-state storage device 114. The file system 210 issues a read of the data at LBA 1. In some embodiments, the solid-state storage device 114 receives the read request and determines that the data A associated with LBA 1 is not stored in the solid-state storage device 114 (which is interpreted as a miss, as shown in FIG. 5). In some embodiments, the solid-state storage device 114 determines that the data A is not in the solid-state storage device 114 by attempting to read data at a unit associated with LBA 1. The solid-state storage device 114 may, for example, attempt to access LBA 1 using the metadata 117; in particular, the index 410. If there is no entry for LBA 1 in the index 410, the solid-state storage device 114 may generate an error which may be interpreted as a cache miss. Since the metadata 117 may be indexed by LBA (in a B Tree datastructure), this determination may be made quickly and efficiently.

In response to the cache miss, the solid-state storage device 114 redirects the read request to the hard disk drive, which accesses the data A at LBA 1. The data A is retrieved from the hard disk drive and returned to the file system 210. The cache controller 312 of the solid-state storage device 114 also executes an inject SSD event (inject 1) to store the data A in a selected storage unit 502 along with the logical address of LBA 1. The solid-state storage device 114 may update the metadata 117 to associate the LBA 1 with the storage unit 502 in the index 410.

As shown in FIG. 5, in response to read 2 the solid-state storage device 114 retrieves the data A from unit 502 since read 2 is a cache hit. The solid-state storage device 114 returns the data A to the file system 210 as a response to the read request 2. The solid-state storage device 114 may quickly and efficiently determine that data corresponding to LBA 1 is available on the solid-state storage device 114, and identify the storage unit 502 comprising the data, using the metadata 117 (index 410).

When the data A is stored in unit 502 as part of the inject 1 operation, the solid-state storage device 114 sets the validity indicator to valid and also sets the discardability indicator to discardable to reflect that the data A is properly stored in and associated with LBA 1 in the hard disk drive. Thus, the data A may be removed from the solid-state storage device 114 without data corruption. For example, a cache management apparatus operating on the solid-state storage device 114 may apply an eviction policy and determine that the data A should be evicted (e.g., based on access patterns, grooming considerations, or the like). Since the discardability indicator is set to "1" in the metadata 117, the eviction may occur without a backup on unit 502 prior to the eviction.

FIG. 5 further shows the file system 210 issuing an update 1 changing the data associated with LBA 1 from A to A'. As before, the solid-state storage device 114 marks the unit 502 as invalid using the invalidity map, and the groomer 310 performs a garbage collection operation GC 1 to initialize the unit 502 such that it is available for future use. In addition, the solid-state storage device 114 stores the LBA 1 and the data A' in a new unit 504, and sets the invalidity indicator to valid and the discardability indicator to nondiscardable. The index 410 of the metadata 117 may be updated to associated LBA 1 with storage unit 504 as described above. The solid-state storage device 114, during a backup operation BU 1, stores the data A' to the hard disk drive and sets the discardability indicator to discardable.

FIG. 5 also shows the data A' being evicted from the solid-state storage device 114 in an evict SSD event (evict 1). In some embodiments, the evict 1 operation is transparent to the file system. The solid-state storage device 114 may evict the data A' if the cache controller 312 determines that the data has gone cold; for example, the file system 210 may not have read the data A' for a predetermined period of time. In some embodiments, the cache controller 312 evicts the data A' by setting the validity indicator to invalid. The eviction may further comprise removing the association between LBA 1 and storage unit 504 in the index 410. The removal may indicate that the data A' of LBA 1 is no longer stored on the solid-state storage device 114.

The solid-state storage device 114 may then garbage collect the unit 504 to set the unit 504 back to an initialized state. In other embodiments, the solid-state storage device 114 garbage collects the unit 504 directly as part of the eviction process instead of putting the unit 504 into the intermediate state shown at evict 1. In other embodiments, the groomer 310 evicts the data A' as part of a grooming operation, even though the data A' is marked as valid, as discussed in greater detail below.

Figure 6:
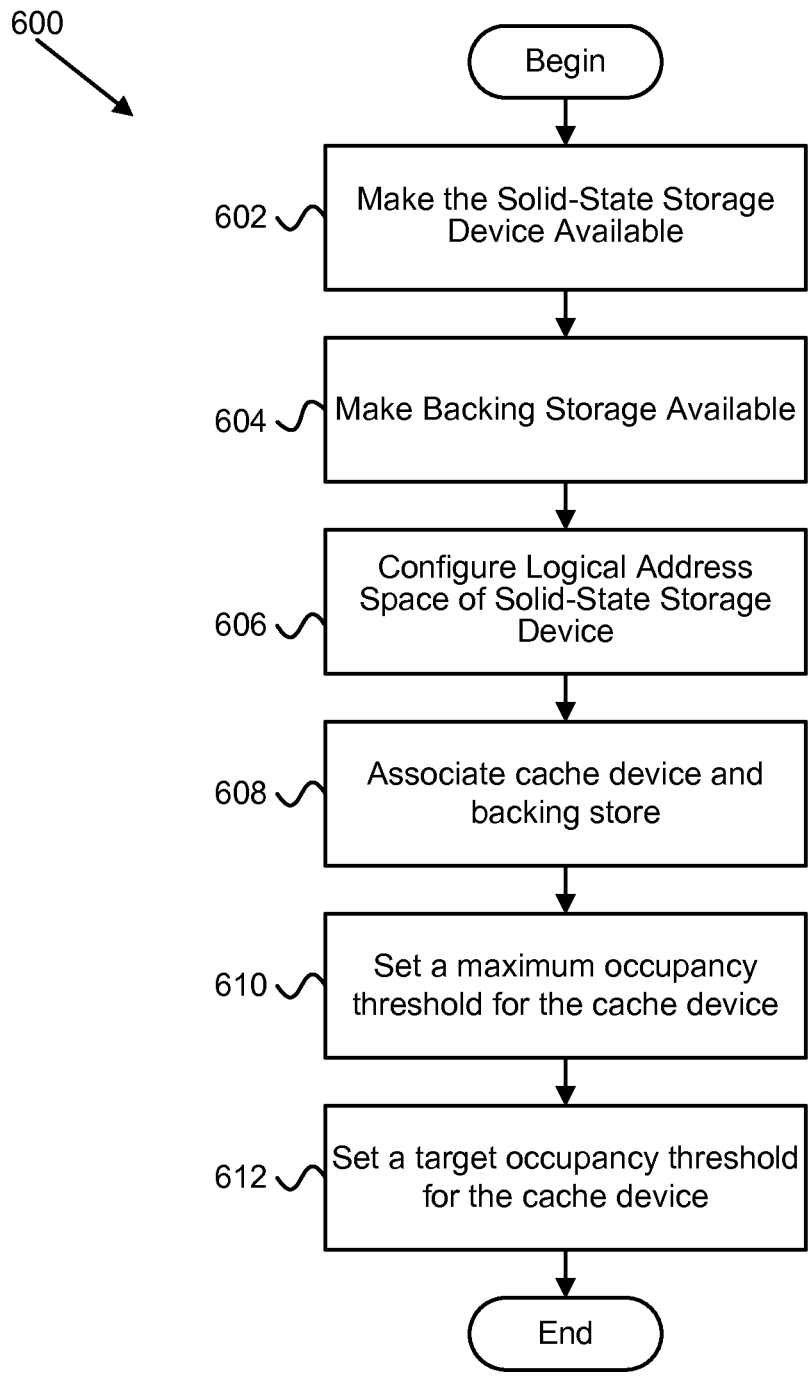
FIG. 6 is a schematic flow chart diagram illustrating another embodiment of a method for configuring a solid-state storage device.

FIG. 6 shows some embodiments of a method 600 for configuring a storage device to operate as a solid-state storage device 114 for a backing store 118. In some embodiments, steps of the method 600 may be tied to particular machine components, such as a solid-state storage device, solid-state storage media, communications interfaces, processors, memories, or the like. Machine-readable instructions configured to cause a machine to implement the method 600 may be stored on a non-transitory machine-readable storage medium, such as a non-volatile memory, disk, optical media, or the like.

In some embodiments, the clients 110a-c communicate with the solid-state storage device 114 through a file server 210. However, the disclosure is not limited in this regard, and the clients 110a-c could communicate with the solid-state storage device 114 directly and/or through other processes or entities, such as a database server, a web server, a storage protocol, or the like. The method 600 begins with a user making 602 the solid-state storage device 114 available in the system 100 and making 604 the backing store 118 available in the system 100.

In some embodiments, at step 606, the solid-state storage device may be configured to provide a logical address space having the same physical storage capacity as the backing store 118. If the backing store 118 has a larger physical storage capacity than the physical storage capacity of the solid-state storage device 114, the solid-state storage device 114 may be configured to support sparse addressing, such that the solid-state storage device 114 may present a larger logical address space than is physically available on the solid-state storage device 114. For example, the solid-state storage device 114 may be built with the a FUSION_SPARSEFS_SUPPORT flag set. In some embodiments, the configuration of step 606 may comprise the solid-state storage device presenting a logical address space that exceeds a physical storage capacity of both the solid-state storage device 114 and the backing store 118.

At step 608, with both the solid-state storage device 114 and the backing store 118 present in the system, the solid-state storage device 114 may be configured act as a cache for the backing store 118. The method 600 may also include setting a maximum occupancy threshold 610 that defines the maximum amount of physical space on the solid-state storage device 114 available for use as a cache. The maximum occupancy threshold may be provided to the solid-state storage device 114 by an external entity (e.g., an administrator), or the cache management apparatus 130 may determine an appropriate threshold itself.

At step 612 a target occupancy threshold for the solid-state storage device 114 may be set as described above (e.g., by an entity and/or by the solid-state storage device 114), and the method 600 ends. In some embodiments, the cache management apparatus 130 attempts to keep occupancy in the solid-state storage device 114 below the target occupancy threshold. The cache management apparatus 130 may do so by starting cache evictions when the solid-state storage device 114 exceeds the target occupancy threshold.

Figure 7:
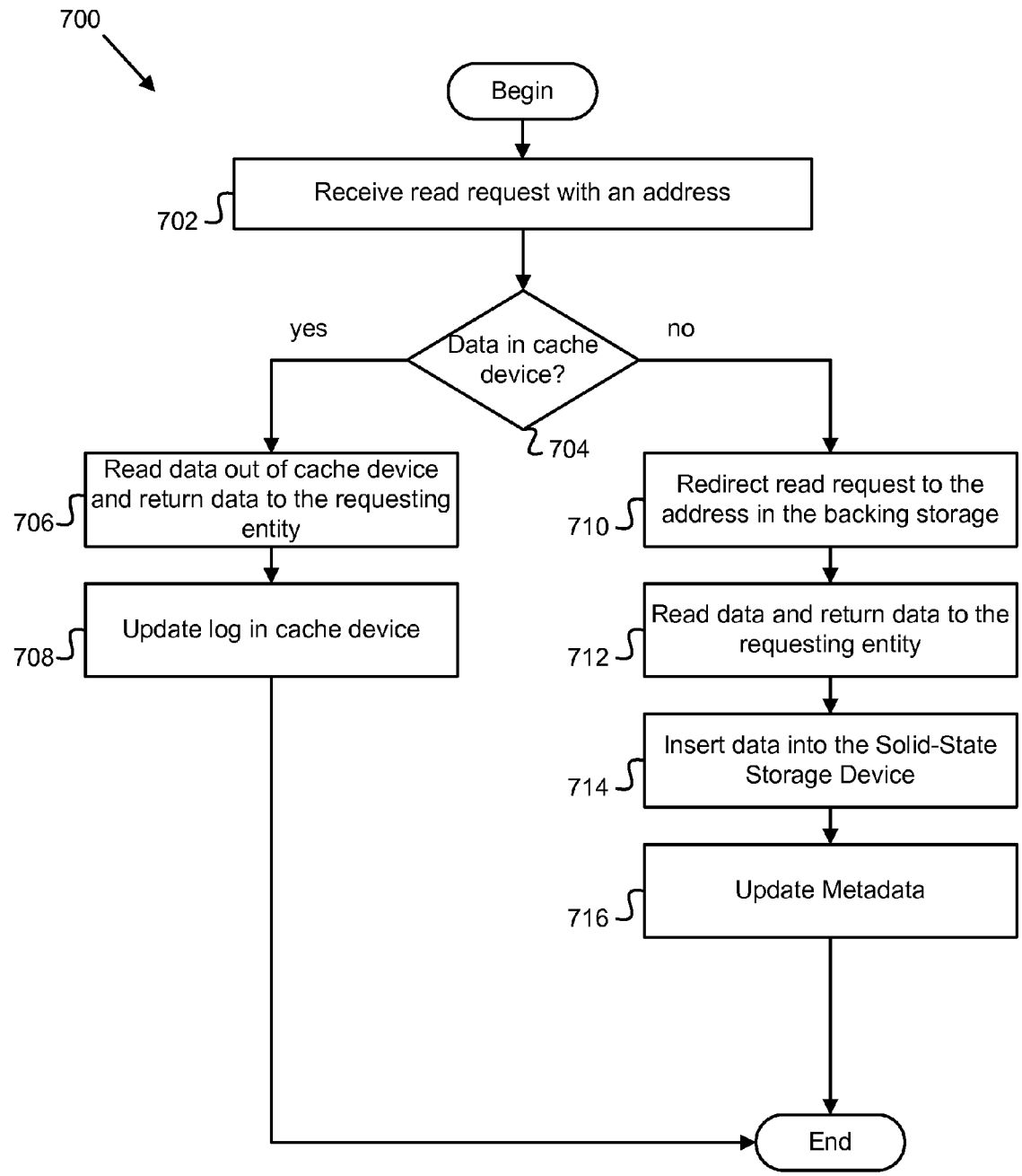
FIG. 7 is a schematic flow chart diagram illustrating an exemplary embodiment of a method for handling reads at the solid-state storage device.

FIG. 7 shows an exemplary embodiment of a method 700 for caching data on a solid-state storage device. As described above, steps of the method 700 may be tied to particular machine components and/or may be implemented using machine-readable instructions stored on a non-transitory machine-readable storage medium.

The method 700 begins with the solid-state storage device 114 receiving 702 a read request that includes an address for the data such as an LBA. At step 704, the method 700 determines whether data associated with the address is available on the solid-state storage device 114. The determination may be made using metadata 117 maintained by the solid-state storage device; in particular, an index comprising associations between logical addresses and associated storage units. If the address is present in the index, the method 700 may determine that the data is available, and the flow may continue to step 706; otherwise, the flow may continue to step 710.

The requested data may be accessed on one or more storage units at step 706. The storage units may be identified in the index as described above. At step 708, metadata pertaining to the storage operation may be updated to reflect the data access. The metadata may be used to identify access patters, such as "hot" and/or "cold" logical addresses, determine access times, and so on. In some embodiments, the storage metadata may be accessible to a groomer 310 to perform storage division recovery operations and/or to a cache management apparatus 130 to manage caching operations (e.g., determine eviction policy). The flow may then end.

At step 710, the method 700 redirects the read request to the address in the backing store 118. The cache controller 312 reads 712 the data and returns the data to the entity that generated the read request.

The cache controller 312 also inserts 714 the data into the solid-state storage device 114 and associates the data with the specified address (in an index or other metadata). In some embodiments, the data is written sequentially and/or in accordance with the write method described in connection with FIG. 8. In some embodiments, if there are no free storage units in the solid-state storage device 114, the cache controller 312 does not insert the data into the solid-state storage device 114.

The cache controller 312 may also update the metadata (indexes) such that future read requests retrieve the data from the solid-state storage device 114 until the data is removed from the solid-state storage device 114. In addition, the cache controller 312 updates the metadata 117 to indicate that the storage unit comprising the data is valid and discardable. Step 716 may further comprise the cache controller 312 updating logging metadata to indicate when the data was inserted into the solid-state storage device 114, and the method 700 ends. In other embodiments, the solid-state storage device 114 may store data sequentially and the age of the data is derived from its position within the solid-state storage device 114.

Figure 8:
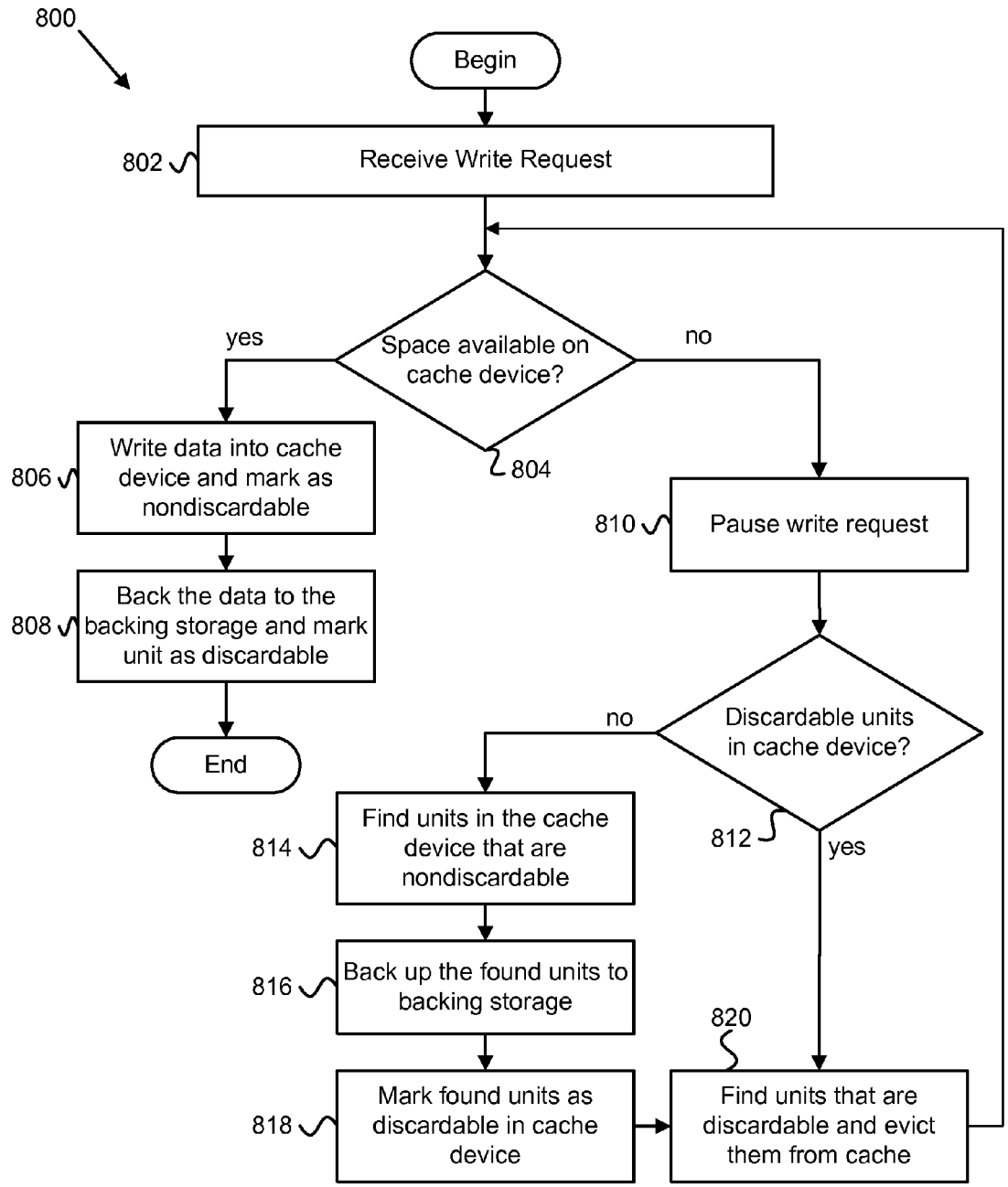
FIG. 8 is a schematic flow chart diagram illustrating an exemplary embodiment of a method for handling writes at the solid-state storage device.

FIG. 8 shows an exemplary embodiment of a method 800 for caching data on a solid-state storage device. As described above, steps of the method 800 may be tied to particular machine components and/or may be implemented using machine-readable instructions stored on a non-transitory machine-readable storage medium.

The cache management apparatus 130 may configure the solid-state storage device 114 as a write back cache where data is first written to the solid-state storage device 114 by the clients and later moved to the backing store 118. The method 800 begins with the cache management apparatus 130 receiving 802 a write request. The write request may reference data to be stored in persistent storage. The request may include the data and/or may be substantially free of the data. The write request may be associated with a logical address (e.g., an LBA).

The cache controller 312 determines 804 whether there is space available on the solid-state storage device 114. The cache controller 312 performs this check to ensure that the solid-state storage device 114 does not exceed its maximum capacity threshold. In some embodiments, the cache controller 312 performs the determination 804 prior to writing data into the solid-state storage device 114. In other embodiments, as described above, the frequency of the determination 804 varies.

The determination may comprise accessing metadata maintained by the solid-state storage device 114. The metadata may comprise an index associating logical block addresses to storage units. Storage units that are occupied by valid data may not be available for storage, while storage units that are not may be available for use. The metadata may further comprise a reverse index, which may associate storage units of the solid-state storage device 114 with respective validity/discardability indicators. Storage units that are invalid and/or discardable may be considered to be available for storage.

If there is space available in the solid-state storage device 114, the cache controller 312 writes 806 the data into a unit of the solid-state storage device 114 and marks the unit as non-discardable. The writing of step 806 may comprise a sequential storage operation as described above. Sequential writing may comprise selecting storage units to store the data (e.g., using an append point or other sequential indicator), writing the data on the selected storage units, updating metadata of the solid-state storage device 114 to associate the logical address(es) of the write request with the selected storage units, and so on.

The backup engine 314 may then backup 808 the data to the backing store 118 such that the data is stored in the backing store 118. Backing up the storage units may comprise updating metadata of the solid-state storage device to indicate that the storage units are discardable. The backup engine 314 may operate at a selected priority level and, as such, may wait until an opportune time to back 808 the data to the backing store 118. Following step 808, the method 800 may end.

If there is no space for the data on the solid-state storage device 114, the cache management apparatus 130 pauses 810 the write request until the cache management apparatus 130 can make room for the data in the solid-state storage device 114. In other embodiments, the cache management apparatus 130 may cause the data to be written to the backing store 118, and perform a read operation that results in the data being inserted into the solid-state storage device 114 once sufficient space is generated in the solid-state storage device 114.

After pausing 810 the write request, the cache management apparatus 130 may determine 812 if there are storage units in the solid-state storage device 114 that are marked discardable and/or invalid (using the metadata 117). The check may further comprise evaluating a "do not care" state for the valid/discardable metadata. In some embodiments, nondiscardable storage units may be retained, even if marked as invalid (e.g., may be retained for a snap shot, backup, or the like). If there are discardable storage units, in some embodiments, the cache management device 130 finds 820 the units that are discardable and evicts them from the solid-state storage device 114 and returns to determine 804 if space is available on the solid-state storage device 114. The cache controller 312 may, for example, mark all units that are discardable as invalid. In another embodiment, the groomer 310 may groom the solid-state storage device 114 without preserving data in units that are marked discardable. If, after the evictions, there is room on the solid-state storage device 114, the data is stored in the solid-state storage device 114.

If there are no discardable storage units in the solid-state storage device 114, the cache management apparatus 130 may find 814 storage units in the cache that are marked nondiscardable in the discardability map and back up 816 the units to the backing store 118. In some embodiments, the cache management apparatus 130 does this by increasing a priority of the backup engine 314. Once the data is moved into the backing store 118, the cache management apparatus 130 updates the metadata 117 to mark 818 the units as discardable and finds 820 units that are discardable and evicts them from the solid-state storage device 114. The cache management apparatus 130 returns and again determines 804 if space is available on the solid-state storage device 114 to write the data.

Figure 9A:
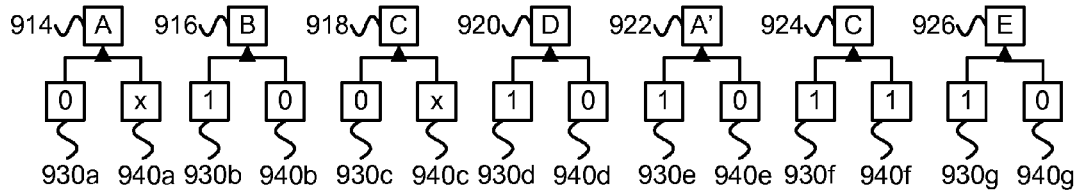
FIG. 9A is a schematic block diagram illustrating an exemplary embodiment of a backup engine operating on units in a solid-state storage device.

FIG. 9a shows an exemplary embodiment of a backup engine 314 performing backup operations on storage units 914 through 926 of a solid-state storage device 114. FIG. 9a shows each storage unit 914 through unit 926 having an associated validity indicator 930a-g and discardability indicator 940a-g. The validity indicators 930a-g and discardability indicators 940a-g are associated with the respective units 914-926 by a datastructure, such as a map comprising cache entry to storage unit associations. FIG. 9a shows the units in an initial state, and FIG. 9b shows the units as the backup engine 314 moves through the units 914-926.

In some embodiments, the data in the units 914 through 926 is written sequentially; in such an embodiment, the units 914 through 926 have physical addresses on the solid-state storage device 114, which increase incrementally. For example, the unit 914 may have a physical address "0", the unit 916 may have a physical address "1", and so on. Where the data is written sequentially, the data is written at the lowest available physical address. When the file system begins writing the data "A" to the solid-state storage device 114, it writes the data "A" to unit 914 with physical address 0, and then writes the next data "B" to unit 916 with physical address 1, and so on.

In such embodiments, the physical organization of the data on the solid-state storage device 114 can be used as a log indicating which data is oldest and which is newest. For example, one might assume that the data written in unit 914 is older than the data written in unit 920. In other embodiments, the log is a data structure that specifies the age of the data in the solid-state storage device 114 absolutely (i.e., through the use of timestamps), relative to other data in the solid-state storage device 114, or both. In some embodiments, the physical organization of the data on the solid-state storage device 114 is used in conjunction with a log to determine the age of the units in the solid-state storage device 114.

Figure 9B:
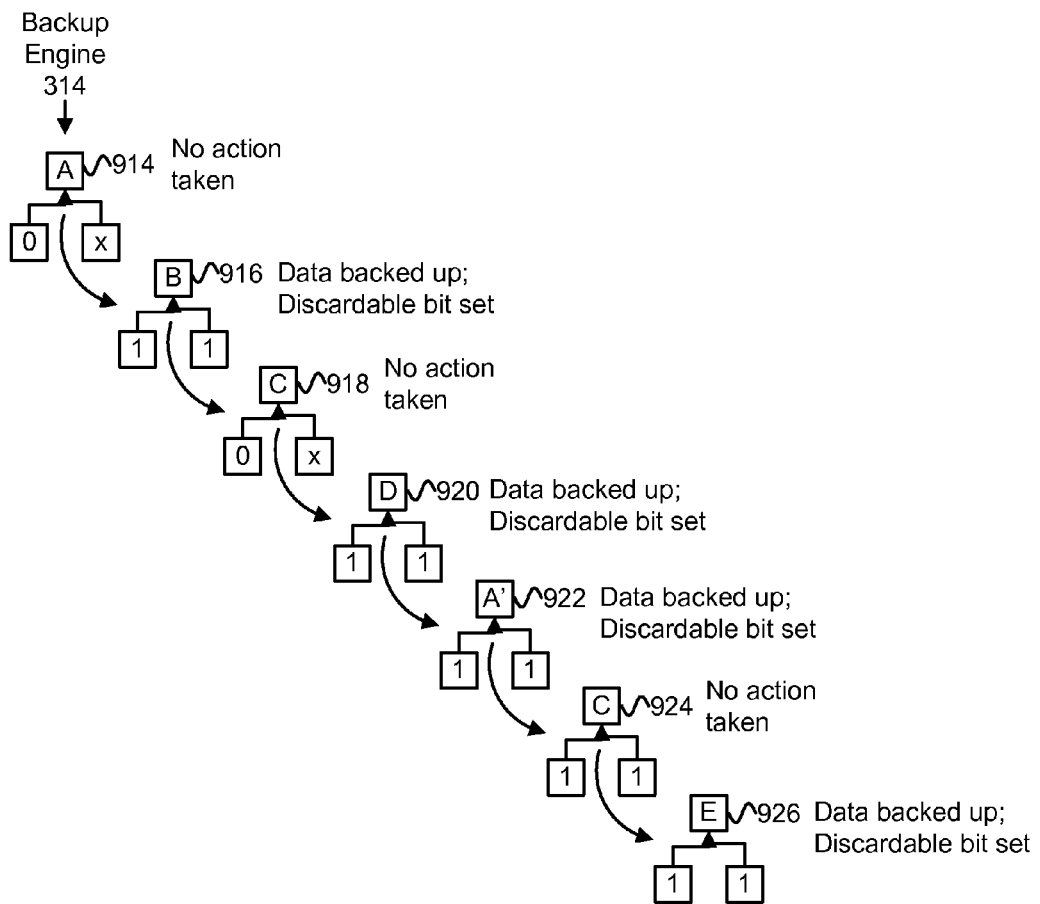
FIG. 9B is a schematic block diagram illustrating an exemplary embodiment of a backup engine operating on units in a solid-state storage device.

As shown in FIG. 9b, the backup engine 314 in some embodiments begins backing up data in the solid-state storage device 114 by flushing the data to the backing store 118. In some embodiments, the backup engine 314 starts at the oldest data in the solid-state storage device 114 and moves chronologically through the storage units 914-926 in the solid-state storage device 114 until it reaches the most current storage unit. In some embodiments, the backup engine 314 does so by moving sequentially through the storage units 914-926 in the solid-state storage device 114, backing up data in one unit to the backing store 118, then incrementing the physical address to move to the next unit. In other embodiments, the backup engine 314 moves chronologically through the units 914-926 by referencing metadata maintained by the solid-state storage device 114 (e.g., a reverse index and/or log data structure). For example, the backup engine 314 may start with an entry for a unit in the reverse index or log, back up the data, move to the next entry, and continue doing so until the entire log is read, at which point the backup engine 314 may loop back to the beginning of the structure.

In some embodiments, the backup engine 314 first determines whether the data for the particular unit 914-926 is valid or invalid using the metadata (e.g., the reverse index or log), which may comprise a validity indicator 930a-g as described above. If the validity indicator 930a-g is set to invalid, the backup engine 314 may choose not to backup the data in the unit 914-926. For example, as shown in FIG. 9b, the backup engine 314 may start at unit 914, the oldest unit in the solid-state storage device 114, look at the validity indicator 930a, and see that the validity indicator is set to invalid. Because the validity indicator 930a is set to invalid, the backup engine 314 moves to the next unit 916 without backing up the data A associated with the unit 914. Because the discardability indicator 940a does not come into play when the unit 914 is deemed invalid, the discardability indicator 940a can be represented as a "don't care"; that is, the status of the discardability indicator is irrelevant to the backup engine 314 when the invalidity indicator indicates that the data is invalid.

In FIG. 9b, the backup engine 314 then stores the unit 916 with data B in the backing store 118. The validity indicator indicates that the data B is still valid. In some embodiments, after determining that the data B is valid, the backup engine 314 then looks at the discardability indicator 940b to determine whether the data B has been backed up to the backing store 118. If the discardability indicator 940b is set to discardable, the backup engine 314 moves to the next unit 918 without storing the data B in the backing store 118 because the data B has already been stored in the backing store 118.

Where the discardability indicator 940b is set to nondiscardable, the backup engine 314 may store the data B into the backing store 118. In some embodiments, the backup engine 314 initiates a write request directed to the backing store 118 for the data B. In some embodiments, as discussed previously, the data includes both the data and the LBA the data is associated with. In such embodiments, the backup engine 314 may extract the LBA from the data in the unit 916 and request that the data be written to that LBA in the backing store 118.

FIG. 9a shows that, initially, the data B in unit 916 is nondiscardable. When the data B is written to the backing store 118, the backup engine 314 updates the metadata to change the discardability indicator 940b to discardable (a "1" in FIG. 9b), as shown in FIG. 9b. In some embodiments, the backup engine 314 waits for confirmation from the backing store 118 that the data B has been successfully backed up before changing the discardability indicator. In some embodiments, if the backup engine 314 has not received a confirmation within a certain period of time, the backup engine 314 retries to save the data to the backing store 118. When the data B is successfully backed to the backing store 118, and the discardability indicator 940b set to discardable, the backup engine 314 moves to the next unit in the solid-state storage device 114, such as unit 918.

As discussed above, the backup engine 314 may determine that the data C in unit 918 is invalid and thus move on without backing up the data C. The backup engine 314 may then backup the data D in unit 920 and change the discardability indicator 940d to discardable.

In certain instances, the backup engine 314 may encounter a unit, such as unit 924, with data C that is marked as both valid and discardable. If the discardability indicator 940f is set to discardable (indicating that the data C has already been backed up) the backup engine 314 may move to the next unit without backing up the data C.

In some embodiments, the backup engine 314 continuously scans over the units 914-926 in the solid-state storage device 114. In other embodiments, the backup engine 314 completes an iteration through the units 914-926 in the solid-state storage device 114 and waits a period of time before beginning a second iteration. In some embodiments, the backup engine 314 acts as a background process on the solid-state storage device 114 and operates when spare cycles (whether CPU cycles, bus cycles, or others) are available. The backup engine 314 may also be given a set schedule; for example, an administrator may configure a solid-state storage device 114, such that the backup engine 314 performs backing operations at a certain time, such as during the night when traffic is low.

In some embodiments, the backup engine 314 will search through the validity and discardability indicators to determine where action is required and queue backup activities and commands to be executed when resources are available. For example, the backup engine 314 may go through the logic of FIG. 9 but without actually executing any commands; rather, the backup engine 314 may determine what actions may be necessary for a particular unit, add those actions to a list, and move to the next unit. In this manner, the backup engine 314 may compile a list of actions as it crawls through the units and the associated maps on the solid-state storage device 114. Another process may asynchronously pull actions and/or commands from the list and execute them.

The backup engine 314 may prioritize backup operations based on metadata 117 associated with the storage units. For example, the metadata 117 may indicate that a storage unit comprising nondiscardable data has a high level of wear and/or a high error rate. Based upon the metadata 117, the backup engine 314 may increase the priority of the backup of the identified storage unit. Increasing the priority may comprise inserting the backup operation at the head of a queue, skipping other nondiscardable storage unit backups, or the like.

In some embodiments, as mentioned above, a cache controller 312 may increase the priority of the operations of the backup engine 314. For example, the cache controller 312 may give the backup engine 314 the highest priority if the solid-state storage device 114 is full and there are no units 914-926 (or not enough units 914-926) in the solid-state storage device 114 that are marked as discardable. In some embodiments, the cache controller 312 may incrementally increase the priority of the backup engine 314 as the solid-state storage device 114 begins to fill and the available storage space on the solid-state storage device 114 decreases.

In some embodiments, the backup engine 314 may be invoked at opportune times to supplement the chronological backup process. The backup engine 314 may be configured to proceed chronologically through units in the solid-state storage device 114 yet be available to be invoked out of sequence at opportune times. For example, the solid-state storage device 114 may invoke the backup engine 314 to back up data in one or more units when that data is being read and when the backup resources are available. The read may be initiated by a client accessing the data. The read may be initiated by the groomer 310 while performing garbage collection, scrubbing the data, recovering the data from a worn or failing block, or other grooming operation.

The read may be initiated by a reduplication process. The read might also be initiated by a RAID rebuild or a progressive RAID operation as described in U.S. patent application Ser. No. 11/952,115 to David Flynn, et. al., filed Dec. 6, 2007, entitled "Apparatus, System, and Method for Reliable, High Performance Storage of Data with Progressive RAID," which application is hereby incorporated by reference in its entirety. The backup engine 314 may work in conjunction with other processes to reduce system overhead. One skilled in the art will recognize other processes that might be opportunistically used to initiate backup.

The backup engine 314 may also be invoked by the groomer 310. In some embodiments, the groomer 310 invokes the backup engine 314 to free storage divisions (e.g. erase blocks of the solid-state storage device 114). For example, the groomer 310 may access the metadata 117 to determine that a particular storage division contains a significant amount of nondiscardable data and that the data is cold. The groomer 310 may invoke the backup engine 314 to back up the units of the particular erase block and then groom the erase block, treating the newly discardable units as if they were invalid, and thus freeing space on the solid-state storage device 114.

Figure 10:
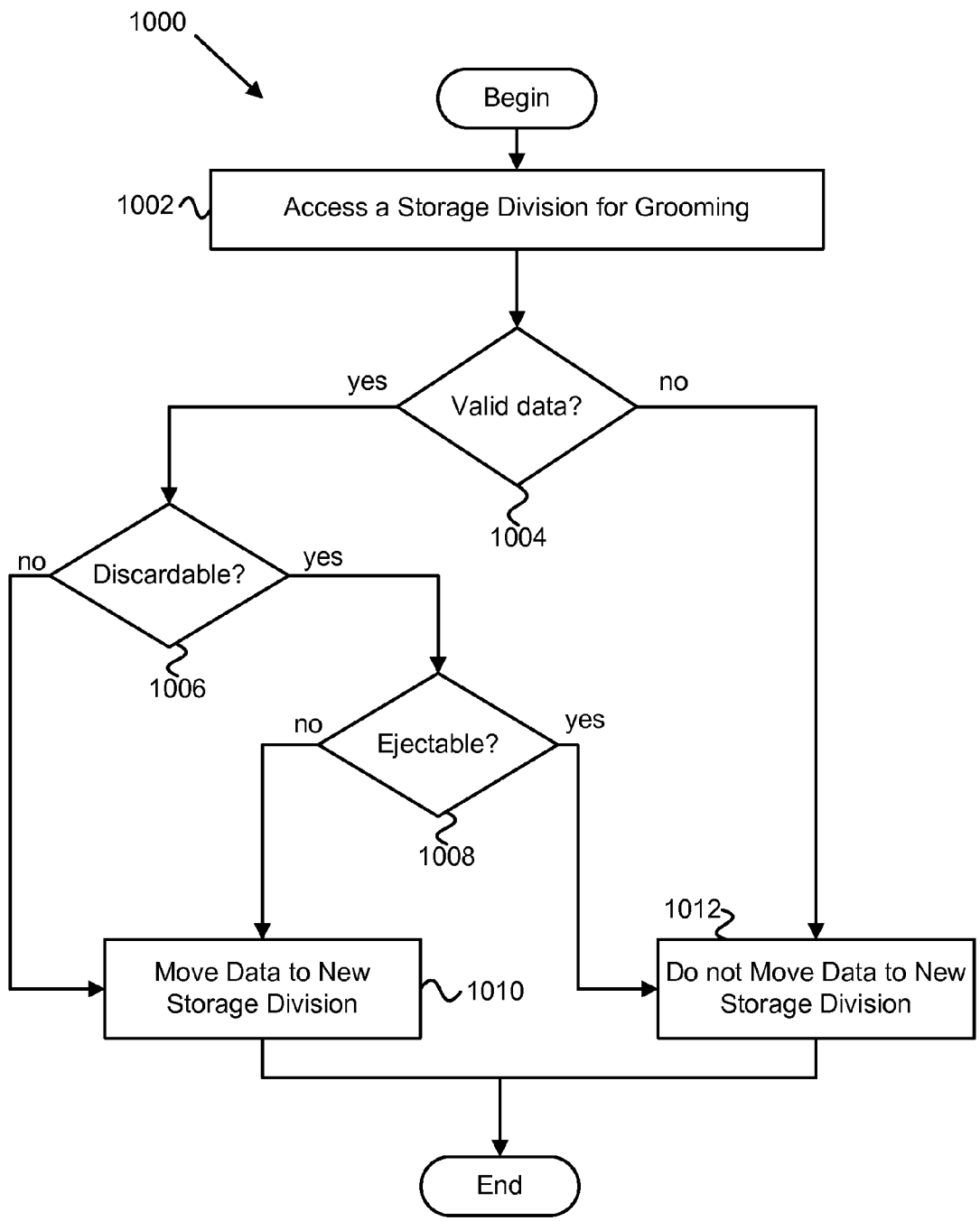
FIG. 10 is a schematic flow chart diagram illustrating an exemplary embodiment of a method for grooming units in a solid-state storage device.

FIG. 10 shows an exemplary embodiment of a method 1000 for a groomer 310 using metadata pertaining to cache operations for grooming. As described above, steps of the method 800 may be tied to particular machine components and/or may be implemented using machine-readable instructions stored on a non-transitory machine-readable storage medium.

The groomer 310 may perform the operations to perform the decisions listed in FIG. 10, or may call other routines or processes to offload some or all of the operations. The method 1000 begins with the groomer 310 accessing 1002 a storage division for a grooming operation. The grooming operation may be, in some embodiments, a garbage collection operation. In other embodiments, the grooming operation may be data movement due to read or write disturbs, defragmentation, a refresh, or other data grooming operation. In some embodiments, upon accessing a storage division for a grooming operation, the groomer 310 determines 1004, using the metadata (e.g., validity indicators), which storage units of the solid-state storage device 114 contain valid data. In a storage division recovery operation, the data in those storage units that are identified as containing invalid data in the validity map are not moved to a new erase block. As a result, when the erase block is initialized (for example, having 1 s written to all pages) the invalid data is erased.

The groomer 310 then accesses metadata 117 to identify 1006 storage units that contain valid data contain data that are discardable (e.g., using a discardability map). In some embodiments, those units that the groomer 310 determines are nondiscardable are moved 1010 to the new storage division as part of the grooming operation, and the method 1000 ends. The groomer 310 may initially move the valid and nondiscardable data into a buffer in preparation for moving the data to a new storage division. In some embodiments, the groomer 310 may also invoke the backup engine 314 to back up the data in these units, such that the units become discardable. In some embodiments, the groomer 310 may invoke the backup engine 314 and pause the grooming operation until the backup engine 314 moves the data into the backing store 118. The groomer 310 may then resume after the backup operation is complete and treat the newly discardable units as discardable data.

If the groomer 310 determines 1006 that the particular units are discardable, the groomer 310 may make a determination 1008 as to whether or not the data associated with the units that are discardable can be evicted (e.g., are cold). The determination may be made by a cache management apparatus 130 using, inter alia, metadata pertaining to storage operations performed on the solid-state storage device 114, such as access patterns, frequency, and so on. If the groomer 310 determines 1008 that the data is evictable, the groomer 310 does not move 1012 the data to a new erase block and the method 1000 ends. If the groomer 310 determines 1008 that the data is not cold, the groomer 310 moves 1010 the data to a new erase block and the method 1010 ends.

In some embodiments, the groomer 310 may assume that all units that have been backed up, and thus have a discardability indicator set to discardable, are cold. In such embodiments, all of the units that have a discardability indicator set to discardable are not moved during the grooming operation. Such an embodiment may result in the groomer 310 aggressively reclaiming space in the solid-state storage device 114 and may be particularly useful when the solid-state storage device 114 is at or is approaching maximum capacity. In addition, in embodiments where the backup engine 314 performs backup operations chronologically, it may be a reasonable assumption that units that are marked discardable contain cold data, at least from a write perspective, as the older data is more likely than newer data to be marked discardable.

In other embodiments, the groomer 310 may make a determination, using the metadata 117, as to whether the individual storage units are evictable (per a caching policy of the cache management apparatus 130, or the like). In some embodiments, the groomer 310 makes the evictability determination as to an individual storage unit and treats a set of contiguous units similarly. For example, a set of storage units associated with a logical address range (e.g., a particular node in index or B-Tree), may be evicted (or retained) as a group. The groomer 310 may implement the necessary instructions to determine evictability may consult another entity, such as the cache controller 312, as to which units contain cold data.

In some embodiments, the cache controller 312 may access metadata pertaining to storage operations to determine which storage units contain cold data and which contain warm data. In some embodiments, the metadata 117 comprises a read log (or timestamps) to tracks reads on storage units (or logical addresses), as well as writes to storage units, and the reads are also considered in determining whether or not the data in the unit is cold. The cache controller 312 may deem any data that is at the start of the log to be cold and, once the data is backed to the backing store 118, evictable.

In some embodiments, the cache controller 312 does not deem data to be cold until the target occupancy threshold is reached. Thus, while the used storage of the solid-state storage device 114 is below the target occupancy threshold, the cache controller 312 may choose not to evict any data from the solid-state storage device 114. In such embodiments, the backup engine 314 may still perform backup operations on data; however, the cache controller 312 may instruct the groomer 310 to treat data having the discardability indicator set to discardable as not cold until the target occupancy threshold is reached. The cache controller 312 may instruct the groomer 310 to treat the data that has the discardability indicator set to discardable once the target occupancy threshold is reached.

In some embodiments, the cache controller 312 may have multiple criteria for determining whether data is cold. For example, the cache controller 312 may deem any data that is older than a certain time period (for example, 4 hours) to be cold and a candidate for eviction regardless of the occupancy of the solid-state storage device 114. The cache controller 312 may also have new rules for designating data to be cold once the target occupancy threshold is reached, as described above.

In some embodiments, the cache controller 312 dynamically modifies the rules for what data is considered cold based on parameters. For example, the cache controller 312 may learn when there is a high write workload and prepare the solid-state storage device 114 by increasing the amount of data that is deemed cold (and thus the evictions), thereby freeing space on the solid-state storage device 114. The cache controller 312 may empty the solid-state storage device 114 at the end of every day such that each day begins with an empty solid-state storage device 114.

In some embodiments, the cache controller 312 may direct the backup engine 314 to back data of a storage unit to the backing store 118 only if the data of the unit is cold. The cache controller 312 may determine what data is cold using approaches similar to those described above. In such an embodiment, the groomer 310 may assume that all units having a discardability indicator set to discardable are cold.

In some embodiments, the data from more than one storage unit will be part of a logical data unit. These logical-to-storage unit associations may be maintained in the metadata 117 (e.g., in the forward and/or reverse indexes). For example, a particular file may be too large to store in a single storage unit; thus, the file may be stored in multiple storage units, with each storage unit in the solid-state storage device 114 corresponding to a unique storage unit LBA. Where the cache controller 312 has access to metadata describing this context information (such as a map) that specifies how the data in LBAs (and thus how the data in various units) are related, the backup engine 314 and the cache controller 312 may operate at a logical level to enable more efficient operation.

For example, the backup engine 314 may back up the data for a particular unit, determine whether there are additional storage units in the solid-state storage device 114 that hold that is part of the same logical data unit, and back up those storage units as well. Similarly, if the groomer 310 determines that a particular storage unit contains data that is valid, discardable, and cold, the groomer 310 may use the context information to determine which other units contain associated data. In some embodiments, the groomer 310 ensures that the storage units containing associated data are also backed up and sets the invalidity indicator to invalid. If the storage unit is not backed up, the groomer 310 may call the backup engine 314 to backup the data in the associated units.

In some embodiments, the solid-state storage device 114 may not have access to context information that allows the cache management apparatus 130 to definitively determine the associations between the data in various storage units of the solid-state storage device 114. In some embodiments, the cache controller 312 makes intelligent guesses as to which units belong together based on the metadata 117 (e.g., storage metadata 316, such as a sequential storage log). For example, the cache controller 312 may assume a set of storage units that were written contiguously constitute a logical data unit such as a file. Similarly, the cache controller 312 may assume that a set of units that are consistently read together constitute a logical data unit. The cache controller 312 may then direct the backup engine 314 and the groomer 310 to treat the set of units as a logical data unit as described above. In related embodiments, multiple files and datasets that are typically accessed together may logically be associated and operated upon by the solid-state storage device 114 as a group.

In some embodiments, once the cache controller 312 determines that a set of units hold data forming a logical data unit, the cache controller manages the backup engine 314 to ensure that the units are backed up together. These units need not be stored contiguously in the solid-state storage device 114. Many hard disk drives and other media in the backing store 118 read data more efficiently when the data is presented as a stream; as such, the cache controller 312 may cause the solid-state storage device 114 to stream the data from units forming a logical data unit to the hard disk drive. Similarly, the cache controller 312, in response to a cache miss, may receive data as a stream from the backing store 118.

Figure 11:
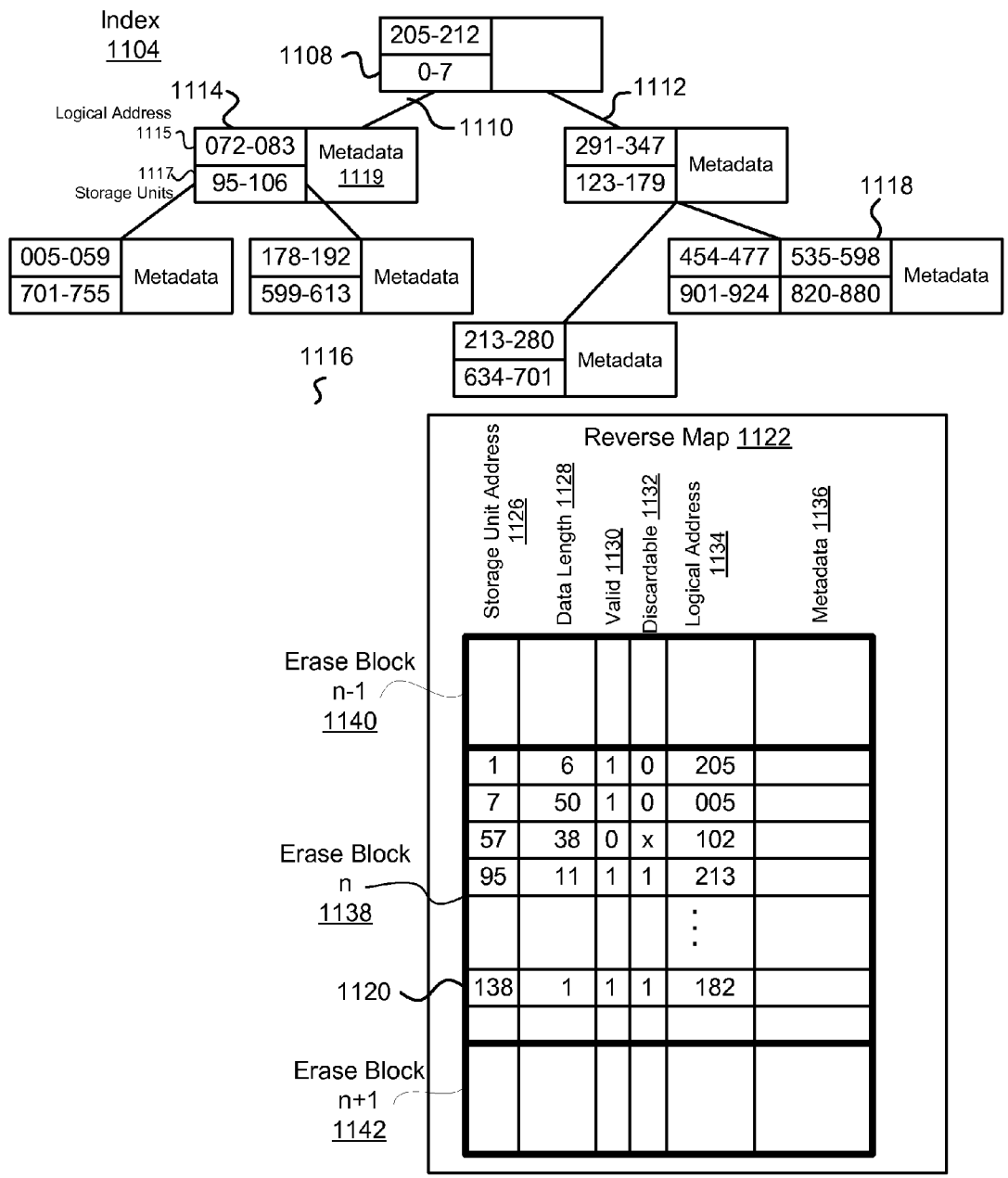
FIG. 11 is a schematic block diagram of an exemplary datastructure for maintaining shared metadata.

FIG. 11 is a schematic block diagram an exemplary data-structures comprising shared metadata. An index 1104 may comprise a tree (or other data structure) comprising a plurality of cache entries (e.g., nodes 1108, 1114, 1116, and so on). Each cache entry in the index 1104 may associate a logical address (or logical address range or set) with one or more storage locations on the solid-state storage device (e.g., storage units). The storage units may be identified by an address 1117 (e.g., as depicted in entry 1114) or by some other identifier. The cache entries in the index 1104 may be of variable length, such that a single entry (e.g., entry 1114) may reference a set of logical addresses, a logical address range, or the like. The logical addresses may be contiguous (e.g. 072-083). Other entries, such as 1118, may comprise a discontinuous set of logical addresses (e.g., logical address 454-477 and 535-598). Accordingly, the index 1104 may be used to represent variable sized cache entries (e.g., cache entries corresponding to one or more storage units on the solid-state storage device 114 comprising data of an arbitrary set or range of logical addresses).

As shown in FIG. 11, the cache entries may be indexed by logical address (using edges, such as edge 1110), which may enable fast and efficient lookups. A exemplary search for a cache entry comprising the logical address "182" may proceed as follows. The search may initiate at a root cache entry, which, in the FIG. 11 example, is cache entry 1108. Where a single logical address (or address range) is included at a particular cache entry, such as the root cache entry 1108, if a logical address being searched ("182") is lower than the logical address of the cache entry 1108, the search may continue down a directed edge 1110 to the left of the cache entry 1108. If the searched logical address ("182") matches the current cache entry 1108 (e.g., is located within the range of the cache entry 1108), the search successfully terminates with the current cache entry 1108 being identified. If the searched logical address 1106 is greater than the range of the current node 1108, the search continues down directed edge 1112 to the right of the current cache entry 1108. Where an cache entry includes two logical addresses or address ranges (e.g., a discontinuous set as shown in entry 1118) and a searched logical address ("182") falls between the listed virtual addresses, the search continues down a center directed edge (not shown) to entries with logical addresses that fall between the two logical addresses of the current node 1108. A search continues down the index 1104 until an cache entry is identified or a leaf cache entry is reached and the search fails. In the FIG. 11 example, the search successfully terminates at the matching cache entry 1116 (e.g., the cache entry 1116 comprises the searched logical address "182").

Although in the FIG. 11 example the index 1104 is implemented using a B-Tree datastructure indexed by logical address, in other embodiments, the index 1104 may be implemented using a content addressable memory ("CAM"), a binary tree, a hash table, or other datastructure known in the art.

Each cache entry in the index 1104 may associate one or more logical addresses with respective storage unit(s) of the solid-state storage device 114. For example, the entry 1114 may associate the logical address range 072-083 with storage units 95-106. Those of skill in the art will recognize that the physical addresses of the storage units may be stored in the index 1104 or an offset into one or more storage structures of the solid-state storage media. As discussed above, the storage units of the entry 1114 may change due to modifications to the underlying data (e.g., due to modify, recovery operations, or the like). The cache entries may further comprise and/or reference metadata 1119, which may comprise cache eviction metadata (e.g., cache entry access patterns), cache entry age, size, cache attributes, cache directive, storage metadata (e.g., address of the storage units 1117), and so on. Since the metadata 1119 is associated with the cache entries, which are indexed by logical address (e.g., address 1115), the metadata 1119 may remain associated with the cache entry 1114 regardless of changes to the location where the underlying data is stored (e.g., changes to the storage unit addresses 1117).

The index 1104 may be used to efficiently determine whether the solid-state storage device 114 comprises data referenced in a client storage request and/or to identify a location of the data on the device 114. For example, the solid-state storage device 114 may receive a storage request 1102 for a particular logical address. The request may be directed to a backing store, or may be directed to the solid-state storage device 114. The request 1102 may specify a logical address and a length (e.g., request 3 units of data starting from logical address 074). Alternatively, the request 1102 may comprise a set of logical addresses, logical address ranges (continuous or discontinuous), or the like.

The solid-state storage device 114 may determine whether a cache entry corresponding to the requested logical addresses is available in the index 1104 using a search operation as described above. If a cache entry comprising the requested logical addresses is found in the index 1104, the solid-state storage device 114 comprises the requested data (a cache hit); otherwise, a cache miss occurs.

In the example depicted in FIG. 11, the cache entry corresponding to the storage request 1102 is in the index 1104 (cache entry 1114), and, as such, a cache hit occurs. To service the request, data may be read from the storage units 1117 identified in the cache entry 114 and returned to the originator or the request. If a cache miss occurs (e.g., the request references a logical address that is not in the index 1104), the solid-state storage device 114 may read the data from the backing store 118, store the data in one or more storage units on the solid-state storage device 114, and create a new cache entry in the index 1104. The new cache entry may be indexed according to its logical address, and may reference the storage units comprising the data.

If the cache miss references logical addresses proximate to an cache entry already in the index 1104 (e.g., references addresses 084-088), a merge operation may occur. In a merge operation, an existing cache entry may be "merged" with one or more other cache entries. For instance, a new cache entry for logical addresses 084-088 may be merged with entry 1114. The merge may comprise modifying the logical address 1115 of the cache entry to include the new addresses (e.g., 072-088) and/or may the storage units 1117 to include the storage units on which the data wrote stored.

A similar operation may occur when a partial cache miss occurs. A partial cache miss may occur when the index 1104 includes a portion, but not all, of the requested data. For example, the storage request 1102 may request addresses 078-088. In this case, the entry 1114 may reference a portion of the requested data, but not all of the data. To service the request, the solid-state storage unit may read the data available on the solid-state storage device (e.g., up to logical address 083), and access the remaining (e.g., missing) data from the backing store 118. The data read from the backing store may be stored on the solid-state storage device 114 and included in the index 1104 as a separate cache entry and/or within the cache entry 1114.

Although the cache entries in the index 1104 are shown as comprising references to storage unit addresses (e.g., addresses 1117), the disclosure is not limited in this regard. In other embodiments, the cache entries comprise reference or indirect links to the storage units. For example, the cache entries may include a storage unit identifier (or reference to the reverse index 1122).

The metadata of FIG. 11 may further comprise a reverse map 1122, which may identify the storage units comprising the data associated with the logical addresses of the cache entries. The reverse map 1122 may associate a storage unit with metadata, such as a validity indicator 1130, discardability indicator 1132, and/or other metadata 1136 (described below). In some embodiments, the storage unit address 1126 and/or length 1128 may be explicitly included in the reverse map 1122. Alternatively, the storage unit address 1126 and/or data length 1128 may be inferred from a location of an entry (e.g., 1120) in the reverse map 1122 and, as such, the address 1126 and/or data length 1128 may not be needed. In some embodiments, the reverse map 1122 may optionally include references to logical addresses 1134. The logical address references 1134 may allow an entity accessing the reverse map 1122 to quickly access metadata pertaining to the logical entity associated with a storage unit (e.g., a particular cache entry in the index 1104).

The metadata 1136 may include, but is not limited to, metadata pertaining to sequential storage operations performed on the storage units. For example, the metadata 1136 may include a sequence indicator (e.g., timestamp), which may indicate a sequence in which the storage units were stored (e.g., as well as an "age" of the storage units and so on). The metadata may further include metadata pertaining to the storage media, such as wear level, reliability, error rate, disturb status, and so on. As described above, the storage metadata may be used to efficiently implement cache management operations, such as cache eviction decisions, cache data movement (e.g., if data of a "hot" cache entry is stored in a less reliable storage unit), and so on.

The reverse map 1122 may be organized according to storage divisions (e.g., erase blocks) of the solid-state storage device 114. In this example, the entry 1120 that corresponds to cache entry 1118 is located in erase block n 1138. Erase block n 1138 is preceded by erase block n−1 1140 and followed by erase block n+1 1142 (the contents of erase blocks n−1 and n+1 are not shown). An erase block may comprise a predetermined number of storage units. An erase block may refer to an area in the solid-state storage device 114 that is erased together in a storage recovery operation.

The validity and/or discardability metadata 1130 and 1132 may be shared by a cache management backup process and groomer (e.g., storage recovery and maintenance). A backup process may use the reverse map 1122 to iterate over the storage units in chronological order (from oldest to youngest). The backup process may backup storage units to the backing store that are valid and nondiscardable (as indicated by metadata 1130 and 1132). The backup process may prioritize backup using the metadata 1136; for example, the backup engine may increase the backup priority of data stored on storage units that are unreliable, have a high amount of wear, or the like as indicated by the metadata 1136.

Similarly, a groomer may use the metadata 1130, 1132, and/or 1136 to perform sequential storage operations. For example, when recovering a storage division, the groomer may be required to retain (e.g., rewrite) valid data to a next storage division. However, if the discardability indicator 1132 indicates that the data is discardable, the groomer may elect to note restore the data, which may allow the groomer to operate more efficiently (e.g., reduce write amplification). Alternatively, or in addition, the groomer may use the logical address 1134 associations to access the cache metadata (e.g., metadata 1119) to identify storage units that should be retained on the solid-state storage device during storage division recovery operations (retain discardable data if it is "hot" per the metadata 1119). The groomer may use the cache metadata (e.g., metadata 1119) for other purposes including, but not limited to: performing data refresh operations, performing data moves (e.g., move "hot" data from an unreliable storage unit to another storage unit), and so on.

Typically, the reverse map 1122 is arranged by storage division (e.g. erase blocks) or erase region so that traversing a section of the map associated with an erase block (e.g. erase block n 1138) to efficiently make storage recovery and/or refresh decisions. Arranging an index into a forward map 1104 that can be quickly searched to identify a physical address 1126 from a virtual address 1106 and a reverse map 1122 that can be quickly searched to identify valid data and quantity of valid data in an erase block 1138 is beneficial because the reverse map 1122 may be optimized for searches and storage recovery operations. One of skill in the art will recognize other benefits of an index with an index 1104 and a reverse map 1122.

Figure 12:
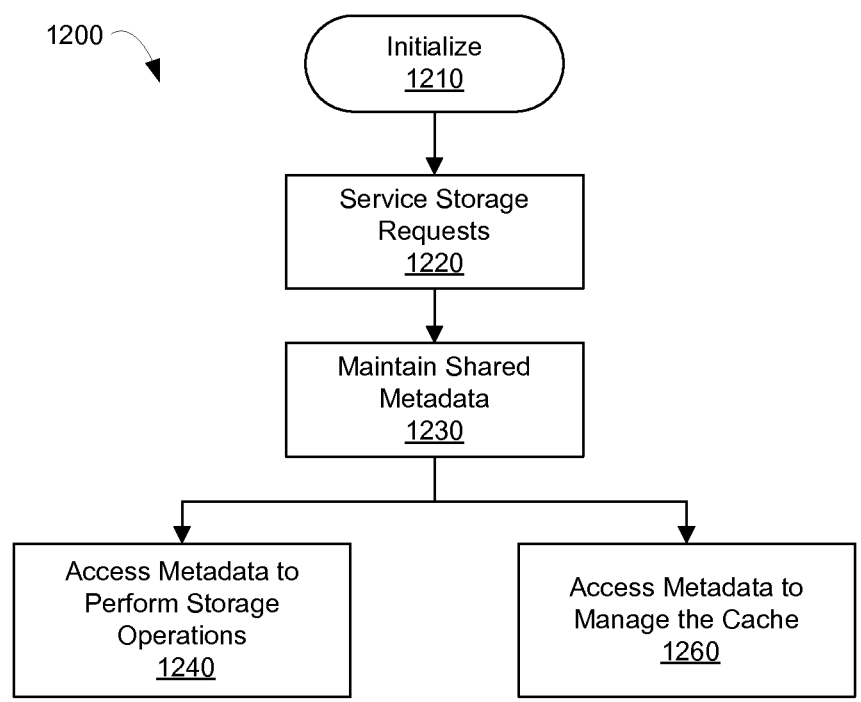
FIG. 12 is a flow diagram of one embodiment of a method for caching data on a solid-state storage device.

FIG. 12 is a flow diagram of one embodiment of a method for caching data on a solid-state storage device. As described above, steps of the method 1200 may be tied to particular machine components and/or may be implemented using machine-readable instructions stored on a non-transitory machine-readable storage medium.

At step 1210, a solid-state storage device may be initialized for use. The initialization may comprise allocating resources for the solid-state storage device (e.g., solid-state storage device 114), such as communications interfaces (e.g., bus, network, and so on), allocating volatile memory, accessing solid-state storage media, and so on. The initialization may further comprise initializing a shared metadata datastructure, such as the data structures described above in conjunction with FIG. 11, identifying a backing store device (e.g., backing store 118), and/or providing a storage interface to one or more clients (e.g., clients 110*a-c*).

At step 1220, the solid-state storage device may service storage requests from one or more clients. The storage requests may be directed to the backing store (when the solid-state storage device is configured to cache data transparently) and/or may be directed to the solid-state storage device itself.

At step 1230, the solid-state storage device may maintain shared metadata (e.g., metadata 117) pertaining to the storage requests. The shared metadata may comprise storage metadata pertaining to storage operations performed on the solid-state storage device and/or to the solid-state storage media (e.g., metadata 316). Accordingly, the storage metadata may comprise associations between logical addresses and solid-state storage units, a validity map, storage reclamation metadata (e.g., wear level, reliability, append point, and so on), and the like.

The shared metadata maintained at step 1230 may further comprise cache metadata pertaining to a cache stored on the solid-state storage device (e.g., pertaining to cache operations performed on the solid-state storage device). The cache metadata may share the logical address to storage unit index of the storage metadata. The shared metadata may, therefore, comprise an index (e.g., index 1104) comprising a plurality of cache entries, each associating a logical address to one or more storage units of the solid-state storage device. The cache metadata may further comprise cache eviction metadata, such as data access patterns, cache attributes, cache directives, and so on (e.g., stored in metadata 1119 of FIG. 11). The metadata maintained at step 1230 may comprise an index (e.g., index 1104 of FIG. 11) and/or a reverse index (e.g., reverse index 1122 of FIG. 11).

At step 1240, the method 1200 may access to the shared metadata to perform storage operations on the solid-state storage device. The sequential storage operations may include, but are not limited to, performing sequential (e.g., out-of-place) storage operations, maintaining logical-to-storage unit associations, maintaining storage unit validity indicators, selecting storage divisions for recovery (e.g., garbage collection), determining a current occupancy level of the solid-state storage device, selecting storage units to retain during a storage division recovery operations, and so on.

At step 1260, the method 1200 may access to the shared metadata to manage the cache stored on the solid-state storage device. Managing the cache may comprise, but is not limited to: backing up storage divisions to the backing store, maintaining cache eviction metadata, selecting cache entries for eviction, and so on.

Figure 13:
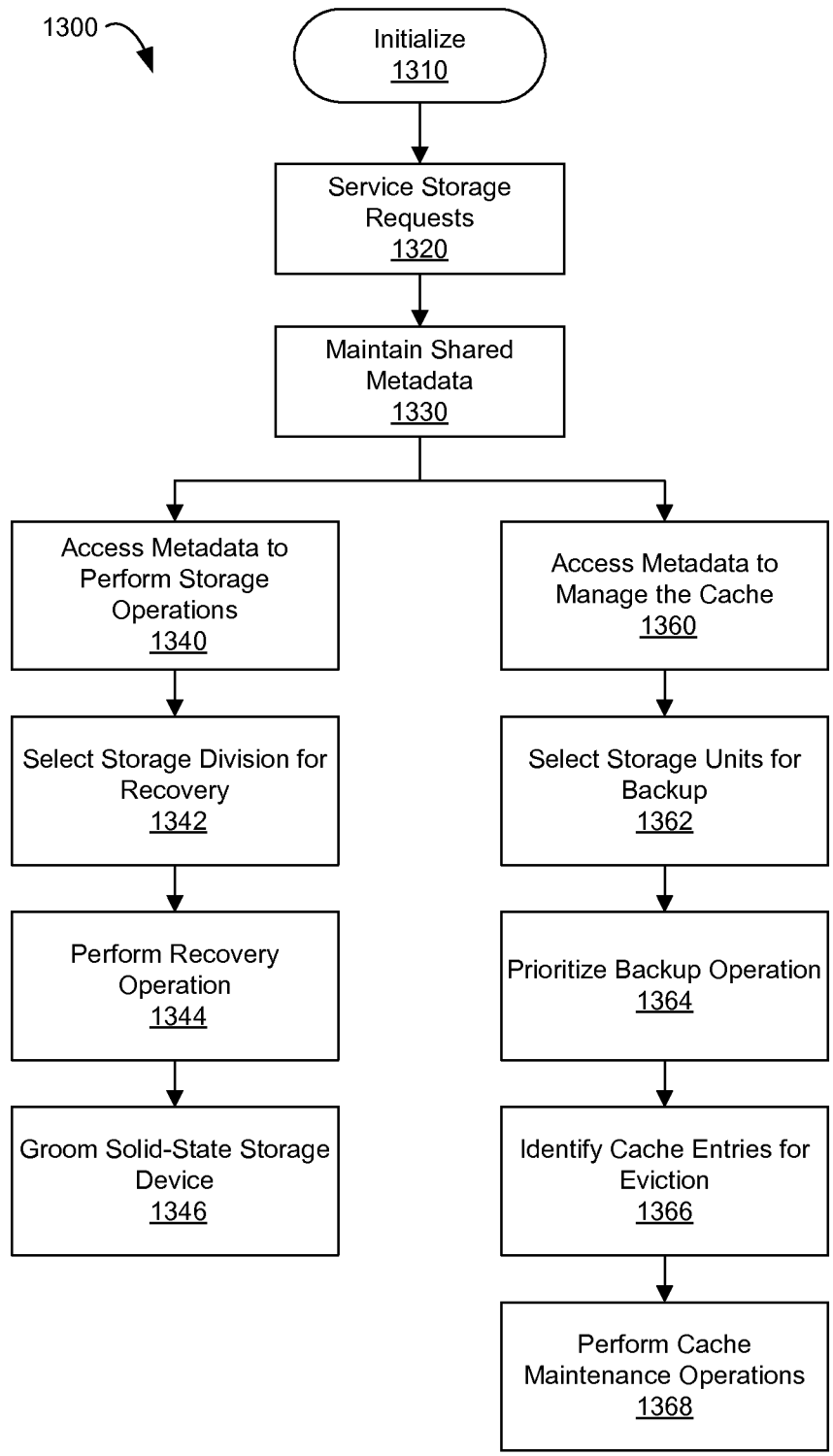
FIG. 13 is a flow diagram of another embodiment of a method for caching data on a solid-state storage device.

FIG. 13 is a flow diagram of a method 1300 for caching data on a solid-state storage device. As described above, steps of the method 1200 may be tied to particular machine components and/or may be implemented using machine-readable instructions stored on a non-transitory machine-readable storage medium.

At steps 1310, 1320, and 1330, the method 1300 may be initialized, service storage requests, and maintain shared metadata, as described above.

At step 1340, the method 1300 may access the shared metadata to manage sequential storage operations of the solid-state storage device.

At step 1342, the method 1300 may use the cache metadata to select a storage division for recovery. Step 1342 may comprise accessing cache metadata identifying storage units that have been stored on the backing store (e.g., discardable storage units). The selection of a storage division may be based on a threshold of valid data in the storage division that is to be retained on the storage device (e.g., rewritten to another storage location). The amount of valid data may be determined using the discardability indicators; if a storage unit is valid and discardable, the storage unit may be erased during the recovery operation without losing and/or corrupting data.

Step 1342 may further comprise accessing cache metadata to determine whether a storage unit is associated with a cache entry that should be retained on the solid-state storage device (e.g., according to an eviction policy or other metadata). For example, if a cache entry is "hot" (likely to result in a cache miss if removed), the storage unit may be retained during the recovery operation even though it is identified as discardable.

At step 1344, the method 1300 may implement a recovery operation on the selected storage division. The recovery operation may access the cache metadata (in the shared metadata) to perform the recovery operation. The recovery operation may comprise identifying nondiscardable storage units on the storage division (using the cache metadata) and causing the identified storage units to be stored on another storage division and/or causing the nondiscardable storage units to be stored on the backing store. The operation may further comprise accessing the metadata to identify storage units associated with cache entries that should be retained on the solid-state storage device (e.g., according to cache eviction metadata associated with the cache entries). The identified storage units may be stored on another storage division of the solid-state storage device.

At step 1346, the method 1300 may implement a data grooming operation to refresh and/or manage the storage units (the data grooming operation may also include storage recovery operations, as described above in conjunction with steps 1342 and 1344). The grooming operation may access the shared metadata pertaining to the cache operations. For example, the grooming operation may identify storage units associated with "hot" cache entries or cache entries having a particular cache attribute, such as a "PIN" attribute (e.g., using cache eviction metadata), storage units that are nondiscardable, or the like. The grooming operation may also consult storage metadata to determine whether the storage unit should be moved to another storage division based on the storage division wear level, reliability (e.g., error rate), read disturbs, age, and so on.

At step 1360, the method 1300 may access the shared metadata to manage the cache stored on the solid-state storage device.

At step 1362, the method 1300 may select storage units to store on the backing store. The selection may be based on a chronology of when the storage units were written (from oldest to newest), which may be determined using storage metadata pertaining to the sequence of storage operations performed on the solid-state storage device. In some embodiments, the selection may be based on the cache eviction metadata (e.g., access patterns, such as access frequency, and so on). Depending on the use case, cache that have a high rate of modification may not be selected for back up in order to optimize use of bandwidth and the latency costs of performing the backup. The selection of step 1362 may comprise accessing a validity indicator; data marked as invalid may not be backed up regardless of its age and/or discardability indicator.

In some embodiments, step 1362 may comprise prioritizing backup operations. The prioritization may be based on storage metadata, such as storage division wear level, reliability, occupancy, and so on. For example, a storage unit stored on an unreliable (or high wear) storage division (as indicated by the storage metadata) may be backed up before a storage unit stored on a more reliable (or less wear) storage division.

At step 1364, the method 1300 may prioritize storage division backup operations based upon inter alia, storage metadata. The storage metadata may be used to determine a current occupancy of the solid-state storage device. The priority of the backup operations may be determined based on the current occupancy. When the occupancy is low (as compared to an occupancy threshold), backup may be configured to operation in the background. When occupancy is high, the priority of the backup operations may be increased (e.g., moved into the foreground).

At step 1366, the method 1300 may identify cache entries for eviction using the shared metadata (e.g., storage metadata). As described above, cache entries may be associated with cache eviction metadata, which may comprise access patterns, cache attributes, cache directives, and so on. This metadata may pertain to the cache entry data. However, due to the nature of sequential storage operations (e.g., write out of place, etc.), associations between storage units and cache metadata may be lost (e.g., when the physical storage location changes). The storage metadata, however, may maintain logical-to-storage unit associations (cache entries of FIG. 11), which may allow associations between cache entries and their associated cache eviction metadata to be retained regardless of the underlying sequential storage operations (e.g., changes to the physical address of the cache data). In another embodiment, the storage metadata may maintain logical-to-storage division associations (cache entries of FIG. 11), which may allow associations between cache entries and their associated cache eviction metadata to be retained regardless of the underlying sequential storage operations (e.g., changes to the physical address of the cache data).

The identification of step 1366 may access other types of storage metadata. For example, cache entries that are stored on high-wear and/or unreliable storage divisions may be preferred for eviction over similar entries stored on more reliable storage divisions, and so on.

At step 1368, the method 1300 may perform cache maintenance operations using the shared metadata (e.g., storage metadata). A cache maintenance operation may comprise identifying a "hot" cache entry and, using the storage metadata, causing the "hot" cache entry to be moved to another storage division of the solid-state storage device. The move may be performed for wear leveling purposes, to prevent excessive read disturbs, and the like. The selection may be made according to storage metadata that maintains relevant storage statistics (e.g., read count, age, and so on), maintained at the storage unit, storage division, virtual storage division, or other granularity level.

A cache maintenance operation of step 1368 may further comprise moving storage units that are of a certain age and/or are not backed up (e.g., are nondiscardable). Storage units that are nondiscardable are not stored on a backing store and, as such, if lost may cause data loss and/or corruption. These storage units may be moved from unreliable and/or high-wear storage divisions to prevent such loss. Similarly, nondiscardable storage units may be moved from proximity of "hot" storage entries to prevent errors caused by read disturbs, or other conditions.

Figure 14:
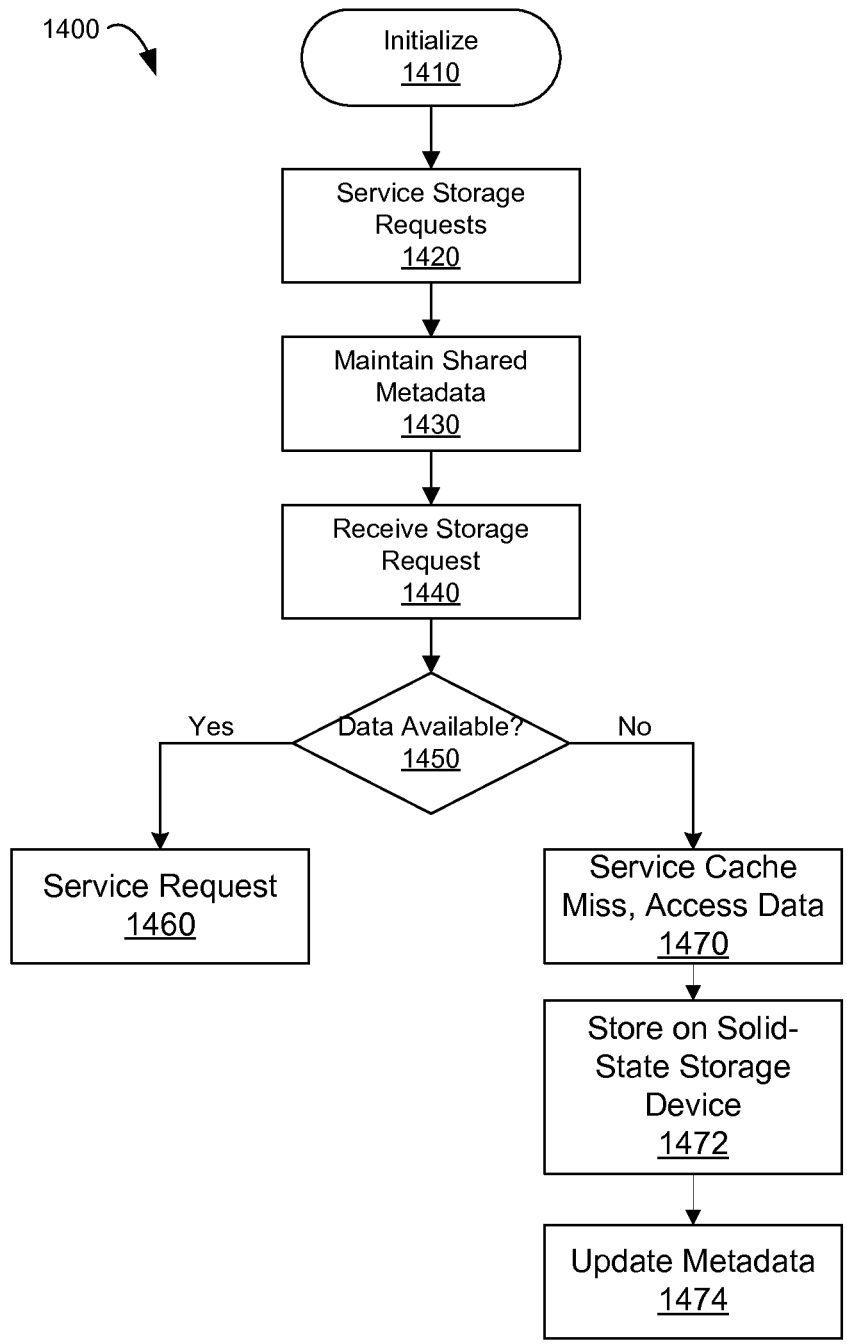
FIG. 14 is a flow diagram of another embodiment of a method for caching data on a solid-state storage device.

FIG. 14 is a flow diagram of a method 1400 for caching data on a solid-state storage device. As described above, steps of the method 1400 may be tied to particular machine components and/or may be implemented using machine-readable instructions stored on a non-transitory machine-readable storage medium.

At steps 1410, 1420, and 1430, the method 1400 may be initialized, service storage requests, and maintain shared metadata, as described above. The shared metadata may comprise a plurality of cache entries, each associating a logical address with one or more storage units comprising data of the cache entry. In some embodiments, the metadata may comprise a forward index, such as the B-Tree datastructure depicted in FIG. 11.

At step 1440, the method 1400 may receive a request for data at a particular logical address.

At step 1450, the method 1400 may determine whether data corresponding to the particular logical address is stored on the solid-state storage device. In some embodiments, step 1450 may comprise searching the forward index of the shared metadata. If a cache entry comprising the particular logical address exists in the forward index, the method 1400 may determine that the data is available, and the flow may continue at step 1460; otherwise, the flow may continue at step 1470.

At step 1460, the storage request may be serviced. Servicing the storage request may comprise accessing the cache entry identified at step 1450 to determine the one or more storage units comprising the requested data. The storage units may be read, and the resulting data may be returned to the requester.

At step 1470, a cache miss may occur. A cache miss may be serviced by accessing data corresponding to the particular logical address in another data store, such as the backing store 118.

At step 1472, the data may be stored sequentially on the solid-state storage device. At step 1474, the metadata may be updated to indicate that the data is available on the solid-state storage device, and at step 1476, the data may be provided to the requester.

Step 1474 may comprise adding a new cache entry to the metadata. The new cache entry may associate the particular logical address with storage units comprising the data read from the backing store.

In some embodiments, step 1474 may comprise updating an existing cache entry. The particular logical address may be proximate to a logical address in the metadata. Accordingly, rather than adding a new, separate cache entry, the existing cache entry may be updated to include the particular logical address and to reference the storage units comprising the data read from the backing store. If the particular logical address falls between two or more existing cache entries (e.g., fills a gap between the cache entries), the updating of step 1474 may comprise merging the cache entries to include the new range (e.g., logical addresses of the original cache entries and the particular logical address), and to reference the original storage units and the storage units comprising the data read from the backing store.

In some embodiments, a cache entry may comprise a portion of the requested data, but not all of the data. In this case, at steps 1470 and 1472 the method 1400 may read and store only the missing portion of data. At step 1474, a new cache entry may be added to associate the particular logical address with the storage units comprising the data read from the backing store. Alternatively, step 1474 may comprise updating an existing cache entry as described above.

Figure 15:
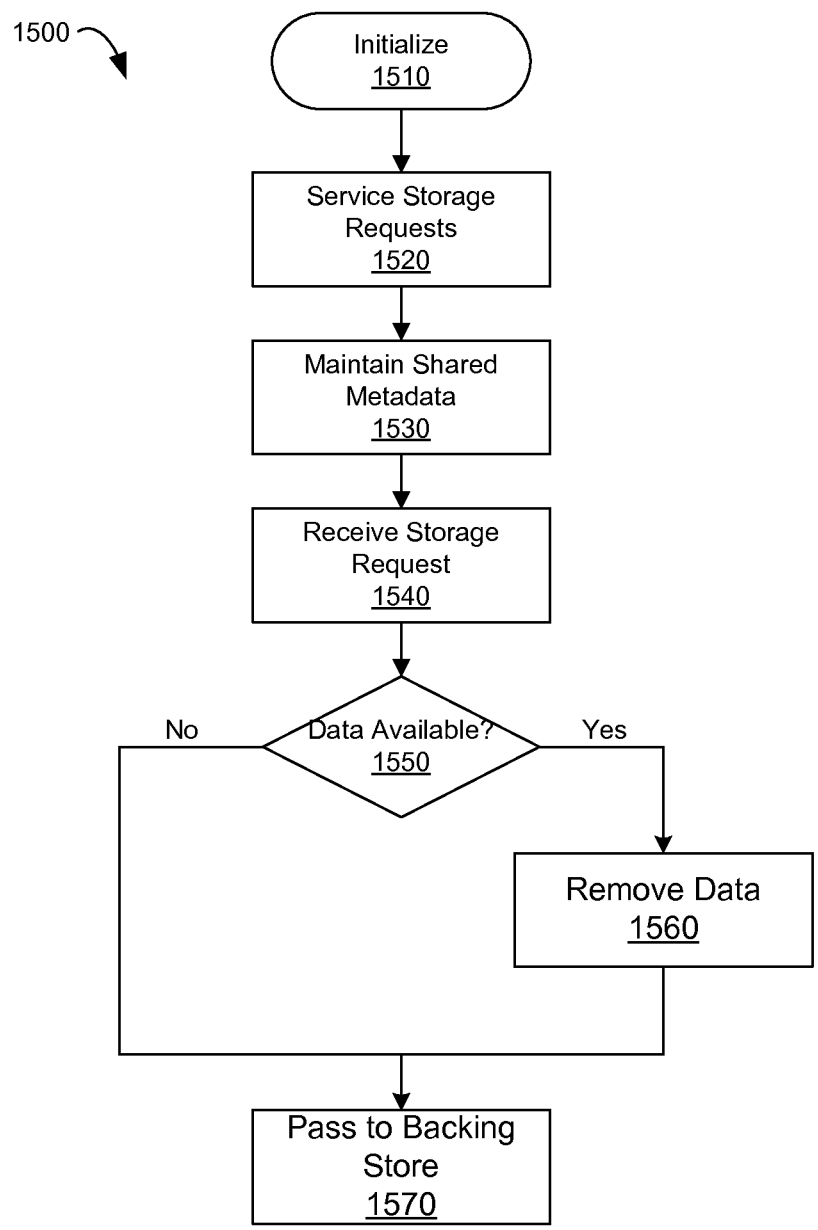
FIG. 15 is a flow diagram of another embodiment of a method for caching data on a solid-state storage device.

FIG. 15 is a flow diagram of one embodiment of a method 1500 for caching data on a solid-state storage device. As described above, steps of the method 1500 may be tied to particular machine components and/or may be implemented using machine-readable instructions stored on a non-transitory machine-readable storage medium.

At steps 1510, 1520, and 1530, the method 1500 may be initialized, service storage requests, and maintain shared metadata as described above. At step 1540, the method 1500 may receive a storage request to remove data stored on the solid-state storage device. The request may reference the data by logical address.

At step 1550, the method 1500 may determine if data corresponding to the logical address is stored on the solid-state storage device as described above in conjunction with FIG. 14.

At step 1560, the method may remove the data from the solid-state storage device. Removing the data may comprise removing a cache entry associated with the logical address from the metadata and/or invalidating the storage units of the cache entry. If the cache entry includes data that is to be retained on the solid-state storage device, the cache entry may be updated to de-associate the cache entry with the removed logical addresses and/or the invalidated storage units. The de-association may comprise splitting a cache entry as described above. Step 1560 may be performed in response to a TRIM command (e.g., issued through a storage interface provided by the method 1500) or the like.

At step 1570, the storage request may be passed through to a backing store, to allow the backing store to remove the data.

Figure 16:
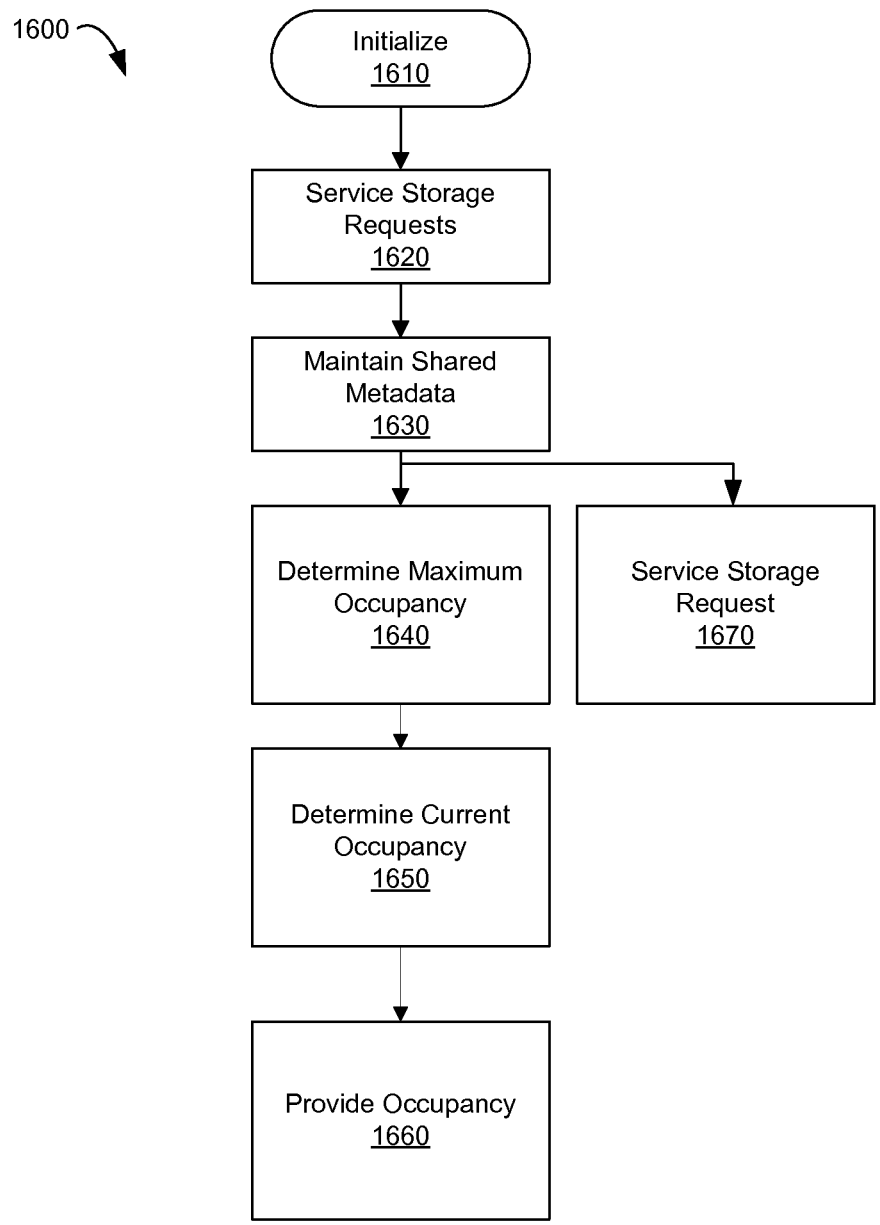
FIG. 16 is a flow diagram of another embodiment of a method for caching data on a solid-state storage device.

FIG. 16 is a flow diagram of one embodiment of a method 1600 for caching data on a solid-state storage device. As described above, steps of the method 1600 may be tied to particular machine components and/or may be implemented using machine-readable instructions stored on a non-transitory machine-readable storage medium.

At steps 1610, 1620, and 1630, the method 1600 may be initialized, service storage requests, and maintain shared metadata as described above. The metadata maintained at step 1630 may comprise a forward index associating logical addresses with storage units of the solid-state storage device. The metadata may further comprise validity and/or discardability metadata.

At step 1640, the maximum occupancy of the solid-state storage device may be calculated using the shared metadata 117 (e.g., the storage metadata 316). The storage metadata 316 may include metadata pertaining to the solid-state storage media, such as error rates, reliability, wear levels, and so on. The storage metadata 316 may include indicators of storage divisions or storage units that are no longer usable (due to unacceptable error rates, or other conditions). The maximum occupancy of the solid-state storage device may be calculated by subtracting the unusable storage divisions from an original maximum occupancy (e.g., physical storage capacity, or a factor thereof). The physical storage space available to cache data may similarly change over time as storage units become unavailable due to wear or other error conditions. The solid-state storage device may continue to operate as a cache (presenting the same size or similar sized logical address space) despite the reduction of available physical storage capacity, due to the unavailable storage divisions and/or storage units. This reduction in available physical storage capacity may continue until the solid-state storage device no longer has available physical capacity to cache data and the input/output rates resemble those for accessing the backing store directly.

At step 1650, the current occupancy of the solid-state storage device may be calculated using the shared metadata 117. In some embodiments, the current occupancy may be calculated as comprising all valid data on the solid-state storage device. The valid data may be identified by traversing the forward index (e.g., index 1104 of FIG. 11). Alternatively, a more aggressive calculation may comprise calculating only the valid, nondiscardable storage units. In this case, the method 1600 may assume that discardable storage units may be removed from the solid-state storage device without data loss and, as such, may be counted as available storage space.

At step 1660, the method 1600 may provide the maximum occupancy and/or current occupancy to a requester, such as a backup engine, groomer, cache manager, or the like.

In some embodiments, the method 1600 may present a logical address space that exceeds the address space of the backing store. At step 1670, the method 1600 may service a storage request associated with a logical address that is outside of a logical address range of the backing store. The solid-state storage device may service the request may storing data on the solid-state storage device. However, the data may not be backed up to the backing store (since its address falls outside of the backing store's logical address). Accordingly, the storage units of the cache entry associated with the logical address may be marked as nondiscardable and may remain nondiscardable until additional logical or physical backing storage capacity is available. In some embodiments, step 1670 may comprise requesting additional backing storage and/or issuing a notification that the logical storage space has been exceeded.

Reference throughout this specification to "some embodiments" or an "embodiment" means that a particular feature, structure, or characteristic described in connection with the embodiment is included in at least one embodiment. Thus, the appearance of the phrases "in one embodiment" or "in some embodiments" in various places throughout this specification are not necessarily all referring to the same embodiment. Furthermore, an "embodiment" may be a system, a device, an article of manufacture, a method, and/or a process.

The phrases "connected to," "networked," and "in communication with" "communicatively coupled to" refer to any form of interaction between two or more entities, including mechanical, electrical, magnetic, and electromagnetic interactions. Two components may be connected to each other even though they are not in direct physical contact with each other and even though there may be intermediary devices between the two components.

Some of the infrastructure that can be used with embodiments disclosed herein is already available, such as: general-purpose processors, programming tools and techniques, non-transitory, computer- and/or machine-readable storage media, and communications networks and interfaces. A computing device, such as an IED and/or monitoring device, may include a processor, such as a microprocessor, microcontroller, logic circuitry, or the like. The processor may include a special purpose processing device such as an ASIC, PAL, PLA, PLD, FPGA, or other processing means. The computing device may also include a computer-readable storage medium such as non-volatile memory, static RAM, dynamic RAM, ROM, CD-ROM, disk, tape, magnetic, optical, flash memory, or other non-transitory machine-readable storage medium.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method, comprising:
   maintaining, by a storage controller configured to manage a solid-state storage device, a logical address space by use of an index configured to a) map data stored on the solid-state storage device to respective storage locations of the solid-state storage device, and b) to map identifiers corresponding to data of a primary storage system cached on the solid-state storage device to respective storage locations of the solid-state storage device, wherein the logical address space is larger than a physical address space of the solid-state storage device; and
   accessing metadata pertaining to storage operations performed on the solid-state storage device and maintained by the storage controller to manage data of the primary storage system cached on the solid-state storage device.

2. The method of claim 1, further comprising accessing metadata pertaining to cache operations performed on the solid-state storage device and maintained by the storage controller to manage grooming operations on storage divisions of the solid-state storage device, wherein the metadata pertaining to cache operations and the metadata pertaining to storage operations are stored in a shared datastructure.

3. The method of claim 1, wherein the metadata comprises a discardability indicator identifying storage units of the solid-state storage device that have been stored on a backing store, the method further comprising:
   using the discardability indicators to select a storage division for recovery.

4. The method of claim 3, the method further comprising:
   identifying a nondiscardable storage unit in the selected storage division using the metadata; and
   causing data of the nondiscardable storage unit to be stored on a different storage division of the solid-state storage media.

5. The method of claim 2, further comprising selecting a storage division for recovery using the metadata pertaining to cache operations.

6. The method of claim 2, further comprising:
   identifying a discardable storage unit of a cache entry that the metadata pertaining to the cache operations indicates should be retained on the solid-state storage device; and
   causing the identified, discardable storage unit to be stored on a different storage division of the solid-state storage media in a recovery operation.

7. The method of claim 1, the method further comprising:
   accessing cache attributes in the metadata pertaining to cache operations, and
   using the cache attributes to select a storage division of the solid-state storage device for recovery.

8. The method of claim 1, further comprising:
   receiving a storage request comprising a logical address associated with a first cache entry referencing storage units in a first storage division of the solid-state storage device;
   storing data of the storage request in storage units of a second storage division of the solid-state storage device; and
   updating the metadata to associate the cache entry with the storage units in the second storage division, to indicate the storage units in the first storage division are invalid, and to indicate the storage units in the second storage division are nondiscardable.

9. The method of claim 1, further comprising:
   storing data on a first storage unit of the solid-state storage device, the data corresponding to a first logical address proximate to a logical address of a second cache entry in the metadata; and
   modifying the second cache entry to include the first logical address and to reference the first storage unit.

10. The method of claim 1, wherein the solid-state storage device is communicatively coupled to the backing store, the method further comprising:
    presenting a logical address space that comprises a capacity of the backing store;
    determining a current occupancy of the solid-state storage device using the metadata pertaining to the storage operations; and
    increasing a priority of a backup engine configured to cause nondiscardable storage units to be stored on the backing store when the current occupancy exceeds the target occupancy threshold.

11. The method of claim 1, further comprising:
    presenting a logical address space that exceeds a logical address space of the backing store;
    identifying a storage request associated with a logical address that falls outside of the logical address space of the backing store; and
    maintaining a nondiscardable indicator of a storage unit of a cache entry associated with the logical address.

12. The method of claim 1, the method further comprising:
    receiving a storage request referencing a first logical address associated with a first cache entry in the metadata, and a second logical address not associated with a cache entry in the metadata; and servicing the request by combining data stored on the solid-state storage device and corresponding to the first cache entry with data read from the backing store.

13. The method of claim 12, further comprising adding a cache entry to the metadata associated with storage units of the solid-state storage device comprising the data read from the backing store.

14. The method of claim 12, further comprising modifying the metadata to include a cache entry that includes the second logical address and reference storage units comprising the data read from the backing store.

15. The method of claim 12, wherein data of the storage request is non-contiguous.

16. An apparatus, comprising:
a storage controller configured to store data corresponding to a primary storage system on respective storage divisions of a solid-state storage device; and
a cache controller configured to maintain cache metadata pertaining to the data corresponding to the primary storage system stored on the respective storage divisions of the solid-state storage device, wherein the cache metadata includes discardability indicators configured to identify data stored on the solid-state storage device that has been backed-up to the primary storage system;
wherein the storage controller is configured to select a storage division of the solid-state storage device for a storage recovery operation by use of the discardability indicators, wherein the selected storage division comprises data that has not been backed-up to the primary storage system.

17. The apparatus of claim 16, wherein the storage controller is further configured to access the cache metadata to identify storage units of the storage division selected for the storage recovery operation that comprise data corresponding to the primary storage system that can be evicted.

18. The apparatus of claim 16, wherein the storage division is selected based on discardability indicators corresponding to data stored within respective storage units of the storage division.

19. The apparatus of claim 16, wherein the cache metadata comprises cache metadata identifying a cache entry to retain on the solid-state storage device, and wherein the storage controller is further configured to access the cache metadata to identify in a storage division selected for recovery, a discardable storage unit associated with a cache entry to retain on the solid-state storage device, and to store the identified, discardable storage unit on a different storage division of the solid-state storage media.

20. A method, comprising:
storing data on a solid-state storage device in one or more storage operations performed on the solid-state storage device by a storage controller;
maintaining, by the storage controller, storage metadata pertaining to one or more of wear-levels of storage units of the solid-state storage device and reliability of the storage units of the solid-state storage device; and
accessing the storage metadata to manage entries of a cache comprising data of a backing store cached on the storage units of the solid-state storage device based on one or more of the wear-levels of the storage units and the reliability of the storage units as indicated by the storage metadata.

21. The method of claim 20, wherein managing the cache comprises selecting a cache entry for eviction based on the storage metadata indicating one of a storage unit comprising data of the cache entry having a high amount of wear, the storage unit having a low amount of wear, and the storage unit being unreliable.

22. The method of claim 20, wherein managing the cache comprises causing data of a cache entry stored on a first storage unit of the solid-state storage device to be stored on a second storage unit of the solid-state storage device based on the storage metadata indicating one of the storage division having a high amount of wear, the storage division having a low amount of wear, and the storage division being unreliable.

23. The method of claim 20, wherein the cache manager causes a storage unit stored on a solid-state storage device to be stored on a backing store based on the storage metadata indicating one of the storage division having a high amount of wear, the storage division having a low amount of wear, and the storage division being unreliable.

24. A method, comprising:
appending data of a primary storage system to a storage log on a non-volatile storage medium;
providing a single translation layer configured to bind identifiers of data stored on the non-volatile storage medium to physical addresses on the non-volatile storage medium, and to translate identifiers corresponding to the data of a primary storage system in the storage log on the non-volatile storage medium to respective physical addresses on the non-volatile storage medium; and
writing data of the primary storage system in the storage log back to the primary storage system in accordance with an order of the data of the primary storage system within the storage log.

25. The method of claim 24, further comprising determining whether data pertaining to the client storage request is cached on the solid-state storage device and identifying a physical address of the cached data by comparing a set of client logical addresses to a variable size cache entry selected using one or more of the set of client logical addresses.

26. The method of claim 24, wherein in response to data pertaining to a client storage request not being stored on the solid-state storage device, the method further comprising:
storing data corresponding to the client storage request in a one or more storage units of the solid-state storage device; and
creating a new cache entry indexed to the client logical address to represent the variable size cache entry.

27. The method of claim 24, wherein in response to data pertaining to a client storage request not being stored on the solid-state storage device, the method further comprising:
storing data corresponding to the client storage request on storage units of the solid-state storage device; and
modifying a cache entry to reference the logical address of the client storage request and the storage units.

28. The method of claim 27, wherein modifying the cache entry further comprises:
merging the cache entry with a second cache entry in the metadata, the second cache entry associated with a logical address proximate within a logical address space to the logical address of the client storage request by associating the cache entry with the logical address of the second cache entry and storage units of the second cache entry.

29. The method of claim 24, further comprising receiving a client storage request to remove data stored on the solid-state storage device, the method further comprising deleting a cache entry associated with the data referenced in the client storage request and marking a storage unit associated with the cache entry as invalid.

30. The method of claim 29, the method further comprising:
: splitting a cache entry into one or more cache entries, the one or more cache entries omitting references to storage units comprising data referenced in the client storage request.

31. The method of claim 24, wherein the storage request references data at a first logical address, and a second, non-contiguous logical address, the method further comprising:
: identifying a first cache entry referencing storage units comprising data corresponding to the first logical address;
: identifying a second cache entry referencing storage units comprising data corresponding to the second logical address; and
: providing data of the storage units referenced by the first and the second cache entries in response to the client storage request.

32. The method of claim 24, further comprising:
: accessing a reverse index comprising associations between storage divisions of the solid-state storage device and client logical addresses; and
: providing an indication of an available storage capacity of the solid-state storage device using the reverse index.

33. A computer program product comprising instructions stored on a non-transitory machine-readable medium, the instructions configured to cause a machine to perform a method for caching data on a solid-state storage device, the method comprising:
: maintaining shared metadata pertaining to cache operations performed on a solid-state storage device and to storage operations of the solid-state storage device, the metadata comprising an index configured to map data stored on the solid-state storage device to respective storage locations of the solid-state storage device, and to map identifiers corresponding to data of a primary storage system cached on the solid-state storage device to respective storage locations of the solid-state storage device;
: accessing the metadata to manage storage operations of the solid-state storage device, wherein the storage operations comprise selecting a storage division of the solid-state storage device for recovery using the metadata pertaining to the cache operations; and
: accessing the metadata to manage a cache stored on the solid-state storage device, wherein managing the cache comprises selecting a storage unit of the solid-state storage device to backup to a backing store using the metadata pertaining to one or more of wear levels of the storage divisions and reliability of the storage divisions.

* * * * *